United States Patent
Brandt et al.

(10) Patent No.: US 10,909,582 B1
(45) Date of Patent: Feb. 2, 2021

(54) AUTHENTICATION CIRCLE SHARED EXPENSES WITH EXTENDED FAMILY AND FRIENDS

(71) Applicant: Wells Fargo Bank, N.A., San Francisco, CA (US)

(72) Inventors: Balin Kina Brandt, Brooklyn, NY (US); Laura Fisher, Rock Hill, SC (US); Marie Jeannette Floyd, Toronto (CA); Katherine J. McGee, San Francisco, CA (US); Teresa Lynn Rench, Mount Holly, NC (US); Sruthi Vangala, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/366,229

(22) Filed: Mar. 27, 2019

Related U.S. Application Data

(60) Provisional application No. 62/666,587, filed on May 3, 2018, provisional application No. 62/666,591, filed on May 3, 2018, provisional application No. 62/656,750, filed on Apr. 12, 2018, provisional application No. 62/656,753, filed on Apr. 12, 2018.

(51) Int. Cl.
  *G06Q 20/16* (2012.01)
  *G06Q 30/02* (2012.01)
  *G06Q 20/40* (2012.01)
  *G06Q 50/00* (2012.01)

(52) U.S. Cl.
  CPC ......... *G06Q 30/0279* (2013.01); *G06Q 20/16* (2013.01); *G06Q 20/4014* (2013.01); *G06Q 50/01* (2013.01)

(58) Field of Classification Search
  CPC ................................................. G06Q 30/0279
  See application file for complete search history.

(56) References Cited

U.S. PATENT DOCUMENTS

| 4,223,403 A | 9/1980 | Konheim et al. |
| 4,731,842 A | 3/1988 | Smith |
| 4,933,971 A | 6/1990 | Bestock et al. |
| 5,577,121 A | 11/1996 | Davis et al. |

(Continued)

FOREIGN PATENT DOCUMENTS

| AU | 2015201432 A1 | 4/2015 |
| WO | WO-2012/136986 A1 | 10/2012 |
| WO | WO-2012/136987 A1 | 10/2012 |

OTHER PUBLICATIONS

Agadakos, et al. in "Location-enhanced Authentication using the IOT," in ACSAC, 2016 (Year: 2016).*

(Continued)

*Primary Examiner* — Hani M Kazimi
*Assistant Examiner* — Brandon M Duck
(74) *Attorney, Agent, or Firm* — Foley & Lardner LLP

(57) ABSTRACT

Systems and methods for providing authentication circles to pursue financial goals and/or share expenses with others are provided. One or more provider computing systems are communicatively coupled to one or more user devices. Users may join a circle and make contributions via electronic messages that may allow for acceptance in a one-click fashion. Members may, for example, plan for and share expenses for a trip and compare the expenses with budgets.

20 Claims, 23 Drawing Sheets

(56) References Cited

U.S. PATENT DOCUMENTS

| | | |
|---|---|---|
| 6,466,654 B1 | 10/2002 | Cooper et al. |
| 7,096,494 B1 | 8/2006 | Chen |
| 7,315,837 B2 | 1/2008 | Sloan et al. |
| 7,343,335 B1 | 3/2008 | Olliphant |
| 7,818,233 B1 | 10/2010 | Sloan et al. |
| 8,660,849 B2 | 2/2014 | Gruber et al. |
| 8,880,402 B2 | 11/2014 | Wasson et al. |
| 8,998,096 B2 | 4/2015 | Brown |
| 9,098,845 B2 | 8/2015 | Florek et al. |
| 9,123,038 B2 | 9/2015 | Cozens et al. |
| 9,218,594 B2 | 12/2015 | Ramakrishna et al. |
| 9,224,113 B2 | 12/2015 | Grigg et al. |
| 9,318,108 B2 | 4/2016 | Gruber et al. |
| 9,477,945 B2 | 10/2016 | Wu et al. |
| 9,495,331 B2 | 11/2016 | Govrin et al. |
| 9,519,932 B2 | 12/2016 | Calman et al. |
| 9,548,050 B2 | 1/2017 | Gruber et al. |
| 9,973,689 B2 | 5/2018 | De Bayser et al. |
| 10,162,896 B1 | 12/2018 | Sumter et al. |
| 10,276,170 B2 | 4/2019 | Gruber et al. |
| 10,291,560 B2 | 5/2019 | Bern et al. |
| 10,332,047 B2 | 6/2019 | Wu et al. |
| 10,510,107 B1 | 12/2019 | Lee et al. |
| 2005/0097033 A1 | 5/2005 | Pretell et al. |
| 2005/0156026 A1 | 7/2005 | Ghosh et al. |
| 2006/0074788 A1 | 4/2006 | Grizack et al. |
| 2008/0103781 A1* | 5/2008 | Wasson ............... G10L 17/26 704/277 |
| 2009/0103730 A1 | 4/2009 | Ward et al. |
| 2009/0119190 A1 | 5/2009 | Realini |
| 2010/0131413 A1 | 5/2010 | Kranzley et al. |
| 2010/0169789 A1 | 7/2010 | Cheng et al. |
| 2010/0250421 A1 | 9/2010 | Ariff et al. |
| 2012/0150728 A1 | 6/2012 | Isaacson et al. |
| 2012/0173464 A1 | 7/2012 | Tur et al. |
| 2012/0185397 A1 | 7/2012 | Levovitz |
| 2012/0316916 A1 | 12/2012 | Andrews et al. |
| 2013/0030994 A1 | 1/2013 | Calman et al. |
| 2013/0054474 A1 | 2/2013 | Yeager |
| 2013/0085931 A1 | 4/2013 | Runyan |
| 2013/0091212 A1 | 4/2013 | Rajakarunanayake |
| 2013/0091582 A1 | 4/2013 | Chen et al. |
| 2013/0159173 A1 | 6/2013 | Sivaraman et al. |
| 2013/0167196 A1* | 6/2013 | Spencer ............. H04L 61/6022 726/3 |
| 2013/0262290 A1 | 10/2013 | Hanson |
| 2013/0262294 A1 | 10/2013 | Green et al. |
| 2013/0262317 A1 | 10/2013 | Collinge et al. |
| 2013/0339114 A1 | 12/2013 | Plut |
| 2013/0339234 A1 | 12/2013 | Prakash et al. |
| 2014/0040129 A1 | 2/2014 | Akin |
| 2014/0114735 A1 | 4/2014 | Isaacson et al. |
| 2014/0122592 A1* | 5/2014 | Houston ............... H04L 29/06 709/204 |
| 2014/0136365 A1 | 5/2014 | Nista |
| 2014/0156328 A1 | 6/2014 | Grigg et al. |
| 2014/0244476 A1 | 8/2014 | Shvarts et al. |
| 2014/0278676 A1 | 9/2014 | Burka |
| 2014/0331278 A1 | 11/2014 | Tkachev |
| 2014/0351118 A1 | 11/2014 | Zhao |
| 2014/0351130 A1 | 11/2014 | Cheek et al. |
| 2014/0351328 A1 | 11/2014 | Woods et al. |
| 2015/0019229 A1 | 1/2015 | Fish |
| 2015/0073952 A1 | 3/2015 | Ventura et al. |
| 2015/0073959 A1 | 3/2015 | Connors et al. |
| 2015/0100482 A1* | 4/2015 | Zamer ................ G06Q 20/14 705/40 |
| 2015/0120345 A1 | 4/2015 | Rose |
| 2015/0206135 A1 | 7/2015 | Scipioni et al. |
| 2015/0242911 A1 | 8/2015 | Zises |
| 2016/0012465 A1 | 1/2016 | Sharp |
| 2016/0019472 A1 | 1/2016 | Javit |
| 2016/0117651 A1 | 4/2016 | Davis |
| 2016/0125470 A1 | 5/2016 | Myers |
| 2016/0180465 A1 | 6/2016 | Deperro et al. |
| 2016/0197993 A1 | 7/2016 | Perkowski et al. |
| 2016/0232546 A1 | 8/2016 | Ranft et al. |
| 2016/0253702 A1 | 9/2016 | Gonzales, Jr. |
| 2016/0253710 A1 | 9/2016 | Publicover et al. |
| 2016/0321582 A1 | 11/2016 | Broudou et al. |
| 2016/0360382 A1 | 12/2016 | Gross et al. |
| 2017/0040018 A1 | 2/2017 | Tormey |
| 2017/0150337 A1 | 5/2017 | Bareket et al. |
| 2017/0372429 A1* | 12/2017 | La Placa ............... G06N 5/02 |
| 2018/0182383 A1* | 6/2018 | Kim ..................... G10L 15/26 |
| 2018/0191695 A1 | 7/2018 | Lindemann |
| 2019/0199715 A1* | 6/2019 | May ..................... H04W 4/00 |
| 2019/0311791 A1 | 10/2019 | St. Paul |
| 2020/0007530 A1 | 1/2020 | Mohamad Abdul et al. |

OTHER PUBLICATIONS

DC Software Arts, "Trip Splitter—Track shared expenses and easily even up", http://www.dcsoftwarearts.com/tripsplitter, Apr. 7, 2017; 4 pages.

Ion et al., "Don't Trust POS Terminals! Verify in-shop payments with your phone", 2010, 10 pages.

Lopez et al., "Advice goes virtual: how new digital investment services are changing the wealth management landscape", Journal of Financial Perspectives 3.3, 2015, 1-21.

* cited by examiner

CIRCLE MEMBERSHIP OVERVIEW

| Member | Linked Accounts | Goals | Amount | Progress |
|---|---|---|---|---|
| 1 | No. 1 (Bank1) | Goal 1 | $2,000 | |
| | No. 2 (Bank2) | Goal 2 | $650 | |
| | ... | ... | ... | |
| 2 | No. 2 (Bank2) | Goal 2 | $2,000 | |
| | No. 3 (Bank3) | Goal 3 | $650 | |
| | ... | ... | ... | |
| 3 | No. 4 (Bank4) | Goal 4 | $2,000 | |
| | | Goal 5 | $650 | |
| | | ... | ... | |

FIG. 8

GOALS OVERVIEW FOR MEMBER 4

| Goal | Share | Budget or Progress / Max | Options | Source | Cost |
|---|---|---|---|---|---|
| Trip to Europe | Even Split With Three Members In Circle 1 | $2,000 / $2,500 | Flight 1 | Travel Site 1 | $800 |
| | | | Flight 2 | Travel Site 2 | $620 |
| | | | Lodging 1 | Travel Site 2 | $400 |
| | | | Lodging 2 | Travel Site 3 | $525 |
| | | | ... | ... | ... |
| Save For New Car | Actual Cost In Circle 2 | $12,000 / $15,000 | Car 1 | Dealer 1 | $10,400 |
| | | | Car 2 | Dealer 2 | $12,100 |
| | | | ... | ... | ... |
| Graduation Gift For Nephew | Fixed Contribution In Circle 3 | $0 / $200 | Gift 1 | Merchant 1 | $380 |
| | | | Gift 2 | Merchant 2 | $950 |
| | | | ... | ... | ... |
| Anniversary Gift For Mom & Dad | 20% of Cost In Circle 4 | $115 / $200 | Gift 3 | Merchant 3 | $220 |
| | | | Gift 4 | Merchant 3 | $410 |
| | | | ... | ... | ... |

FIG. 9

Aruba Trip 12:47
$85.75 USD
$153.49 Aruban florin
[ CLOSE BAR TAB ]
FIG. 15
Aruba Trip 12:48
 Split with 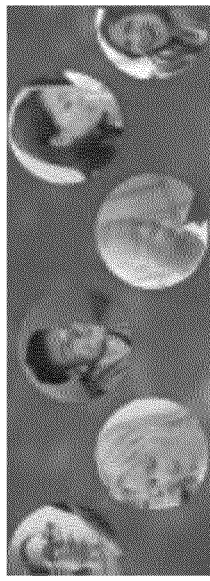
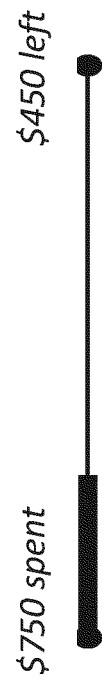
*$750 spent*  *$450 left*
FIG. 16

Aruba Trip 9:25
You have
$120
left to spend.
Aruba Trip - $120 left
FIG. 17
Goal: Trip to Aruba
Accommodations: $8,000
$1,568 left
$6,132 spent
Food: $1,200
$400 left
$800 spent
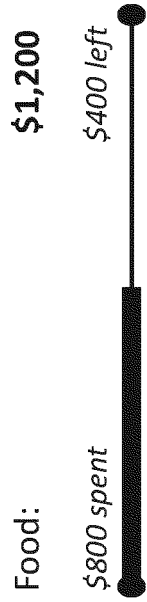 Peter
$402.00
 Vlad
$53.87
FIG. 18

TOTAL
$72.00
Brown Sugar Kitchen
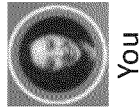 You  $18.00
 Peter  $18.00
 Astrid  $18.00
 Vlad  $18.00
PAY
FIG. 19A

Brown Sugar Kitchen
TOTAL
$72.00
[ Click Items / Amounts to Pay ]
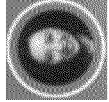 You
$16.50
Entrée: 14.00
Beverage: 8.50
*covered*
 Peter
$22.50
Entrée: 14.00
*covered*
Beverage: 8.50
 Astrid
$19.00
*covered*
 Vlad
$14.00
*Remaining balance: $39.00*
FIG. 19B

AUTHENTICATION CIRCLE SHARED EXPENSES WITH EXTENDED FAMILY AND FRIENDS

CROSS REFERENCE TO RELATED APPLICATIONS

This application claims priority to U.S. Provisional Patent Application No. 62/656,753 entitled "SYSTEMS AND METHODS FOR AUTHENTICATION CIRCLE SHARED EXPENSES WITH EXTENDED FAMILY AND FRIENDS," filed Apr. 12, 2018, U.S. Provisional Patent Application No. 62/656,750 entitled "SYSTEMS AND METHODS FOR AUTHENTICATION CIRCLE MANAGEMENT," filed Apr. 12, 2018, U.S. Provisional Patent Application No. 62/666,591 entitled "SYSTEMS AND METHODS FOR PERVASIVE ADVISOR FOR MAJOR EXPENDITURES," filed May 3, 2018, and U.S. Provisional Patent Application No. 62/666,587 entitled "SYSTEMS AND METHODS FOR PROACTIVE LISTENING BOT-PLUS PERSON ADVICE CHAINING," filed May 3, 2018, all of which are incorporated herein by reference in their entireties.

BACKGROUND

People often wish to share expenses for one or more purchases, work towards shared financial goals, or accept monetary contributions from more than one person. Conventionally, a person wishing to provide a financial gift or reimbursement to another person does so by physical means (e.g., via cash or check), which tends to be slow and inconvenient. In some situations, electronic means are used to provide a financial gift or reimbursement. However, such transfers of funds are "one off" transactions that occur once and independently of other transactions, even if separate transfers are made to the same person or for the same purpose. With such one-off transactions, the contributor of the funds has no more involvement than is required to authorize the electronic transfer. Once the person making the contribution has completed the transaction, the person is not able to subsequently access other information related to the transaction and the contribution's effect on the recipient. The contributor is not able to observe or track, for example, the overall impact or consequences of the contribution on the financial situation of a group of family and friends, and/or progress made by the recipient towards a goal (such as being reimbursed for an incurred expense or saving for a future purchase) as a result of contributions from the multiple contributors.

Moreover, if a group of people wishes to share the costs of multiple expenditures, one person in the group normally takes on the responsibility of paying the costs and collecting funds to cover the expenditures. For example, a person who may like to make a contribution to a financial goal shared with family and friends (such as saving for a trip) may transfer funds to one of the family members or friends. But this tends to be a substantial burden on the recipient, who has to keep track of expenses and maintain an accounting of who paid how much and for what. This also tends to leave the contributors without a reliable way to track the relevant finances. The receiving family member or friend might comingle contributed funds with other money in an existing financial account. In such a case, the recipient (i.e., the family member or friend receiving funds from contributors) may have to provide the contributors with the recipient's account login credentials to allow the contributors to log into the recipient's financial account if the recipient wishes to allow the contributors to check on the group's progress towards the goal. However, this tends to be undesirable, as this not only allows the contributors (who may be casual friends, extended family members, etc.) to access more details of the recipient's finances and personal information than necessary, but it is also a substantial security risk.

Further, a person contributing funds conventionally must provide personal or financial account information to complete such transfers of funds. For example, a first person wishing to contribute funds to a second person using a checking, credit, or other account must enter details on the source of the funds and/or set up a user account linked to a financial account to be able to make funds transfers. Such systems and requirements for a contributor of funds to set up an account and provide account and personal details in order to complete an electronic transfer of funds are not only cumbersome, they also increase the amount of time it takes to receive funds and may unnecessarily expose the contributor to additional risks associated with such tasks (such as loss of privacy, security and data breaches, etc.).

What are needed are systems and methods that address one or more of the above, as well as other, shortcomings of conventional approaches.

SUMMARY

Various embodiments of the disclosure may relate to a service provider computing system providing an authentication circle. The system may comprise a network interface configured to communicate, via a telecommunications network, with a first device of a first user and a second device of a second user. The system may also comprise a processor and memory storing thereon instructions that, when executed by the processor, cause the processor to perform specific functions. The system may be configured to transmit a first request and a second request to form, join, and/or log into an authentication circle. The first request and the second request may be transmitted to the first user device and the second user device, respectively. The system may also be configured to receive a first indication of acceptance and a second indication of acceptance of the first request and the second request, respectively. The first indication and the second indication may be received from or via the first user device and the second user device, respectively. The system may moreover be configured to link at least one account to the authentication circle. The at least one account may include one or more accounts of one or both of the first and second users. The at least one account may be administered by the service provider computing system and/or by one or more third-party computing systems. The system may additionally be configured to retrieve account data corresponding to the at least one account. The account data may be retrieved from internal sources (e.g., databases) and/or from one or more corresponding third-party computing systems. The system may further be configured to identify a shared goal. The shared goal may be identified using the account data and/or a first set of inputs. The first set of inputs may be from at least one of the first and second user devices. The system may furthermore be configured to populate a set of fields in a dashboard. The dashboard may be accessed via the first and/or second user devices. The dashboard may identify the first and second users. The dashboard may additionally or alternatively provide the account data. The dashboard may also be configured to present (visually or otherwise) progress toward the shared goal. The progress toward the shared goal may be based at least in part on the account data, on the first set of inputs, and/or on a second set of inputs. The second set of inputs may be from the first and/or second user devices.

In one or more implementations, the first set of inputs may include sounds detected using one or more ambient sensors of at least of the first and second user devices. The shared goal may be identified based at least in part on a conversation between the first and second users. The first user and/or the second user in the detected sounds may be identified. The first user and/or the second user may be identified based on voice signatures of the first and second users. The voice signature may already be known due to a prior relationship or may be acquired during registration for the authentication circle. The first user and/or the second user may additionally or alternatively be identified by recognizing names or other words or phrases spoken by the first user and/or by the second user.

In one or more implementations, the first user device and/or the second user device may include a first location sensor and/or a second location sensor, respectively. The shared goal may be identified based at least in part on one or more locations of the first and second user devices. The locations may be detected using first and second location sensors of the first and second user devices, respectively.

In one or more implementations, the shared goal may be identified based at least in part on a financial transaction identified in the account data. The shared goal may additionally or alternatively be determined based on at least one of a user entry and a selection that is input into at least one of the first and second user devices by at least one of the first and second users.

In one or more implementations, progress toward the shared goal may be determined based at least in part on the account data and on the second set of inputs. Fields in the dashboard may be populated with data on the progress.

In one or more implementations, account data may include one or more posts to a social network. The shared goal may be identified based at least partly on the one or more posts.

In one or more implementations, the shared goal may be paying for an expense. The expense may be apportioned to the first and second users. The expense may be apportioned based at least partly on roles of the members in the authentication circle, relationships between the members, resources available to the members, and so forth.

In one or more implementations, a first account of the first user and a second account of the second user may be linked to the authentication circle. Account data may be retrieved from both the first and second accounts. At least one of the first and second accounts may be a non-financial account. One of the first and second accounts may be a social networking account and the other of the first and second accounts may be a financial account. The financial account may include funds to be used towards the shared goal.

In one or more implementations, progress towards the goal may be determined based at least in part on input from the first and second users and/or on the account data.

In one or more implementations, information may be retrieved from one or more third-party computing systems. The information may be related to options for achieving the shared goal. A second set of fields in the dashboard may be populated to identify one or more options towards achieving the shared goal.

In one or more implementations, the first user device may be provided with access to the dashboard of the authentication circle via a first login credential or first biometric of the first user. The second user device may be provided access to the dashboard of the authentication circle via a second login credential or second biometric of the second user. The first login credential may be input by the first user into the first user device. The second login credential may be input by the second user into the second user device.

In one or more implementations, the first and/or second requests may be structured such that the first and second indications, respectively, are generated in response to one-click selections. The one-click selections may be made on the first and/or second user devices.

In one or more implementations, the shared goal may be a common financial goal of saving or paying for an expense.

Various embodiments of the disclosure may relate to a method of forming, administering, or otherwise providing an authentication circle. The method may comprise receiving inputs from a first user device of a first user and/or from a second user device of a second user. The method may also comprise accessing at least one account of the first and second users to acquire account data. The method may moreover comprise identifying a shared goal. The shared goal may be identified using the account data and/or a first set of inputs. The first set of inputs may be from at least one of the first and second user devices. The method may additionally comprise transmitting a first request and a second request to form an authentication circle for meeting the identified shared goal. The first request and/or the second request may be transmitted to a first user device and/or to a second user device. The method may further comprise receiving a first indication of acceptance of the first request, and/or a second indication of acceptance of the second request. The first and second indications may be received from and/or via the first user device and/or the second user device. The method may furthermore comprise populating a set of fields in a dashboard. The dashboard may be accessible via the first and/or second user devices. The dashboard may identify the first and/or second users. The dashboard may additionally or alternatively provide the account data. The dashboard may be configured to identify progress toward the shared goal. The progress toward the shared goal may be based at least in part on the account data, on the first set of inputs, and/or on a second set of inputs. The second set of inputs may be received from or via the first and/or second user devices.

Various embodiments of the disclosure may relate to a first user device. The first user device may comprise one or more user interfaces for accepting inputs from a first user and/or providing perceptible outputs to the first user. The first user device may also comprise a processor and memory with instructions that, when executed by the processor, cause the processor to perform specific functions. The first user device may be configured to receive a request to form, join, and/or log into an authentication circle. The request may be received from a service provider computing system and/or from a second user device. The first user device may also be configured to accept, via the one or more user interfaces, an indication of acceptance of the request. The first user device may moreover be configured to accept, via the one or more user interfaces, an identification of at least one account to be linked to the authentication circle. The first user device may additionally be configured to transmit the identification to the service provider computing system. The first user may further be configured to present, via the one or more user interfaces, a shared goal. The shared goal may be identified using at least one of the account data and/or a first set of inputs from at least one of the first and second user devices. The first user device may furthermore be configured to present, via the one or more user interfaces, a graphical dashboard. The dashboard may include a set of fields identifying the first and second users and/or providing the account data. The dashboard may be configured to identify progress toward the shared goal. Progress toward the shared goal may be based at least in part on the account data, the first set of inputs, and/or a second set of inputs from at least one of the first and second user devices. The instructions, or a subset thereof, may be part of an application running on the first user device. The application may be an application of a service provider associated with the service provider computing system, and may have been received directly from the service provider computing system or via a digital distribution platform.

Various embodiments of the disclosure may relate to a method of providing an authentication circle. The method may comprise transmitting a first request and/or a second request to form, join, and/or log into an authentication circle. The first and/or second request may be transmitted to a first user device and/or to a second user device. The method may also comprise receiving a first indication of acceptance and/or a second indication of acceptance of the first request and/or the second request, respectively. The first and/or second indications of acceptance may be received from and/or via the first user device and/or the second user device. The method may moreover comprise linking at least one account of at least one of the first and second users to the authentication circle. The method may additionally comprise retrieving account data corresponding to the at least one account. The method may further comprise identifying a shared goal. The shared goal may be identified using the account data. Additionally or alternatively, the shared goal may be identified using a first set of inputs. The first set of inputs may be received from or via at least one of the first and second user devices. The method may furthermore comprise populating a set of fields in a dashboard. The dashboard may identify the first and second users. Additionally or alternatively, the dashboard may provide the account data, wherein the dashboard is configured to present an identification of progress toward the shared goal based at least in part on the account data, on the first set of inputs, and/or on a second set of inputs. The second set of inputs may be received from or via the first and/or second user devices.

Various embodiments of the disclosure may relate to a method of sharing expenses. Users sharing expenses may already be part of an authentication circle, or may form or join an authentication circle when sharing expenses. The method may comprise forming an authentication circle that includes a first member and a second member. The method may also comprise associating a first user device of the first member with the authentication circle and/or associating a second user device of the second member with the authentication circle. The method may moreover comprise detecting a transaction involving the first user device. The transaction may be for a first amount. The method may additionally comprise detecting that the first user device and the second user device are co-located and/or are within a predetermined distance of each other. That the first user device and the second user device are co-located and/or are within a predetermined distance of each other may be detected using (i) location sensors of the first and second user devices and/or (ii) direct wireless communication between the first and second devices. The method may further comprise prompting the second member to pay a second amount. The second member may be prompted via the second user device. The second amount may be a portion of the first amount, such as an item being purchased as part of the detected transaction. The second member may be prompted in response to the detection that the first user device and the second user device are co-located and/or are within a predetermined distance of each other. The method may furthermore comprise receiving an input at the second user device. The input may indicate a selection to pay the second amount. The method may furthermore comprise initiating a fund transfer. The fund transfer may be for the second amount and may be from an account of the second member.

In one or more implementations, detecting that the first user device and/or the second user device are co-located may comprise using location sensors of the first and/or second user devices to determine that the first and second user devices are located at a same merchant.

In one or more implementations, the first and second user devices may include first and second location sensors, respectively. Determining that the first user device and the second user device are co-located or are within the predetermined distance of each other may comprise: acquiring a first location, detected using the first location sensor, of the first user device; acquiring a second location, detected using the second location sensor, of the second user device; and determining how far the first device is from the second device using the first and second locations. The first and second locations may be received directly from the first and second user devices, respectively.

In one or more implementations, determining that the first user device and the second user device are co-located or are within the predetermined distance of each other may comprise using one of the first and second user devices to detect the presence of the other of the first and second user devices. The presence of the other user device may be detected via near-field communication, Bluetooth, connection to local network, and so forth.

In one or more implementations, the authentication circle is formed, and/or the first and second members associated therewith, via a service provider computing system. Detecting that the first user device and/or the second user device are co-located or are within the predetermined distance of each other may comprise receiving, at the service provider computing system, an indication from one of the first and second user devices that the other of the first and second user devices has been detected to be nearby.

In one or more implementations, detecting the transaction involving the first user may comprise detecting a mobile wallet transaction. The mobile wallet transaction may involve the first user device. The first user device may be running a mobile wallet application.

In one or more implementations, prompting the second member to pay the second amount may comprise transmitting, to the second user device, a prompt for the second member to choose to pay the second amount. The prompt may be configured to allow the second member to choose to pay the second amount via a one-click selection.

In one or more implementations, prompting the second member to pay the second amount may comprise presenting a list of items purchased in the transaction. The list of items may be presented via the second user device. Prompting the second member to pay the second amount may additionally or alternatively comprise allowing for selection of one or more of the items in the list to be paid by the second member.

Various embodiments of the disclosure may relate to a system for sharing expenses. The expenses may be shared via an authentication circle. The system may comprise a processor and a memory with instructions which, when executed by the processor, cause the processor to perform specific functions. The system may be configured to form an authentication circle. The authentication circle may include a first member and a second member. The system may also be configured to associate a first user device of the first member with the authentication circle and/or associate a second user device of the second member with the authentication circle. The system may moreover may be configured to detect a transaction involving the first user device. The transaction may be for a first amount. The system may additionally be configured to detect that the first user device and the second user device are co-located and/or are within a predetermined distance of each other. That the first user device and the second user device are co-located and/or are within the predetermined distance of each other may be detected via location sensors of the first and second user devices, and/or via direct wireless communication between the first and second user devices. The system may further be configured to transmit a prompt to the second user device. The prompt may be transmitted in response to the detection. The prompt may be transmitted to allow the second member to pay a second amount. The second amount may be a portion of the first amount. The second amount may be included in the prompt. The second input may also be input by the second member into the second user device once the prompt is received. The system may furthermore be configured to receive an indication that the second user device received an input. The input may have been received via the prompt. The input may correspond with a selection to pay the second amount. The system may furthermore be configured to initiate a fund transfer of the second amount. The fund transfer may be from an account of the second member. The funds may be directed to an account of the first member or to an account of another member or other entity (such as a merchant).

In one or more implementations, the system may detect that the first user device and the second user device are co-located at least in part by using readings from location sensors of the first and/or second user devices to determine that the first and second user devices are located at a same merchant. That the first and second user devices are located at the same merchant may be determined at least in part by cross-referencing a location of the merchant, which may be received from a third-party computing system, with the readings from the location sensors of the first and/or second user devices.

In one or more implementations, the first and/or second user devices may include first and second location sensors, respectively. The system may determine that the first user device and the second user device are co-located or are within the predetermined distance of each other at least in part by: acquiring a first location, detected using the first location sensor, of the first user device; acquiring a second location, detected using the second location sensor, of the second user device; and using the first and second locations to determine how far the first device is from the second device.

In one or more implementations, the system may detect that the first user device and the second user device are co-located or are within the predetermined distance of each other at least in part by receiving an indication from one of the first and second user devices that the other of the first and second user devices has been detected to be nearby. Detection may be via near-field communication, connection to a network, or via another mechanism.

In one or more implementations, detecting a transaction involving the first user may comprise detecting a mobile wallet transaction involving the first user device.

In one or more implementations, the prompt may be configured to allow for approval or rejection to pay the second amount via a one-click selection.

Various embodiments of the disclosure may relate to a first user device. The first user device may be associated with a first member of an authentication circle. The device may comprise a mobile wallet circuit configured for mobile payments. The device may also comprise a processor and memory with instructions that, when executed by the processor, cause the processor to perform specific functions. The device may be configured to detect a transaction involving the mobile wallet circuit, the first transaction being for a first amount. The device may also be configured to detect that the first user device and a second user device are co-located or are within a predetermined distance of each other via (i) location sensors of the first and second user devices and/or (ii) direct wireless communication between the first and second user devices. The device may moreover be configured to determine that the second user device is associated with a second member of the authentication circle. The device may additionally be configured to initiate a prompt to the second user device for payment of a second amount.

In one or more implementations, the first user device may include one or more user interfaces for accepting inputs from the first user and/or for providing perceptible outputs to the first user. The device may be configured to present, via the one or more user interfaces, a list of items purchased in the transaction. The device may also be configured to accept, via the one or more user interfaces, one or more selections of items to be paid by the first user or the second user.

In one or more implementations, the first user device may be configured to detect that the first user device and the second user device are co-located or are within the predetermined distance of each other at least in part by detecting the second user device via near-field communication.

In one or more implementations, the first user device may include a first location sensor. The first user device may be configured to detect that the first user device and the second user device are co-located or are within the predetermined distance of each other at least in part by transmitting a first location, detected using the first location sensor, to a service provider computing system for comparison with a second location detected using a second location sensor of the second user device.

In one or more implementations, the first user device may be configured to determine that the second user device is associated with the second member of the authentication circle at least in part by transmitting an identification of the second user device to a service provider computing system for confirmation of an association between the identification and the authentication circle.

In one or more implementations, the first user device may be configured to initiate the prompt to the second user device to request payment of the second amount at least in part by transmitting a request to the second user device directly and/or via a service provider computing system.

Various embodiments of the disclosure relate to a method. The method may allow a first user to access an account of a second user using separate login credentials. The method may comprise transmitting a first request to form and/or join an authentication circle. The first request may be transmitted to the first device. The method may additionally or alternatively comprise transmitting a second request to form and/or join an authentication circle. The second request may be transmitted to the second device. The method may also comprise receiving a first indication of acceptance via the first device. The method may additionally or alternatively comprise receiving a second indication of acceptance via the second device. The method may moreover comprise linking the account of the second user to the authentication circle. The method may additionally comprise generating a dashboard. The dashboard may provide a view identifying the first and second users. The dashboard may also provide access to the linked account of the second user. The dashboard may be configured to make the account accessible to the first user. The account may be made accessible to the first user without use of login credentials used by the second user to access the account.

Various embodiments of the disclosure may relate to a method of forming and/or providing an authentication circle. The method may comprise registering a first member for an authentication circle via a first user device of the first member. Registering the first member may comprise accepting a first login credential and/or first biometric from the first user device. The first login credential and/or first biometric may grant the first member remote access to the authentication circle. The method may also comprise registering a second member for the authentication circle via a second user device of the second member. Registering the second member may comprise accepting a second login credential and/or a second biometric from the second user device. The second login credential and/or second biometric may grant the second member remote access to the authentication circle. The method may moreover comprise linking a first account of the first member to the authentication circle. Linking the first account may comprise acquiring access to the first account. The method may additionally comprise retrieving first account data from the first account. The method may further comprise presenting the first account data to the first user device upon login to the authentication circle using the first login credential and/or first biometric. The method may furthermore comprise presenting the first account data to the second user device upon login to the authentication circle using the second login credential and/or second biometric. The first account data may be presented to the first and/or second user devices via a dashboard.

In one or more implementations, a user may indicate, via a one-click selection, both acceptance to form and/or join an authentication circle and approval to make a contribution to a goal and/or expense.

Various embodiments of the disclosure may relate to a method of authenticating members of an authentication circle based on location and/or proximity. The method may comprise forming an authentication circle that includes a first member and a second member, and associating a first user device of the first member with the authentication circle and associating a second user device of the second member with the authentication circle. The method may also comprise determining at least one of a first login credential and a first biometric required for granting the first member access to the authentication circle. The method may moreover comprise determining at least one of a second login credential and a second biometric required for granting the second member access to the authentication circle. The method may additionally comprise linking at least one account of at least one of the first and second members to the authentication circle and retrieving account data corresponding to the at least one account to be made accessible to both the first and second members via the authentication circle. The method may further comprise authenticating the first member by acquiring, via the first user device, at least one of the first credential and the first biometric. The method may furthermore comprise detecting that the first user device and the second user device are co-located or are within a predetermined distance of each other using at least one of (i) location sensors of the first and second user devices and (ii) wireless communication between the first and second devices. The method may furthermore comprise granting the second member access to the authentication circle in response to detection that the first user device and the second user device are co-located or are within the predetermined distance without requiring either the second login credential or the second biometric from the second user device.

These and other features, together with the organization and manner of operation thereof, will become apparent from the following detailed description when taken in conjunction with the accompanying drawings.

BRIEF DESCRIPTION OF THE FIGURES

FIG. 8 depicts an example data structure for members of an authentication circle and accounts and goals associated with the authentication circle according to example embodiments.

FIG. 9 depicts an example data structure for the goals of a member of an authentication circle according to example embodiments.

FIG. 15 depicts an example graphical user interface involving an international expenditure in an authentication circle according to example embodiments.

FIG. 16 depicts an example graphical user interface involving splitting of an expense with members of an authentication circle according to example embodiments.

FIG. 17 depicts an example graphical user interface involving sample expenditures of a member of an authentication circle according to example embodiments.

FIG. 18 depicts an example graphical user interface involving sample expenditures of multiple members of an authentication circle according to example embodiments.

FIG. 19A depicts an example graphical user interface involving a sample expense being split with other members of an authentication circle according to example embodiments.

FIG. 19B depicts an example graphical user interface involving a sample expense being split with other members of an authentication circle according to example embodiments.

DETAILED DESCRIPTION

Figure 1A:
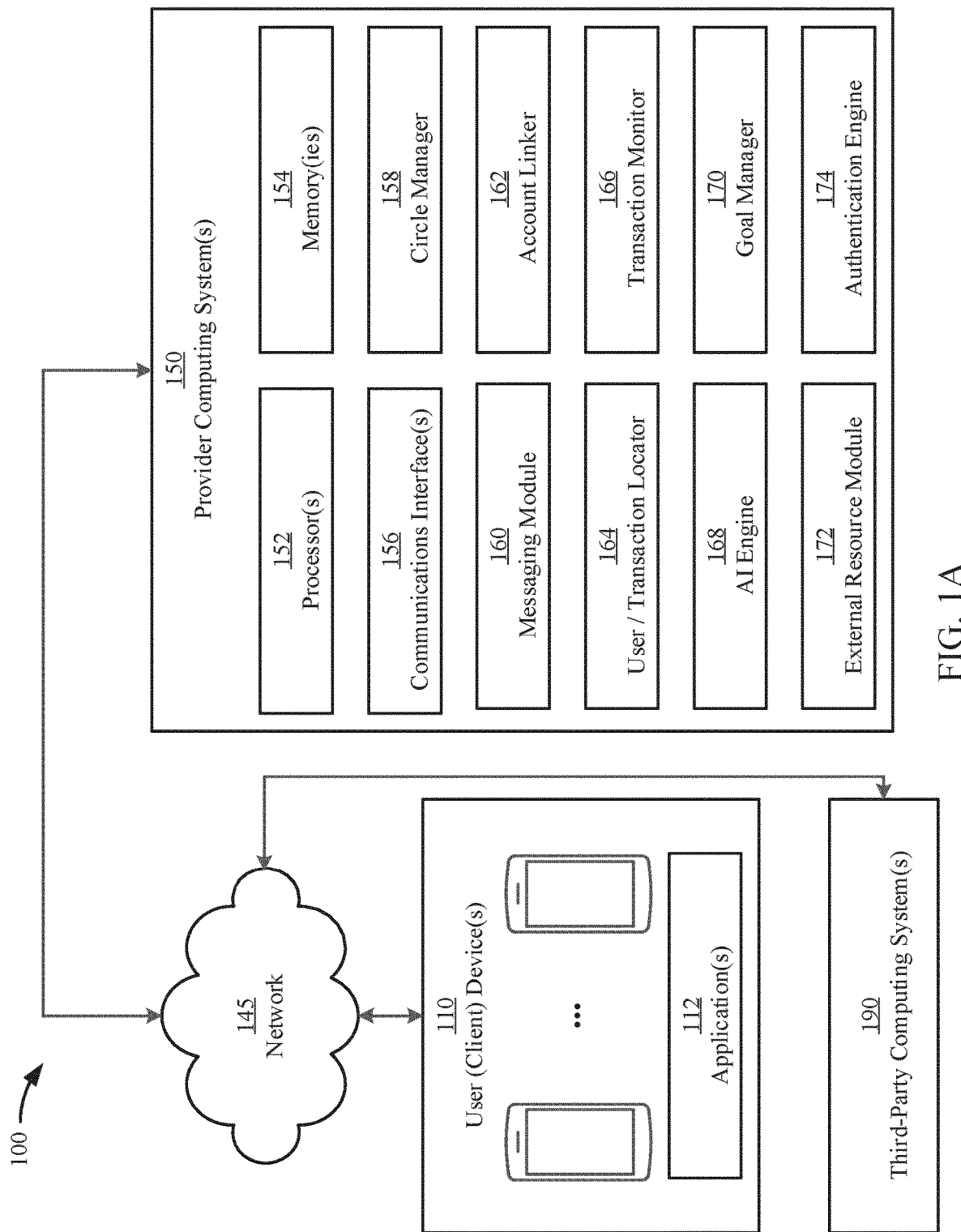
FIG. 1A is a block diagram of an example computing system framework for authentication circles according to example embodiments.

Example embodiments relate to systems and methods for forming and managing financial and non-financial authentication circles. User devices may communicate with a provider computing system and with each other to allow users to pursue financial or non-financial goals, manage finances, split expenses, make gifts, etc. In example versions, account authentication and access is handled on the back end, and users can join authentication circles and/or make contributions with minimal user entry, such as in a one-click fashion. Speech recognition and natural language processing may be used to predict needs and make suggestions to users concerning the formation of authentication circles for pursuing financial goals. In some embodiments, the system may interact with application programming interfaces (APIs) of, for example, social media services, allowing messages to be sent to other people via, for example, social networks.

Users may be authenticated using an identity verification service API. In some implementations, assuming the user device is a known device (e.g., the user has an instance of a mobile wallet of the provider installed on his or her phone) that requires authentication, the user can be identified and authenticated in the same manner that occurs with the mobile wallet, and there is no need for the user to provide additional identification information or account information. A back-end integration of bank systems may be used to exchange account information between banks based on the identification of the user. The provider computing system may also integrate with third party APIs and provide members of the authentication circle with group/shared access of the APIs. For example, an authentication circle that is planning a trip may access APIs for third party travel services (e.g., Travelocity, Yelp, etc.). Members of the authentication circle may therefore plan the trip as a group. Authentication circles can thus allow two or more persons shared access to one or more financial or non-financial accounts.

The transactions and locations of members of authentication circles and other users may be monitored to assist with establishing authentication circles, pursuing financial goals, and/or making financial contributions. Users may be offered an opportunity to share expenses in an automated fashion based on locations (e.g., locations of users) and/or based on transactions. For example, the provider computing system and/or applications running on user devices may use the location of mobile devices to determine that users are co-located at a merchant (e.g., a restaurant) or otherwise near enough to each other to be engaged in an activity together. If the transactions of one of the members indicates that he or she paid for an expense (e.g., paid for dinner using a credit or debit card, mobile wallet, or in another manner), the nearby members may be prompted about splitting the costs associated with the expense. The amount owed by each person may be calculated based on parameters of the authentication circle (such as how expenses are split up in different situations by the various members), and a message specifying the amount owed and requesting "approval" to make the appropriate funds transfer may be presented to the members. With minimal or otherwise with less effort than would otherwise be required (e.g., with a single selection), the other members of the authentication circle may approve the funds transfers, thereby triggering the payments that will help cover the cost of dinner or other expenditures.

User devices may also alert members of the authentication circle when predetermined expenses get close to a preset limit. Each member of the authentication circle may be made aware of expenses in real-time (e.g., of real-time trip spending) as compared with his or her budget. Members may be provided with alerts indicating amounts remaining in the budget. If certain members of the authentication circle are on a tighter budget than other members, the added transparency may assist the less budget-restricted members in remaining cognizant of the situation of the more budget-restricted members (without awkward conversations about money/budgets having to occur). In the case of foreign expenses (e.g., during trips abroad), the system may determine and utilize the best currency and payment forms for different transactions.

Example implementations of the disclosed approach allow a group of users to strive towards a common financial goal or to otherwise manage joint finances in a peer-to-peer manner. For example, a group of friends that decides to take a trip may wish to form an authentication circle to split expenses during the trip. As another example, a customer who is pregnant may form an authentication circle to enable friends and family to give her money in an easy manner. As another example, a husband and wife (or a couple in a domestic partnership) who do not co-mingle finances may wish to create authentication circles to allow them to define and strive towards common financial goals. Users may be added to authentication circles in a manner that is analogous to accepting a request (e.g., a friend request on Facebook) or making a payment via a mobile wallet. For example, a user being added as a member may be sent a message on his/her computing device, and the user may "accept" the request without a need for the user to provide additional identification information or account information. The user is identified/authenticated and account information is obtained via backend processes/services. Additionally, geo-based arrangements (involving, e.g., near-field communications, global positioning systems, etc.) may be used to monitor transactions of a group of people that are in the same location or otherwise near each other for identifying situations in which the group may want to split costs. Further, a provider computing system may integrate with third party APIs to provide members of the authentication circle shared access to various financial and non-financial accounts. The disclosed approach is not cumbersome to set up as it does not require users to enter account information for accounts involved in the funds transfers.

Referring to the figures generally, described are example systems and methods of providing an authentication circle to meet a shared financial goal (e.g., a shared expense, joint fund, savings goal, financial gift, etc.) or to otherwise provide two or more persons with access to one or more accounts. Example systems include one or more user computing devices that may communicate with each other (directly or via a network) and/or with one or more provider computing systems (via a network), which in turn may communicate with third-party computing systems (of, e.g., financial institutions, travel sites, merchants, etc.). The provider computing system may be structured to send and receive requests to join an authentication circle for managing financial resources and goals, and to make financial contributions.

As used herein, the term "authentication circle" (or simply "circle") may be used to refer to a group of two or more members who are connected or otherwise linked such that a first member of the authentication circle may gain access to financial or non-financial information related to a second member of the authentication circle without providing authentication credentials for all sources of that financial or non-financial information (e.g., login credentials for the accounts accessed to acquire the financial information presented via the circle, such as the accounts of the second member of the authentication circle). For example, the first member may be authenticated to access the account of the second member by providing authentication credentials of the first member, instead of providing authentication credentials of the second member. One set of login credentials can thus allow a member to access one or more of his/her accounts linked to the authentication circle and/or one or more linked accounts of one or more other members. The authentication circle may be "limited," for example, to the extent that the members are able to access information relevant to financial goals but not necessarily all information related to the accounts from which information is retrieved. The authentication circle may also be limited in the sense that members may have the ability to revoke access to their accounts when desired. The authentication circle may permit members to link financial accounts to circles to work towards financial goals of one or more members.

Joining authentication circles, making contributions towards financial goals, and otherwise interacting with authentication circles may be accomplished with more information and with reduced "friction" (i.e., less effort and/or requiring fewer resources) so as to minimize the time, energy, and/or expense required by members to engage with each other. For example, a person may receive a request (e.g., to join an authentication circle or make a financial contribution) via an electronic message (e.g., text message, pop-up notification in an application, e-mail message, etc.) and accept the request with minimal effort (e.g., in a "one-click" fashion that requires a user to respond with one user entry, such as selecting a virtual button or a link). In some implementations, accepting a contribution may be deemed to also indicate acceptance of joining a circle in which the beneficiary of the contribution is a member, in case the contributor and the recipient are not already members of an authentication circle. A user accepting a request (to join and/or contribute) need not necessarily provide authentication credentials to log into the circle or any of the accounts associated with the circle. In some versions, the provider computing system may receive an indication of acceptance of the request to join and make a financial contribution, and initiate transfers on the back end without further input from users. The authentication circles and associated financial contributions may help a group of members make progress towards a common financial goal, such as covering expenses for an experience (e.g., friends going on a trip).

Various embodiments and implementations of the systems and methods disclosed herein improve current computing systems by providing an authentication circle to meet a financial goal of one or more members of the authentication circle who may be family, friends, colleagues, or otherwise. The authentication circles enable access to information from accounts of other members of the authentication circle without separate authentication protocols. Funds may be requested and contributed with less effort, requiring less time, reducing demand on computing resources, and enhancing security of users.

The disclosed approach improves authentication of members accessing one or more accounts for one or more financial or non-financial goals. For example, the identity of a person may be verified with fewer user entries to prevent fraudulent activity and to ensure that each person who joins or otherwise participates in the authentication circle operates under the proper security roles and permissions. A member of the authentication circle may be authenticated based on the authentication credentials of that member without the need to know, use, or access the authentication credentials that belong to other members of the authentication circle. Example systems, methods, and computer implementations also improve computing systems by facilitating financial transactions, such as making payments, transferring funds, or making financial contributions without requiring the entry of account information and/or without the need for login credentials. Without such requirements, the clock time, processing time, programmatic instructions required to authenticate multiple accounts, and other requirements of the central processing unit, memory utilization, and other system resources, are reduced. Accordingly, authentication computing and system security are improved by providing the ability to identify a member of the authentication circle based on a user's previous interactions with a software application associated with the financial institution computing system or a member device previously authenticated such that the member need not provide additional identification information or account information for authentication.

Implementations of the disclosed approach can improve computing systems by including connected user devices structured to interact with (e.g., pervasively advise) members of the authentication circle via voice recognition algorithms such that the computing devices can listen, receive, and interpret dictation and/or voice commands. In turn, the computing system may pervasively and/or interactively provide financial planning advice to the members of the authentication circle via digital audio and/or visual means. The advice (e.g., to split costs for an expenditure) may be based on the locations of members (e.g., presence at a merchant) and/or the transactions of the members (e.g., purchases, reservations, etc.). As such, the systems, methods, and computer implementations disclosed herein improve the functioning of such systems and information management by providing functionalities that are unconventional improvements over current systems.

As described herein, the disclosed authentication circles may permit members to meet one or more financial goals of one or more members. Members need not be given full access to the accounts of other members, but may nonetheless be provided with relevant financial information (e.g., information on deposits, debits, and credits related to making progress towards financial goals). The circles may provide limited access by which a member may access selected and/or predetermined features or information from an account of another member. For example, a member may only have view (e.g., read-only) access such that the member may not make changes to or otherwise write to the account of the other member. In some examples, limits may be imposed on the types or dollar amounts of transactions that a member may execute or otherwise perform in furtherance of a goal and/or on behalf of another member. Members of an authentication circle may stay involved with progress towards financial goals and available options for how money is spent by accessing the authentication circle, but may be active (i.e., participate) without necessarily logging into the circle (e.g., by responding to electronic messages). Members (who may be, for example, sharing expenses for a trip or for particular purchases such as gifts) may log into the circle to link financial accounts and access information on, for example, what has been purchased and what has not been purchased, how much is saved towards a purchase, how much remains in a budget, limits on what can be spent by individual members, product options (e.g., available flights and accommodations, gift options, potential financial products, etc.) retrieved from third-party sources, and other relevant information.

Referring to FIG. 1A, a block diagram of an authentication circle system 100 is shown according to one or more example embodiments. As described herein, the system 100 enables the implementation of reduced-friction sharing of financial and non-financial goals and responsibilities among members of an authentication circle. The system 100 includes one or more provider computing systems 150 of one or more service providers in communication with one or more user (client) devices 110 via network 145. Each user device 110 and computing system 150 may include, for example, one or more mobile computing devices (e.g., smartphones, tablets, laptops, smart devices such as home smart speakers and watches, etc.), non-mobile computing devices (such as desktop computers, workstations, servers, etc.), or a combination thereof. Computing systems 150 and user devices 110 may be communicably coupled to each other over a network 145, which may be any type of communications network. For example, the network 145 may involve communications using wireless network interfaces (e.g., 802.11X, ZigBee, Bluetooth, Internet, near-field communication (NFC), etc.), wired network interfaces (e.g., Ethernet, USB, Thunderbolt, etc.), or any combination thereof. The network 145 is structured to permit the exchange of data, values, instructions, messages, and the like between and among provider computing systems 150 and user devices 110 via such connections.

Each computing system 150 includes one or more processors 152, memories 154, and communications interfaces 156. Each processor 152 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the computing system 150. The memory 154 (e.g., RAM, ROM, NVRAM, Flash Memory, hard disk storage) may store data and/or computer code for facilitating at least some of the various processes described herein, as well as one or more data repositories (which may include, e.g., database records such as user data and acquired information). In this regard, the memory 154 may store programming logic that, when executed by the processor 152, controls the operation of the computing system 150. The communications interface 156 may be structured to allow the computing system 150 to communicate data to and from other devices (e.g., via network 145) either directly or indirectly. The computing system 150 may be, for example, an internal computing system (with one or more computing devices) of the service provider (e.g., the provider of financial services).

Provider computing systems 150 may include one or more components involved in their operations and functions, and their interaction with user devices 110. These components may be implemented using hardware, software, or a combination thereof. A circle manager 158 and/or a goal manager 170, for example, may be configured to establish authentication circles and the members, goals, accounts (financial or otherwise) associated therewith. The circle manager 158 may also be tasked with keeping the data associated with members of authentication circles up-to-date. In certain implementations, the circle manager 158 and/or the goal manager 170 may acquire information on members (or potential members) and their goals and accounts via, for example, one or more user devices 110. In some implementations, circle manager 158 may acquire data via third-party computing systems 190. For example, circle manager 158 may determine identities and relationships of members (or potential members) from social networking systems (e.g., Facebook). In various implementations, the circle manager 158 may acquire account information (e.g., account balances, credit card charges, etc.) from internal (e.g., associated with the provider) or external (e.g., third-party) computing systems 190 of various financial institutions or other sources of information. Acquisition of account data and other information may be accomplished via, for example, account linker 162 and/or external resource module 172, both further discussed below.

A messaging module 160 may be configured to exchange messages with, for example, members and potential members. The messaging module 160 may send and receive messages (which may contain text, sounds, images, data, etc.) to and from users via any messaging service or mechanism, such as short message service (SMS) messages sent over a cellular network, text messages sent via a network (e.g., Internet) connection via texting applications, and/or e-mail messages sent via, for example, Internet browsers or e-mail applications. In certain implementations, messages may be sent via messaging module 160 to, for example, invite members to join an authentication circle. Alternatively or additionally, messages may be sent via messaging module 160 to, for example, solicit payments, funds transfers, financial contributions, etc., as part of gifts, sharing of expenses, etc., as further discussed below. The messaging module 160 may receive indications that an invitation or solicitation has been accepted, and in some implementations, may initiate the appropriate next steps (such as updating of information in an authentication circle via, e.g., circle manager 158) in response to the receipt of acceptances (which may be received via, e.g., a text message or a unique Internet hyperlink that, when visited, indicates a user's selection).

The provider computing system 150 may also include an account linker 162. When a member of an authentication circle wishes to add an account to a circle, the account may be held internally (if the provider is also a financial institution) or externally (e.g., at another financial institution or other entity). The account linker 162 may be configured to allow provider computing system 150 to access account data associated with one or more accounts that have been added to a circle by one or more members of the circle. The account linker 162 may use, for example, any combination of one or more application programming interfaces (APIs), software development kits (SDKs or devkits), or other hardware/software mechanisms that facilitate data exchange or communication between and among co-located or remote computing systems. In some implementations, the provider computing system 150 may, via the account linker 162, obtain account balances (of, e.g., checking and savings accounts and credit cards). In certain implementations, the provider computing system 150 may, via the account linker 162, initiate payments or other funds transfers on behalf of one or more members of an authentication circle.

Provider computing system 150 may also include a user/transaction locator 164 configured to determine, identify, and/or retrieve one or more locations associated with one or more user devices 110, or locations associated with one or more transactions relevant to the users/members. In some implementations, user/transaction locator 164 may be used, for example, to determine when/whether two or more members are located at the same establishment (e.g., at the same restaurant or other merchant, sitting at a table discussing a potential trip or other goal, near enough to each other to be having a discussion or otherwise collaborating, in the same room at a school or conference, etc.) or otherwise within a certain vicinity of each other. In certain implementations, the user/transaction locator 164 may retrieve location data via a location tracker of one or more applications running on one or more user devices 110 (which may determine location using one or more location sensors or other components). Location data associated with users and/or transactions may be maintained as part of a location/transaction history for members of a circle.

A transaction monitor 166 of provider computing system 150 may be configured to identify and keep track of financial or other transactions of circle members or other users of user devices 110. These may be, for example, financial transactions of a member on a trip with other members. The members of a circle may be, for example, splitting expenses for the trip, and the financial transactions to be split automatically (or potentially split following confirmation) thus need to be tracked. In other situations, the expenses to be split are for a particular purpose, such as for a new baby or for a major purchase. A user may engage in transactions using, for example, mobile payment and digital wallet services, or via any app and/or device through which a user may make purchases, transfers, deposits, cash advances, etc. In some implementations, transactions may be monitored via access to financial account data that can be retrieved via account linker 162.

The provider computing system 150 may also include an artificial intelligence (AI) engine 168 configured to analyze and combine inputs, make predictions on transactions and goals, generate recommendations on circle formation and member activities, or any other tasks associated with computer learning and/or problem solving. In some implementations, AI engine 168 may be used to understand human speech or decipher imagery captured, for example, via ambient sensors of user devices (further discussed below) to understand the situation and/or needs of one or more members of an authentication circle. In some implementations, AI engine 168 may be configured to identify when a circle might be useful or beneficial based on, for example, communications involving potential members, purchase histories of potential members, or other activities or data points. Any artificial intelligence algorithms, logic, neural networks, or other tools may be used in implementing AI engine 168 for various desired purposes.

A goal manager 170 may be configured to allow members to set new goals, track progress towards goals, and determine the impact of different goals on one another. For example, a member wishing to set up a goal of saving for a new car may be structured very differently from a goal of saving for a trip with family or friends. The goal manager 170 may acquire the needed inputs from one or more users (e.g., amounts to be saved or spent, how expenses are to be split, what sorts of expenses are expected, etc.) and guide members towards accounting for expenses that may not have otherwise been contemplated but which can be predicted based on the situation of the members (and/or based on the situation of other similarly-situated users with comparable goals, finances, habits, etc.). Establishing a new goal, or making changes to (or progress towards) an existing goal, may impact existing goals because, for example, allocating limited funds to one goal may decrease the availability of funds for other goals. In certain implementations, the goal manager 170 may acquire information (e.g., regarding balances in accounts available for a goal, the costs of different expenses from different merchants, relationships between members, etc.) from internal sources (e.g., databases maintained in different computing systems or by different units or divisions of the provider) or external (third-party) sources via, for example, external resource module 172, discussed below. The goal manager 170 may also generate user interfaces intended to solicit needed information and present relevant information in a useful and digestible manner to enhance effectiveness in assisting members achieve their goals.

An external resource module 172 may be configured to access, retrieve, process, and use data from information sources other than the provider computing system 150. This may include travel websites such as Expedia, Travelocity, and Kayak, as well as websites of airlines, train operators, bus operators, hotels, etc.), merchant websites (e.g., Amazon, Target, Walmart, Google Shopping, etc.) and other sources of information on expenses and costs of merchandise. In some implementations, the external resource module 172 may access a data source that may provide information on interbank exchange rates, allowing members to better track purchasing power when traveling abroad. In certain implementations, the external resource module 172 may access social networking websites (e.g., Facebook, Twitter, LinkedIn, etc.) for information on, for example, life events (e.g., birth, starting college, etc.) and familial or other relationships to propose formation of authentication circles with particular members, to propose new goals or changes to existing goals, to better predict needs (via, e.g., AI engine 168), etc. The external resource module 172 may also access such sources of information as: credit agencies to, for example, identify open accounts that may be available for achieving goals, anticipated cost of credit/loans (as a result of higher or lower interest rates due to lower or higher credit ratings, respectively) for particular members, etc.; news sources to identify, for example, weather patterns and current events that may impact the ability of members to proceed with a planned trip; financial institutions; governmental bodies; and so forth.

The provider computing system 150 may also include an authentication engine 174 for verifying identify and authorization to access accounts (such as the authentication circle, external accounts at other institutions, etc.). The authentication engine 174 may use, for example, login credentials and/or biometric data acquired via user devices 110. In some implementations, authentication engine 174 may authenticate users by verifying the identity of the user device 110 via, for example, its unique ID (such as a serial number) or other identifying information.

Figure 1B:
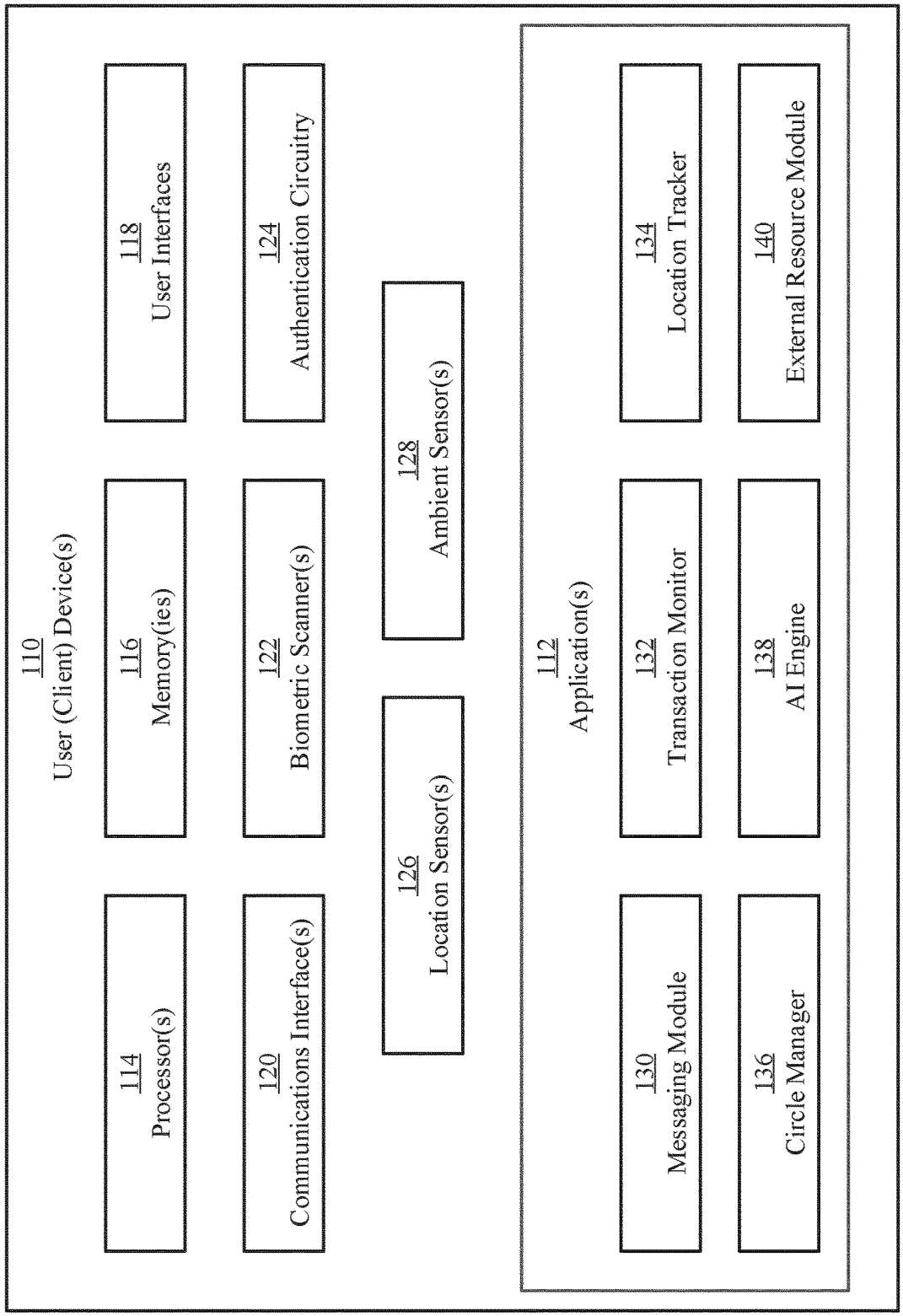
FIG. 1B is a block diagram for an example user devices of FIG. 1A according to example embodiments.

Referring to FIG. 1B, each user device 110 may include a processor 114, a memory 116, user interfaces 118, and a communications interface 120. The processor 114 may be implemented as a general-purpose processor, an ASIC, one or more FPGAs, a DSP, a group of processing components, or other suitable electronic processing components structured to control the operation of the user device 110. The memory 116 (e.g., RAM, ROM, NVRAM, Flash Memory, hard disk storage) may store data and/or computer code for facilitating at least some of the various processes described herein, as well as one or more data repositories (which may include, e.g., database records such as user data and acquired information). In this regard, the memory 116 may store programming logic that, when executed by the processor 114, controls the operation of the device 110. The user interfaces 118 include any input (e.g., keyboard, mouse, touchscreen, microphone for voice prompts, notification LEDs, buttons, switches, etc.) and output devices (e.g., display screens, speakers for sound emission, etc.) deemed suitable for operation of the device 110. The communications interface 120 may be structured to allow the device 110 to communicate data to and from other systems (e.g., via network 145) either directly or indirectly. The user devices 110 may be mobile and non-mobile computing devices of one or more users and/or third-parties (i.e., any entities other than the service provider).

User device 110 may also include one or more biometric scanners 122, such as fingerprint scanners, cameras for facial, retinal, or other scans, microphones for detection of voice signatures, etc. In conjunction with, or separate from, the biometric scanners 122, each user device 110 may include authentication circuitry 124 to allow the user device 110 to engage in, for example, financial transactions (such as payments via mobile payment and digital wallet services) in a more secure manner. Various user devices 110 may include one or more location sensors 126 to enable user device 110 to determine its location relative to other physical objects or relative to geographic locations. Example location sensors 126 include global positioning system (GPS) devices and other navigation and geolocation devices, digital compasses, gyroscopes and other orientation sensors, as well as proximity sensors or other sensors that allow the user device 110 to detect the presence and/or distance of nearby objects. User device 110 may also include ambient sensors 128 that allow for the detection of sound and imagery, such as cameras (e.g., visible, infrared, etc.) and microphones, in the surroundings of device 110. It is noted that a device's microphone is an ambient sensor that may be used as a biometric scanner if it is involved in detecting the voice of a user for identification and/or authentication.

Each user device 110 may include one or more applications 112 ("apps") that aid the user device 110 in its operations and/or aid users of the user device 110 in performing various functions with the user device 110. Applications 112 may be stored in memory 116 and executed using processor 114, and may interact with, or otherwise use, one or more of user interfaces 118, communications interfaces 120, biometric sensors 122, authentication circuitry 124, location sensors 126, and/or ambient sensors 128. Example components of one or more applications 112 include a messaging module 130 configured to send and receive messages (which may be in the form of text, sounds, images, video, etc.) via, for example, electronic text messages (SMS or otherwise), electronic mail (e-mail) messages (accessed via browsers, mail applications, etc.), notifications (such as banners) or sound alerts, etc. A transaction monitor 132 is configured to identify and keep track of financial or other transactions. A user may engage in transactions using, for example, mobile payment and digital wallet services, or via any app and/or device through which a user may make purchases, transfers, deposits, cash advances, etc. The transaction monitor 132 may access such services and applications to obtain transaction data.

A location tracker 134 may be configured to track (using, e.g., one or more location sensors 126) the physical location of the user device 110. The location tracker 134 may be configured to identify the location of the user device at specified points in time or when triggered by identified events, such as the location of the user device 110 when a purchase occurs, when a device is turned on or off, when an application is launched, etc. The location of client 110 may be presumed to correspond with the location of one or more users associated with the user device 110, and/or the location at which an event occurred. In different implementations, location may be determined without using location sensors 126. For example, location of user device 110 may be determined by determining the location of a merchant at which a purchase occurred using a payment app on user device 110. Additionally or alternatively, location may be determined using other sensors, such as ambient sensors 128 used to detect sounds and videos that are recognized as indicative of a certain physical location of the user device 110 (such as a the sounds heard over a public announcement system of a particular landmark such as a train station or airport).

Application 112 may also include a circle manager 136 that is configured to, for example, keep track of authentication circles and their members, goals, milestones, activities, etc. In various implementations, the circle manager 136 may be implemented in addition to or in place of circle manager 158 of provider computing system 150. The circle manager 136 may maintain some or all circle data locally in one or more memories 116 of user device 110, and it may also transmit some or all of the circle data acquired via user devices 110 to provider computing system 150.

Application 112 of user devices 110 may also include an AI engine 138 configured to analyze and combine inputs, make predictions on transactions and goals, generate recommendations on circle formation and member activities, or any other tasks associated with computer learning and/or problem solving. In some implementations, AI engine 138 may include a chat bot that is used to understand human speech captured via a microphone of ambient sensors 128 to understand the situation and/or needs of one or more members (or potential members) of an authentication circle. In some implementations, AI engine 138 may be configured to identify when an authentication circle might be useful or beneficial based on, for example, discussions involving potential members, behaviors of other users, etc. Various artificial intelligence algorithms, logic, neural networks, and/or other tools may be used in implementing AI engine 138 for various desired purposes.

Application 112 may additionally include an external resource module 140 configured to access, retrieve, process, and use data from information sources other than the user device 110. This may include travel websites, merchant websites, and other sources of information on expenses and costs of merchandise or services. In some implementations, the external resource module 140 may access a data source that may provide information on interbank exchange rates, allowing members to better track purchasing power when traveling abroad. In certain implementations, the external resource module 140 may access social networking websites for information on, for example, life events and familial or other relationships to propose formation of authentication circles with particular members or to propose new goals or changes to existing goals, to better predict needs (via, e.g., AI engine 138), etc. The external resource module 140 may also access other sources of information, such as credit agencies, news sources, weather reports, financial institutions, governmental bodies, and other sources, as discussed above.

Although the above discussion identifies a set of modules that perform specified functions, in various implementations, the above (and other) functions may be performed by any module in the system 100. Functions collectively performed by provider computing systems 150 and/or user devices 110 in the above discussion may thus be redistributed (i.e., differently apportioned or distributed) among the modules of the provider computing systems 150 and user devices 110, consolidated into fewer modules, or expanded such that they are performed by a greater number of (separate) modules than illustrated above. Similarly, functions performed by one or more modules of one or more provider computing systems 150 may additionally or alternatively be performed by one or more modules of one or more user devices 110, and functions performed by one or more modules of one or more user devices 110 may additionally or alternatively be performed by one or more modules of one or more provider computing systems 150.

Figure 1C:
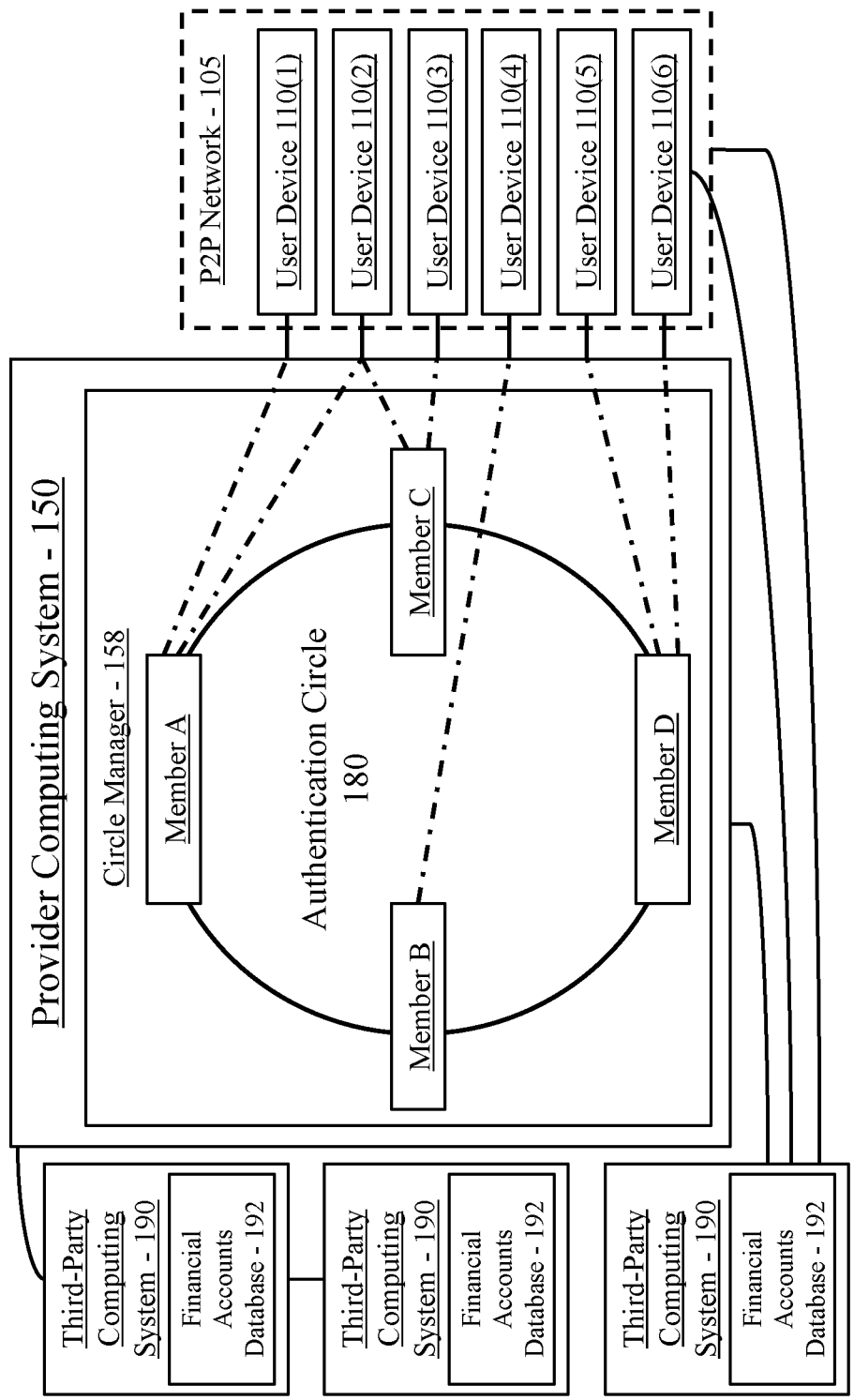
FIG. 1C is a block diagram showing relatedness in an example authentication circle according to example embodiments.

FIG. 1C illustrates an example data flow interaction between user devices 110 that may optionally be associated with a peer to peer (P2P) network 105 (e.g., a social network, a network of devices structured to share resources, interact, communicate, etc., without accessing a separate server, other suitable network, or combination thereof) and components of the provider computing system 120. Various combinations of user devices 110 may be part of different P2P networks 105, with each user device 110 potentially part of zero, one, or more than one P2P networks 105. The provider computing system 150 may communicate with one or more third-party computing systems 190, which may communicate with each other. The one or more user devices 110 may communicate with provider computing system 150 via one or more third-party computing systems 190. The circle manager 158 may be structured to maintain an authentication circle with Members A, B, C, and D, who may be working towards a financial goal or may otherwise be managing joint finances. A person (e.g., Member A) may wish to be part of an authentication circle with one or more persons (e.g., Members B, C, and D) to assist with management of a single financial account or a plurality of financial accounts. Member A may have provided an identifier (e.g., an email address, user ID, profile ID, screen name, contact number, etc.) associated with each of Members B, C, and D to the provider computing system 150, which in turn may have generated and provided requests to join the authentication circle 180 to user devices 110 associated with Members B, C, and D. Each of Members B, C, and D may have received the request to join the authentication circle 180 via one or more of their user devices 110. An indication of acceptance of the request to join the authentication circle 180 may have been received when the recipient, for example, clicked a link, button, image, and/or icon via user devices 110. In other examples, an indication of the acceptance of the request to join the authentication circle 180 may be received when the recipient, for example, audibly accepts the request by voice command (e.g., by speaking "yes, I will join" or other prompt(s) deciphered via AI engine 138 or another component of user device 110 and/or provider computing system 150) and/or by otherwise speaking a word or phrase such that user devices 110 (which may provide audio inputs to provider computing system 150 via a network, in certain implementations) heard, received, and/or interpreted the dictation of the audible response as acceptance or a potential acceptance of the request. In some implementations, acceptance may have been indicated in other ways, such as by specific gesture or submission of a biometric (e.g., by placement of a thumb on a fingerprint reader). In turn, the recipient of the request to join the authentication circle may have been connected to, via the user devices 110, or otherwise associated with, the authentication circle 180 in response to the acceptance received by the circle manager 158.

As depicted in FIG. 1C, Member A may use, or be detectable to, user devices 110(1) and 110(2); Member B may use, or be detectable to, user device 110(4); Member C may use, and/or be detectable to, user devices 110(2) and 110(3); and Member D may use, or be detectable to, user devices 110(5) and 110(6). A device may be used by, or may detect, a member even if the device does not belong to the member. For example, user device 110(2) may belong to one spouse (e.g., Member A) but may detect a voice signature of another spouse (e.g., Member C). Similarly, user devices 110(5) and 110(6) may belong to Member D's parents, but may detect Member D because the three live together. In various implementations, the associations between devices, members, networks, etc., may be maintained in an account database of provider computing system 150.

If a user device 110 is already known to provider computing system 150 (e.g., the user device 110 is associated with a unique ID known to the provider computing system 150 as a result of prior transactions) such that members can be identified and authenticated to provider computing system 150 by virtue of a prior relationship, members may not be required to provide additional identification or account information to provider computing system 150. Once authenticated, members may be provided with an integrated view of a plurality of accounts linked to the authentication circle 180 to, for example, assist in managing one or more financial and/or non-financial accounts. The integrated view (examples and portions of which are represented in FIGS. 8-21) may display a plurality of accounts as a group, at a group level, or according to a filter taking into account the specific financial situations of each member in the authentication circle 180. Different persons may be provided with different integrated views that provide different information based on their roles, responsibilities, and permissions in the circle. For example, a young child or spectator may in certain versions be provided with information on his or her progress towards a goal, but not the balances in linked accounts of the authentication circle 180.

Figure 2A:
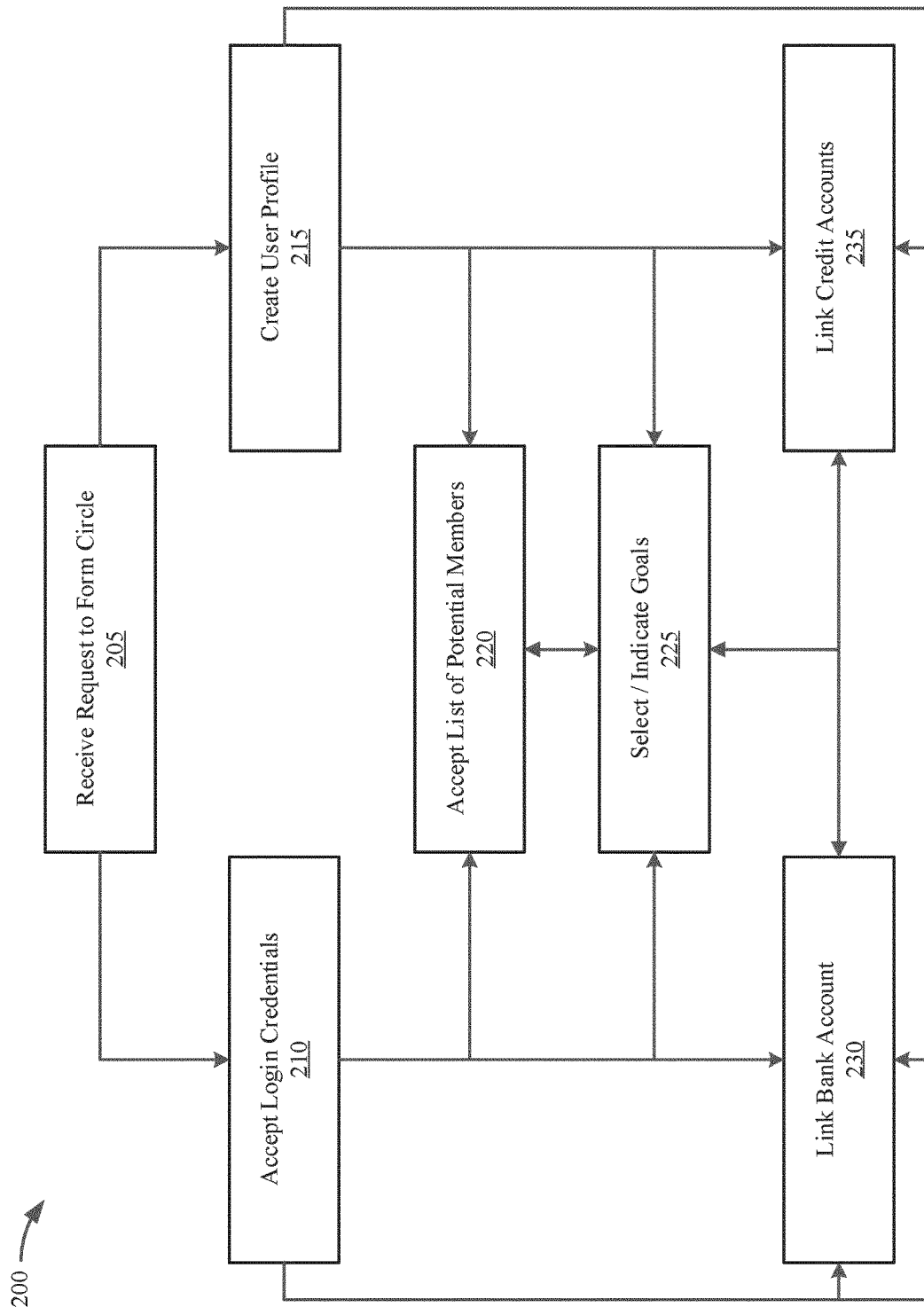
FIG. 2A depicts an example method for forming an authentication circle according to example embodiments.

Referring to the example process 200 depicted in FIG. 2A, at 205, the provider computing system 150 may receive a request to form an authentication circle. The request may be from an existing customer or subscriber of the provider (e.g., if the provider is a financial institution, the request may be from an account holder of the financial institution, or if the provider is a social network, the request may be from a member of the network, etc.). Alternatively, the request may be from a new customer or subscriber of the services of the provider that maintains the provider computing systems 150. In some implementations, the provider computing system 150 receives a request from a user device 110 via a website or other application 112 running on the user device 110. In some implementations, the provider manages the authentication circle but does not administer, hold, or manage any accounts. In certain implementations, the provider administers, holds, or manages one or more accounts of one or more members of the authentication circle, but none of those accounts are necessarily linked to the authentication circle. In some versions, the provider holds one or more accounts, while other accounts are administered, held, or managed via one or more third-party computing systems 190.

In certain implementations, a request received at provider computing system 150 may be initiated by the user device 110 in an automated fashion, without action by a user. For example, a message may be received by the provider computing system 150 from a user device 110 requesting that the provider computing system 150 propose or recommend to the user that an authentication circle be formed. Such a request may be based on, for example, observations or predictions by one or more user devices 110, and/or based on data from one or more user devices 110. Observations and predictions may be made (by, e.g., user devices 110 and/or by provider computing system 150) via, for example: messaging module 130 and/or messaging module 160, which may have access to, for example, messages of the user; transaction monitor 132 and/or transaction monitor 166, which may be able to access, for example, a purchase history of the user; location tracker 134, which may have access to a location history of the user; circle manager 136 and/or circle manager 158, which may access other circles in which the user or someone related to the user is a member, and the goals in such circles; A engine 138 and/or AI engine 168, which may analyze observations or other inputs (such as the behavior of similarly-situated persons) to make predictions about the needs and desires of one or more users; and/or external resource module 140 and/or external resource module 172, which may access information related to one or more users available from other sources, such as social networking sites, travel sites, etc. Observations on which the request to provider computing system 150 may be based include, for example, posts on blogs or social networking pages, certain purchases in a user's purchase history, discussions with friends and family (verbally or via electronic messaging such as texts and e-mails), locations (e.g., visits to particular stores), etc., that suggest one or more life events (such as being pregnant, giving birth, or planning a trip with family and/or friends) or certain needs and desires (such as saving for one or more expenses).

In various implementations, a proposal or recommendation to form an authentication circle may be provided by application 112 without involvement of the provider computing system 150. For example, a user device 110 may, based on the above data (e.g., observations and predictions), recommend to the user, via the application 112, that the user form an authentication circle for an identified purpose. The user may, via application 112, request additional information and/or accept a proposal or recommendation, and the user device 110 may communicate with the provider computing system 150 when it is time, for example, to set up a circle and invite one or more members.

If a user is already associated with the provider and has an account because, for example, the user is a customer of the provider, has subscribed to services offered by the provider, or has already set up a user account, at 210, applications 112 may accept a user's login credentials and provide the credentials or biometrics to the provider computing system 150, or authenticate the user and indicate to the provider computing system 150 that authentication was successful. If the user is not already associated with the provider or does not otherwise have an account set up, at 215, the user may set up a new account at the provider computing system 150 via application 112. In some implementations, a user with an existing account may set up an authentication circle with the same or different login credentials.

At 220, the provider computing system 150 may accept, via application 112, a list of potential members. One or more potential members may be identified by the user via application 112, and/or one or more potential members may be proposed or recommended by the provider computing system 150 and/or by the application 112. Potential members may be proposed or recommended based on, for example, the relationship of the user with the potential member (e.g., a parent may be a potential member for a child who is saving for an expense); communications with the potential member (e.g., a friend or family member may be a potential member based on discussions about traveling together); prior membership in authentication circles in which the user is also a member (which may suggest similar goals or that finances are interrelated or tied together somehow); etc. Authentication circles may be short-lived (e.g., expiring after a specified time or upon detection of a certain event or achievement of a goal), or may persist indefinitely until deactivated or deleted.

The user may, at 225, define, select, or otherwise indicate goals via application 112. The goals (or shells thereof or templates therefor) may be proposed by the provider computing system 150 via application 112, or by application 112 directly. The application 112 may be used to identify type of goal (e.g., saving for a purchase, planning for a trip, etc.), related amounts (e.g., budgets, maximum allowed expenditures, etc.), expected contributions by members (e.g., percentages of costs, fixed amounts, or actual costs borne), etc. At 230 and 235, application 112 may be used to enter information identifying one or more bank or credit accounts to be added to the authentication circle. Application 112 may allow a user to restrict account information, such that all (or a subset) of members are not able to access information related to the accounts (e.g., account balances, the existence of an account, and/or its linkage to the authentication circle). As further discussed below, accounts added to an authentication circle may be usable by one or more specified members for financial contributions, funds transfers, etc. As indicated in FIG. 2A by the arrows, not all steps are necessary (at least initially) to set up or request a new authentication circle, and the order of steps can be modified as desired or otherwise modified in alternative implementations.

Figure 2B:
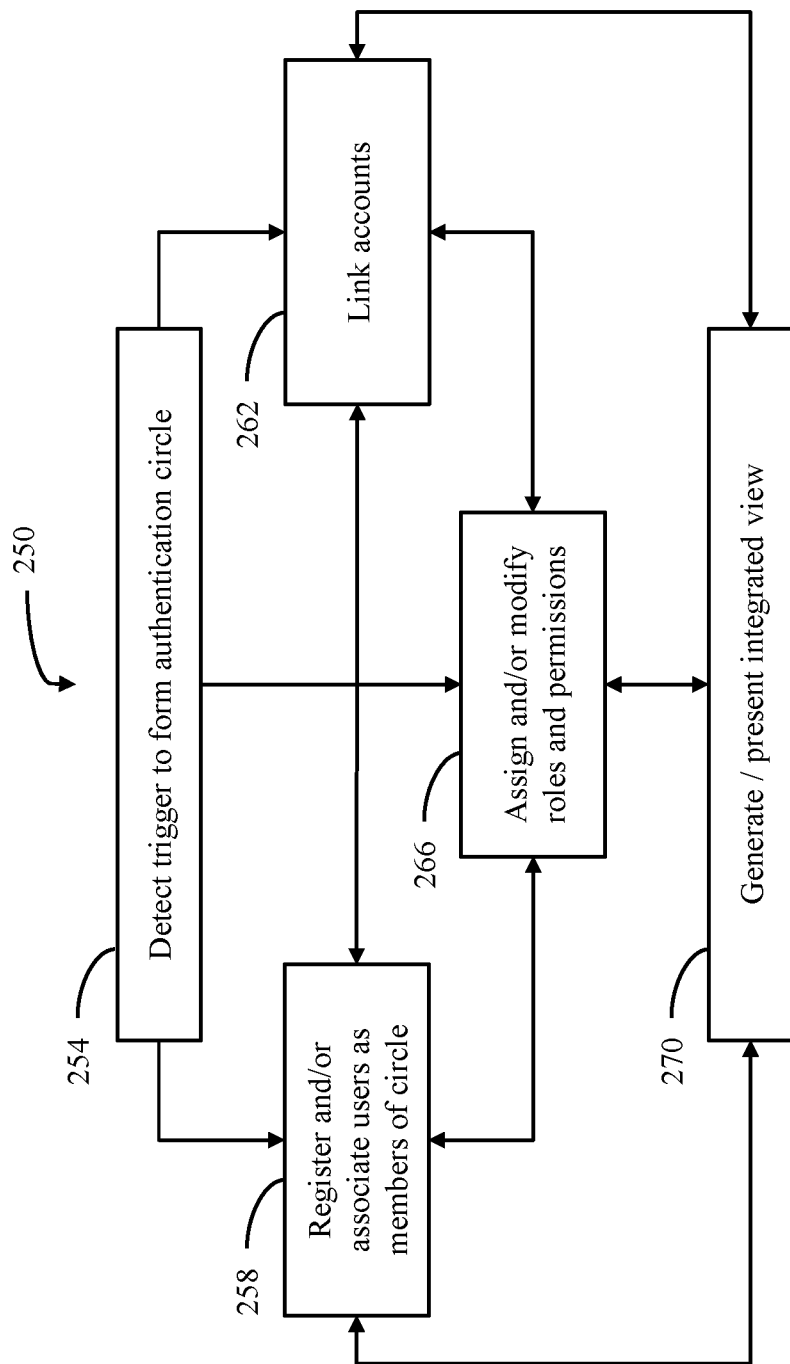
FIG. 2B is a flow diagram of an example method of managing an authentication circle according to example embodiments.

FIG. 2B provides a data flow 250 for providing an authentication circle according to example embodiments. At 254, a trigger to form an authentication circle is detected. In various implementations, the trigger may be an express trigger, such as a spoken request (e.g., "I would like an authentication circle") captured via ambient sensors 216 or a request submitted via a client application 230 or website of the service provider via user interfaces 206. In certain embodiments, the trigger may be inferred, such as by detection of an event detrimental to or otherwise affecting health or safety, such as a sound signature of a fall (e.g., a crash or thud), and/or identification of a relevant issue in conversations among users (and/or conversations with a robo-advisor via user devices 106), such as a discussion of the event and/or relevant needs or desires.

At 258, users may be registered and/or associated with an authentication circle. This may include the users identifying a method of authentication (e.g., login credentials, biometric data, etc.) if the user does not already use a method of authentication to access accounts at the provider computing system 150. At 262, one or more accounts may be linked with the authentication circle. The accounts may be identified by the account owners, who may provide authorization and, as needed, credentials to be used by the provider computing system 150 to access the accounts (internally or externally via third-party computing systems 190). In some implementations, the provider computing system 150 may access external accounts via API calls to corresponding third-party computing systems 190. For example, provider computing system 150 may make API calls to other financial institutions, social networking systems, etc. In certain implementations, the provider computing system 150 may receive security access tokens from the third-party computing systems 190 once the user has authorized access (directly with the third-party computing systems 190 and/or via the provider computing system 150) to accounts administered via the corresponding third-party computing systems 190. To gain access, the security token may then be transmitted to corresponding third-party computing systems 190 by provider computing system 150 to authenticate the provider computing system 150 and gain access to account data that is to be, for example, incorporated into a dashboard of the authentication circle.

At 266, roles and permissions may be assigned and/or modified for each member. In various embodiments, assignments and modifications to roles and permissions may be made by one or more members who are designated as circle administrators. Each circle administrator may be permitted, by one or more members who are owners of linked accounts, to grant or revoke access of other members to the linked accounts. Assignments and modifications of roles and permissions may alternatively or additionally be made by owners of linked accounts, at least with respect to owned linked accounts. Permissions may range along a spectrum that includes, for example, no access, view-only access, and full access.

At 270, an integrated view/dashboard may be generated. In various versions, the dashboard may be customized by the provider computing system 120 and/or by the application 112 running on user devices 110 for each member depending on roles and permissions. For example, the integrated view/dashboard may list all linked accounts for all members, but may not provide account details (balances, transactions, etc.) to all members. Similarly, the integrated view/dashboard may list all accounts and account details, but may only provide certain members with certain functionality, such as executing transactions (e.g., making payments and balance transfers) and/or making changes to account settings and personal information. The dashboard may also be modified as new members are added or removed (e.g., at 258), as accounts are linked and unlinked (e.g., at 262), as roles and permissions are assigned or modified (e.g., at 266), etc.

The arrows in FIG. 2B indicate that different steps may be performed in different sequences and performed multiple times after other steps are performed. In some implementations, an authentication circle may be established upon detection of the trigger (at 254). In certain embodiments, once a trigger is detected at 254, a circle may be formed and one or more users may be registered or otherwise associated with the circle (at 258). In certain versions, once a trigger is detected at 254, a circle may be formed and one or more accounts may be linked to the circle (at 262) if, for example, the circle is to be formed on behalf of a user who has authorized authentication circles on his or her behalf. In certain versions, once a trigger is detected at 254, a circle may be formed and one or more initial (e.g., default but subsequently modifiable) roles or permissions may be assigned (at 266) if, for example, AI engine 138 has determined (or it has otherwise been determined) which user would be administering, assisting/assisted, managing, spectating, etc., in the authentication circle (e.g., based on an analysis of conversations to determine, e.g., which members are adults and/or which members are children or infirm under the care of others). In other implementations, the authentication circle may be established only after users are registered/associated as members (at 258), after one or more accounts are linked (at 262), and/or after roles and permissions of at least one potential members has been determined (at 266).

Figure 3:
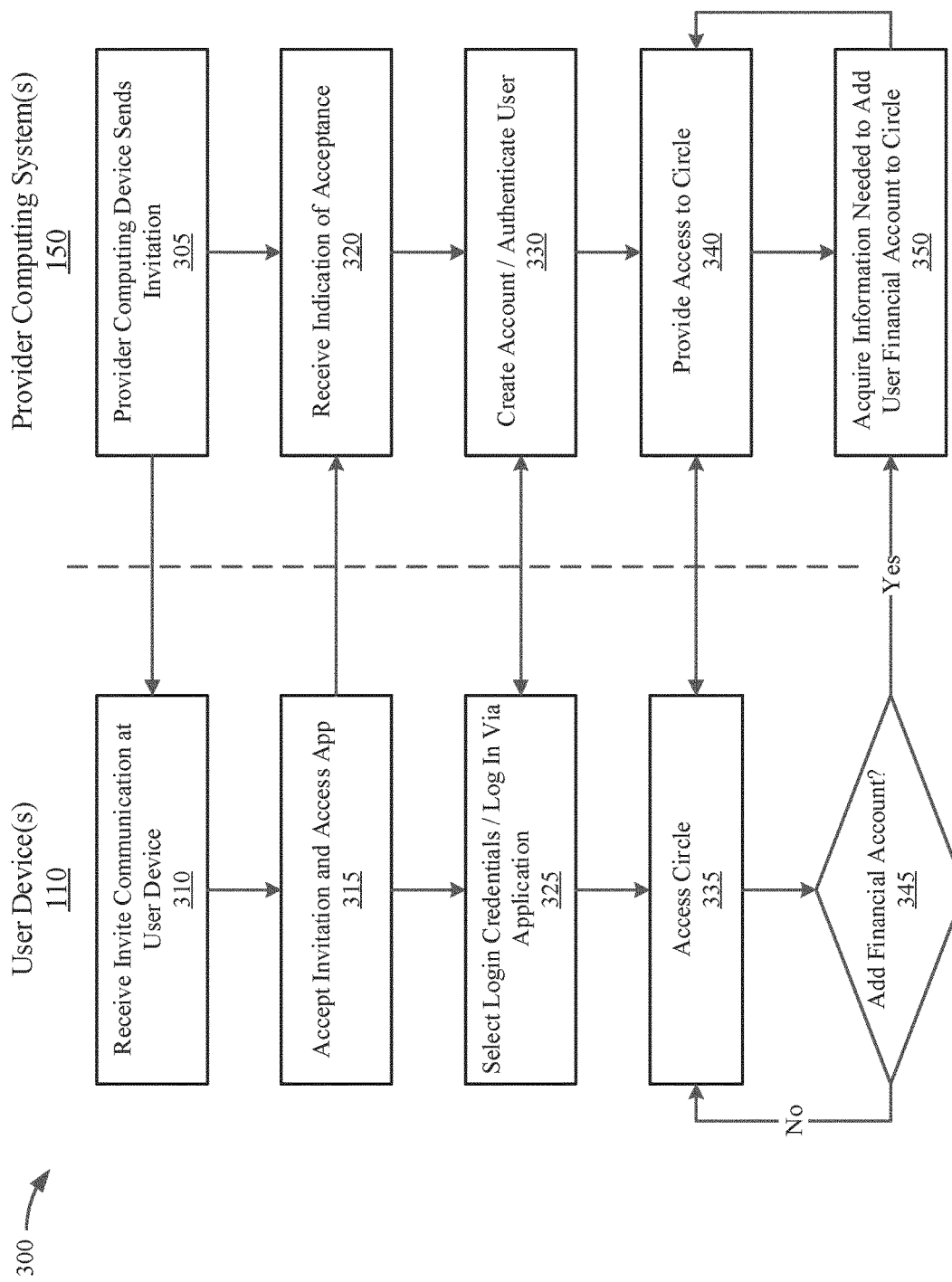
FIG. 3 depicts an example method for interaction of the provider computing system and user devices of FIG. 1 in forming an authentication circle according to example embodiments.

Referring to the example process 300 depicted in FIG. 3, once an authentication circle has been requested or set up by a user, at 305, the provider computing system 150 may (via, e.g., circle manager 158 and messaging module 160) generate and transmit invitation messages ("invites") to one or more potential members. Such an invite may be sent as, for example, a text message, an e-mail message, a pop-up notification, a robocall, etc., and at 310, one or more user devices 110 receive the invite. The invitation message may identify, for example, the authentication circle (e.g., "You are Invited to Join a Trip Planning Circle!"), one or more other members or potential members (e.g., a person benefiting from the circle or a person with whom expenses are to be shared for, e.g., a trip), and/or one or more goals or potential goals (e.g., sharing expenses or helping someone save for an expenditure), etc. At 315, the invite, in various implementations, may allow a potential member to easily accept (join) or reject (not join) via one (or a limited number of) user entry(ies), such as one "click" or one selection (via touchscreen or otherwise). The user may accept (or reject) an invitation via application 112, or acceptance (rejection) of the invitation via another application (e.g., a web browser, a messaging application, etc.) may launch application 112 to allow the member to view more details about the authentication circle.

At 320, the provider computing system 150 receives the indication of acceptance/rejection. In some implementations, indicating acceptance or rejection is analogous to a user "liking" a post on a social networking site (such as Facebook). The potential member need not enter additional information to accept or reject the invite. This may be accomplished, for example, by transmitting a short response (e.g., sending a reply text or e-mail with "yes" or "no"), by entering a numeral on a phone in response to a robocall, or by clicking on a hyperlink to, for example, a unique URL generated by the provider computing system 150 that, when selected, indicates the recipient's acceptance or rejection.

At 325, if the user accepting (or rejecting) an invitation does not have an account with the provider, the user may select login credentials (e.g., a username and password) to register for an account. If the user has an account, the user may log in via application 112 using existing or new credentials. At 330, the provider computing system 150 may create an account if the user does not have one, or may authenticate the user if the user has an account. At 335, a member may access a newly-joined circle via application 112, and at 340, provider computing system 150 may communicate with user device 110 to provide the member with access to the circle. At 345, while accessing the circle, the member may choose to add a financial account to be used in association with the circle, in which case, at 350, the provider computing system 150 may acquire the information needed to add the financial account to the circle.

Figure 4:
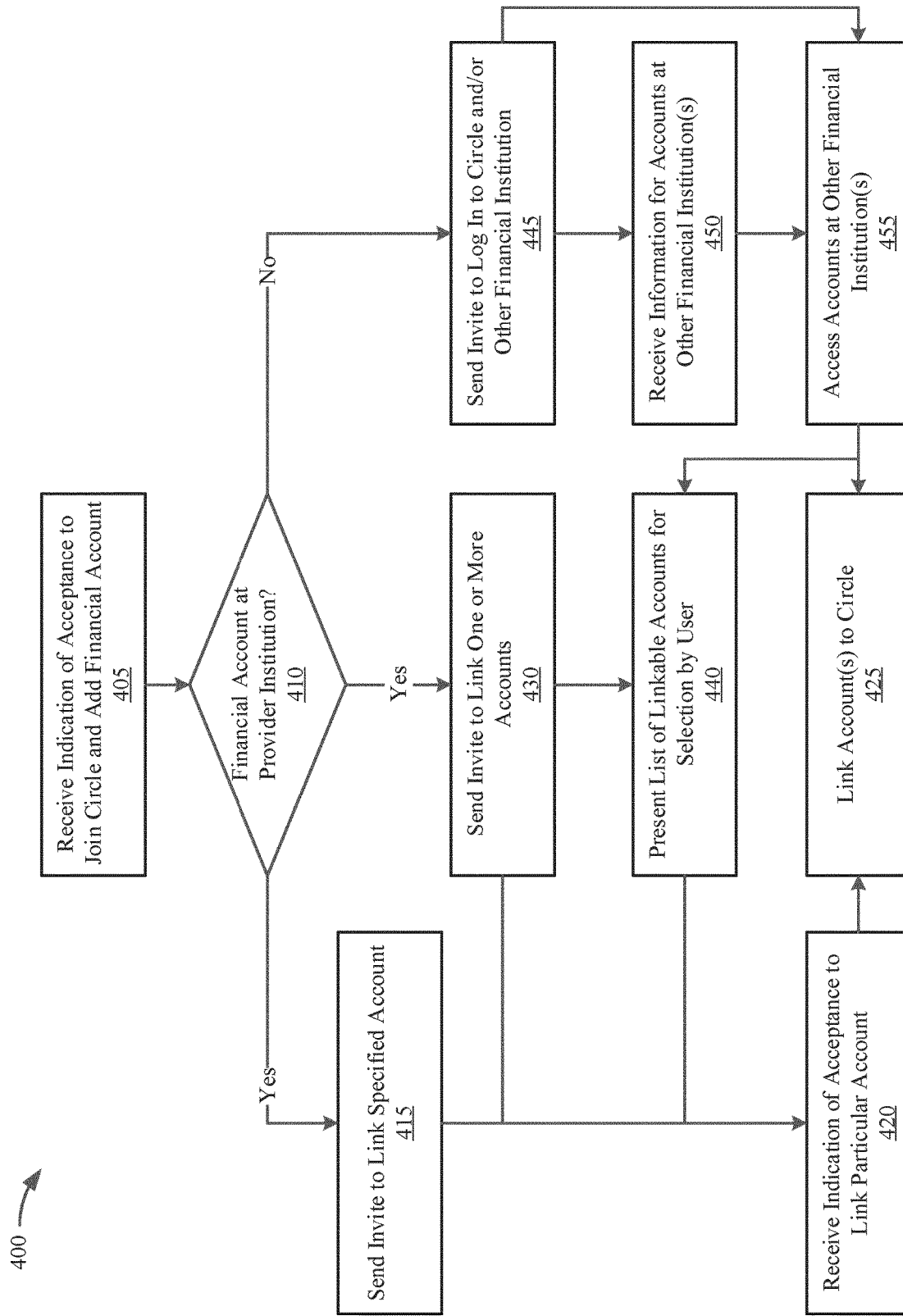
FIG. 4 depicts an example method for linking financial accounts to authentication circles according to example embodiments.

Referring to the example process 400 depicted in FIG. 4, at 405, the provider computing system 150 (via application 112) receives an indication of acceptance to join the circle and a desire to add a financial account. In various implementations, at 410, the steps involved in adding an account depend, at least in part, on whether the account to be added to the circle is held by the provider (assuming the provider which maintains the provider computing system 150 is itself a financial institution or is partnered or otherwise associated therewith, or otherwise administers accounts linked to the authentication circle). If the account to be added is held by the provider, the account may already have been previously set up ("preauthorized") for use in authentication circles which the member joins. An account may previously be setup or preauthorized because, for example, the member: previously used the account with other authentication circles generally; previously used the account with other authentication circles having an overlap in membership; when accessing the financial account via an application, specifically identified all (or a subset) of his or her accounts as being available to authentication circles; previously registered for authentication circle services (without necessarily identifying or joining a specific circle) and linked one or more accounts when registering for the services; etc.

The provider computing system may, at 415, send an invite (via, e.g., messaging module 160) to link a particular account to the circle. A particular account may be specified, for example, using an account number (or a portion thereof, such as the last four digits), a nickname for the account used by account holder to identify the account, the financial institution, and/or an indication of type of account (e.g., checking, savings, credit, etc.). In some implementations, an account may be linked with one (or only a minimal number of) user entries. For example, a user may accept that the specified account be linked (i.e., added to the user circle so that, e.g., its balance may be considered in determining progress towards a financial goal, to allow balance transfers to and from the account, to charge purchases, etc.) in a "one click" fashion, without the need to enter additional information to accept or reject the account linkage. Example one-clicks include selecting a link to "accept." In some implementations, such a link may, on the back end, result in, for example, transmission of a short reply message with a term like "yes"/accept or "no"/reject. Similarly, such a link may be to a unique URL that was generated by the provider computing system 150 to inform the system 150, when "visited" or otherwise accessed, that the user accepts (or rejects) the invitation. At 420, the provider computing system 150 receives (via, e.g., messaging module 160) an indication of acceptance (in whatever form it was transmitted), and at 425, links or otherwise associates (via, e.g., account linker 162) the financial account with the authentication circle.

If the account to be added to the circle is held by the provider but is not preauthorized, or is one of multiple accounts that have been preauthorized or otherwise available for association with a circle, the provider computing system 150 may, at 430, generate and send (via, e.g., messaging module 160) an invite that does not specify one and only one account to be linked in a "one click" fashion. In certain implementations, the invite includes several "accept" links/options which may be selected by the user, with one accept link for each selectable account, and/or one accept link for selecting multiple or all accounts. The provider computing system may, at 420, receive an indication of acceptance to link one or more specified accounts (or all accounts) based on which "accept" link was selected.

In some implementations, at 440, the invite may include a link to a separate presentation of one or more accounts that may be linked to the circle. The link may be, for example, to a webpage that lists accounts that may be linked, or the link may cause a reply message to be sent (e.g., via application 112) to the provider computing system 150 which, in response, returns a list of accounts via another electronic message or for presentation by application 112. The list may be, in some implementations, accessible following verification of the user device, or authentication of the user via, for example, login credentials (such as a username, a password, and/or a biometric entry). The user may then select, via application 112, one of the listed accounts. At 440, the application 112 may present a list of linkable accounts for selection by the user. The provider computing system 150 may then, at 420, receive an indication of which accounts are to be linked, and at 425, link or otherwise associate the selected account(s) to the circle.

If one or more (external) accounts held at one or more financial institutions separate from the provider are to be linked, the provider computing system 150 may send, at 445, an invitation to log into the circle (via application 112) to identify such external accounts. The provider computing system 150 may then, at 450, receive information sufficient to allow the provider computing system 150 to access the external accounts (such as user login credentials for one or more accounts at the other financial institutions). At 455, the provider computing system 150 may access the external accounts (via an API, SDK, etc.), and at 425, link one or more of the accounts (as selected via application 112) to the circle. The linked accounts continue to be maintained by the other (external) financial institutions, but information related to the linked accounts (such as balance information) can be accessed, and balance transfers involving the one or more external accounts can be initiated by the provider computing system 150.

In some implementations, at 445, the provider computing system 150 may send an invite with a link to provide login credentials for the other financial institution without logging into the circle, after which the provider computing system 150 may access the external accounts (at 455) and link selected accounts (at 425). In other implementations, if one or more external accounts are known to the provider computing system 150 (e.g., if the accounts were previously used for other circles, or otherwise registered with the provider), the provider computing system 150 may send an invite identifying one or more accounts which may be selected for linkage, for example, in a one-click fashion.

Figure 5:
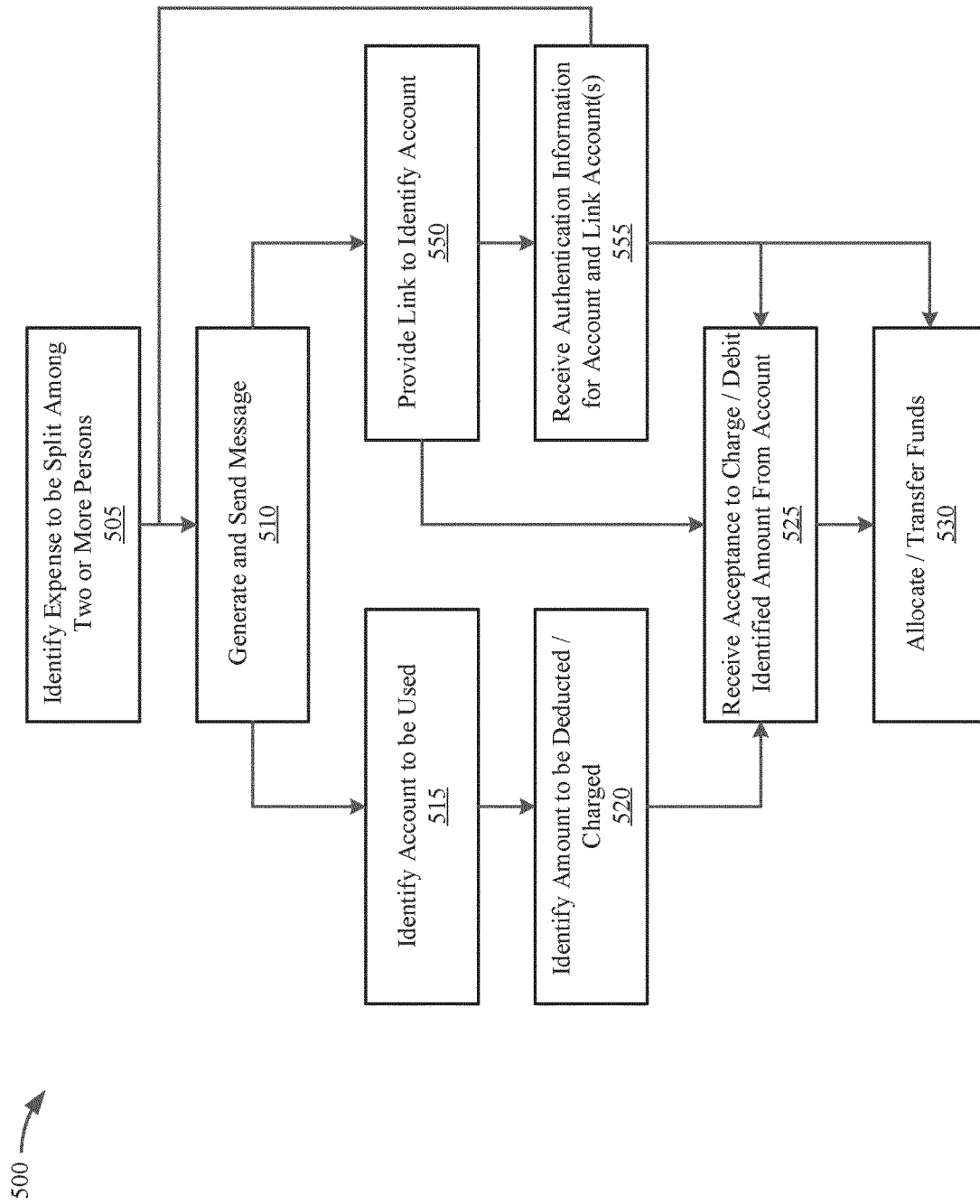
FIG. 5 depicts an example method for splitting expenses among members of an authentication circle according to example embodiments.

In some situations, a person associated with an authentication circle may wish to split a one-time or ongoing expense (or ongoing expenses) with one or more other members of a circle. Referring to FIG. 5, at 505, the provider computing system 150 and/or user device 110 may identify an expense to be split among two or more persons. In some implementations, the expense may be identified by a user via application 112. For example, once an expense is incurred using an account that is linked to a circle, a user may launch application 112 to identify the expense as an expense to be split with one or more other members of a circle. The user may also identify all, or a subset of all, the members of the circle with which the user wishes to split the expense. The user may also identify percentages or fixed amounts to be split with one or more specified members of the circle. In certain implementations, application 112 may be running in the background, and upon detection of an expense or event, may generate a notification (e.g., pop-up notification, banner message, etc.), or a push notification may be initiated via provider computing system 150 and sent to user device 110, with a link or icon that, when selected or activated, brings application 112 to the foreground and/or performs particular actions.

In certain implementations, a user is able to identify an expense which has not been incurred, but which the user wishes to incur (or is otherwise considering) if others agree with the expense and/or agree to split costs. For example, a user at a store may use application 112 to identify a potential purchase. In some implementations, the purchase may be identified by inputting information on the purchase to be shared with others. For example, a user may enter "Two nights at City Hotel at $100 a night" or "Brand BB Stroller, $100 from Store BB." Alternatively or additionally, the user may take a photograph relevant to the purchase to be shared with other members of the circle (e.g., a photograph of City Hotel and/or its surroundings, a map with the location of City Hotel marked, one or more photographs of the stroller, etc.). The photograph alone may be shared (as-is or modified by cropping, rotation, color adjustment, etc.). Additionally or alternatively, application 112 may (via, e.g., AI engine 168, and/or AI engine 138 once the photograph is transmitted to the provider computing system 150) analyze the photograph and recognize locations, items, etc., that are in the photograph and propose to the user one or more potential purchases to be split with other members. For certain purchases, application 112 may propose a purchase for selection by the user, and also request additional information (such as number of nights, quantity of an item to be purchased, discounts, promotions, and coupons, etc.).

In certain implementations, a user may identify a purchase by scanning a symbol, such as a QR code or logo, that is found on a brochure, tag, sign, map, etc. Application 112 may (via, e.g., external resource module 172) retrieve information on the symbol to identify a potential purchase to be shared with one or more other members of a circle. Application 112 may propose to the user one or more potential purchases to be split with other members based on recognized symbols. For certain purchases, application 112 may propose a purchase for selection by the user, and also request additional information (such as number of nights, quantity of an item to be purchased, discounts, promotions, and coupons, etc.).

User device 110 (via application 112) and/or provider computing system 150 may, at 510, generate a message (via, e.g., messaging module 130 and/or messaging module 160) to be sent to one or more other members with which the expense is to be split. The message may be, for example, a text, e-mail message, or pop-up/push notification with information (text, sounds, images, etc.) to be presented via any user device. In various implementations, the message may be structured to be text and/or imagery to be sent to a smartphone/smart glasses/smart watch, and/or a spoken message to be sent to smart speakers, with information on one or more potential purchases. The message may include a link to access the circle and obtain more details on the purchase (e.g., total costs, features of hotel accommodations or the item(s) to be purchased, amount to be contributed by the user, etc.) and, if desired, indicate approval to split costs for the expense. In some implementations, specific purchases or classes of purchases may be pre-authorized.

Additionally or alternatively, the message may, at 515, identify an account that may be used to help pay for the purchase. The message may also provide the member with a one-click link that, if selected by the member, directly (e.g., via a unique URL of the provider) or indirectly (e.g., via a message from user device 110 to provider computing system 150) indicates to the provider computing system 150 that the member approves splitting of the cost of the purchase. If more than one account is linked to the circle or otherwise known to be a potential source of funds, the message may identify multiple accounts, and a one-click link for each account to allow the member to simultaneously approve of a purchase and indicate which account(s) should be used for the member's share of the expense.

In various implementations, the message may include a list of selectable accounts. The list of selectable accounts may be provided in the message, or it may be provided, for example, on a page for which a link is provided in the message. A member receiving the message may be able to select an available account via, for example, a drop-down menu or by another mechanism.

In some implementations, at 520, the message may additionally or alternatively identify one or more amounts to be deducted from an account (such as a checking account) or charged to an account (such as a credit card) of the member agreeing to split expenses. For example, the message may include a one-click selection of a certain percentage (e.g., 50%, 33%, 25%, 10%) or certain fixed amount to allow the member to simultaneously approve of a purchase and indicate what amount is to be contributed by the member towards the expense. In certain implementations, each one-click link for each potential contribution amount (i.e., for each share to be paid) is associated with an account to be used for the contribution, and if multiple accounts are available, two or more links may be provided for the same amount, with each link associated with a different account (e.g., 15% from Account 1, or 15% from Account 2). In some implementations, links may be provided to use multiple accounts for a contribution, allowing the member to, for example, select a link to contribute 25% of an expense using two separate accounts (with the same proportion from each account, or specified different proportions from the multiple accounts to be used for splitting the costs of a purchase. In certain implementations, the message may provide the member with a prompt to allow the member to specify a specific amount that can be different from options presented. For example, an "accept expense and specify custom amount" link may launch application 112 and prompt the member to enter an amount to be contributed and click on "accept" to send the approval and specified amount to provider computing device 150 for processing.

Additionally or alternatively, the message may include a list of selectable amounts to be contributed, or a text box (or other mechanism) for acceptance of a user entry of the amount to be contributed. The list of selectable amounts may be provided in the message, or it may be provided, for example, on a page for which a link is provided in the message. A member receiving the message may be able to select an available amount via, for example, text entry or a drop-down menu or by another mechanism.

At 525, the user device 110 and/or provider computing device 150 receives an acceptance to split the expenses. At 530, the provider computing system 150 may allocate a share of the expense to the member. In some implementations, the funds are not immediately acquired from the member, but rather at a later date (e.g., when a payment is to be made to a credit card account used to make the purchase). When the contribution is to be fulfilled, in some implementations, the funds may be transferred from (or charged to) a specified account linked to the circle, either immediately upon approval, shortly after approval, or at another time. In some implementations, an alert may be generated and provided to the user (via, e.g., application 112) to indicate when one or more members have agreed to split expenses, when a funds transfer has been completed, what amounts have been agreed upon by other members, etc.

In various implementations, there may be no known account available for use by a member to split an expense. This may be because, for example, the person receiving the message to split expenses has not linked an account to the circle. In some implementations, the message may have been directed to a user who is not a member of a circle with the person making the purchase. The message may, at 550, provide a link to allow the recipient to identify an account if the user approves of splitting expenses. In some implementations, the message may identify one or more financial institutions at which an account may potentially be held by the member. The message may identify, for example, a financial institution associated with the provider, or one or more other financial institutions at which users commonly hold accounts. At 555, the link may allow the recipient to provide authentication information (e.g., login credentials and/or account information, such as a bank account or credit card number) to access accounts at a particular financial institution. At 525, the provider computing system 150 receives an indication that the user approves the contribution. The approval to make the contribution may be considered to have been received either by virtue of the user providing the requested information needed to identify an account be used, or via a separate acceptance (e.g., by clicking on an "accept" button after account information or login credentials are provided). At 530, the funds may be subsequently allocated and/or transferred to help cover the expense.

When it comes to sharing expenses, it is often cumbersome, time consuming, and resource intensive for a user to, for example: find and identify others with whom an expense is to be split, especially if the expense is to be split among a larger number of persons; determine and allocate amounts to be contributed by each person (and have a potentially awkward discussion about who should contribute and who should not or cannot contribute); add or subtract persons who are to contribute to a particular expense (which tends to affect the amount that should have been, or that should be, contributed by one or more others); and/or set conditions on how much is to be contributed by each person (e.g., a certain percentage not to exceed a certain maximum amount).

In various implementations, potential persons with whom one or more expenses may be split can be predicted or otherwise determined by user devices 110 and/or provider computing systems 150. For example, user devices 110 and/or provider computing system 150 may use such factors as the locations (which may be, e.g., detected using location sensors 126 and/or based on transactions in which a user device 110 is involved) of one or more user devices 110 to propose that certain purchases or expenses be split among one or more persons. In some implementations, provider computing system 150 and/or user devices 110 may use the timing and/or type of one or more expenditures (which may be obtained, in some implementations, by accessing a receipt, bill, or invoice) to propose that certain purchases or expenses be split among one or more persons. Additional factors may be obtained via an API integration with social networking websites. For example, at a restaurant, when a waiter brings the check, the provider computing system 150 may be configured to permit a member to take a photo of the check. Optical character recognition and structured/unstructured data processing may then be applied to determine that the check pertains to multiple people, not simply the payer. Based on such information, provider computing system 150 may identify additional potential payers based on, for example, (1) an identification of nearby user devices 110 and (2) an API integration with a social networking website to determine whether nearby user device 110 belong to friends of the payer i.e., to determine which of the friends from the social network may be nearby and therefore may be splitting the check).

Figure 6:
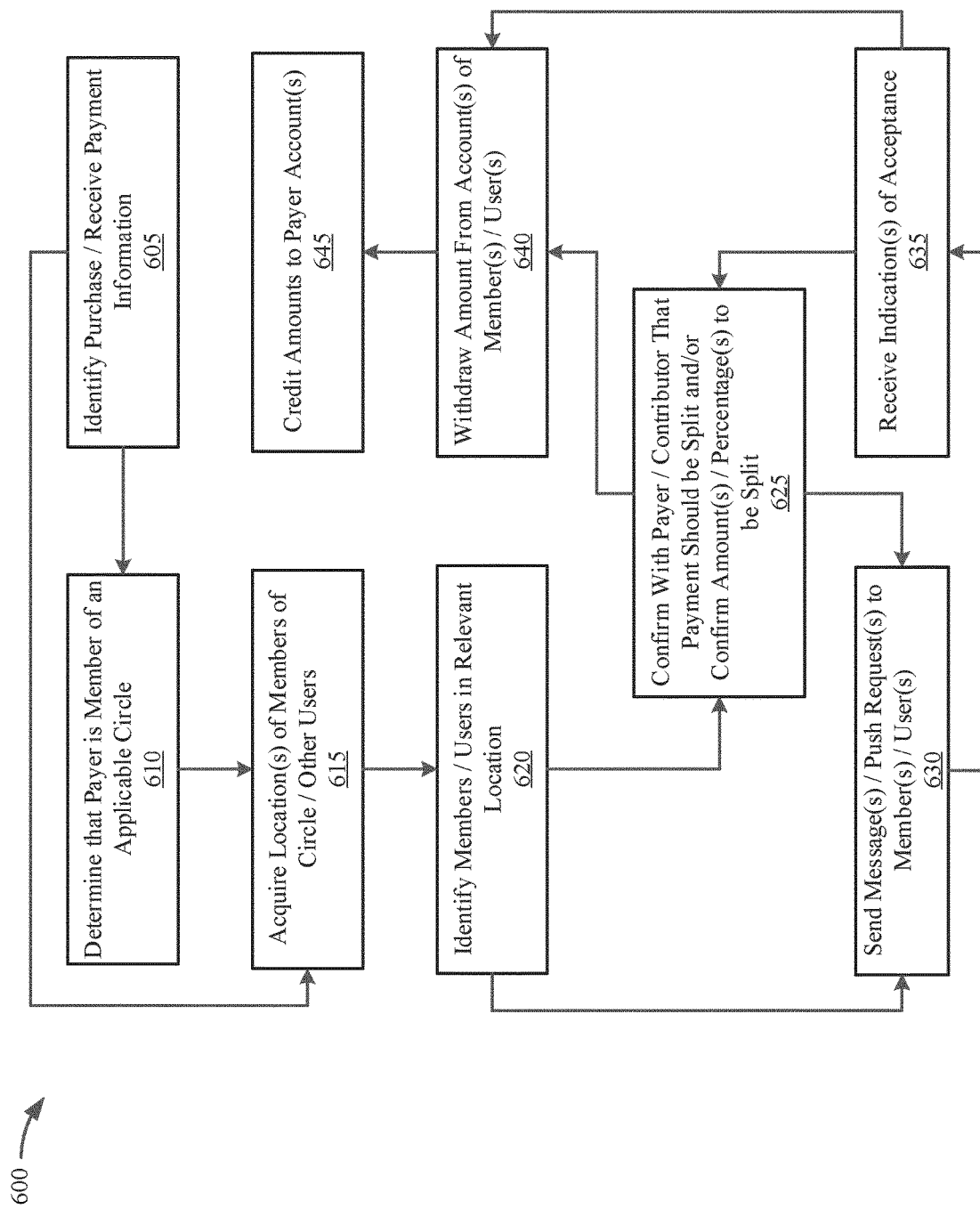
FIG. 6 depicts an example method for splitting expenses with members of authentication circle based on location of the members of the authentication circle according to example embodiments.

Referring to the example process 600 in FIG. 6, at 605, provider computing system 150 and/or user devices 110 may identify a purchase and/or receive information on a payment made for a purchase via transaction monitor 132 and/or transaction monitor 166. For illustrative purposes, a potential example use case of members dining at the same restaurant or checking into the same hotel may be used to aid the discussion. In such use cases, the payment may be for a meal at a restaurant or for paying for one or more rooms at a hotel.

At 610, provider computing system 150 and/or user device 110 may optionally determine if the payer is a member of an applicable authentication circle. The authentication circle may be deemed applicable if it, for example, includes a goal related to sharing expenses (as compared to being limited to a goal of saving for purchases). For example, in some implementations, a purchase may be flagged by transaction monitor 132 and/or transaction monitor 166 when, for example, the purchase is for an expense related to a goal shared by members of a circle (e.g., for a hotel during a trip by members of a circle).

At 615, the provider computing system 150 (via, e.g., user/transaction locator 164) may determine the location of one or more members of the relevant circle and/or the location at which the payment was made (e.g., presence at the same restaurant). In some implementations, locations are acquired only if it is determined that the payer is a member of an applicable circle, while in other implementations, location is acquired for users with devices identifiable to the provider (e.g., because the user has an account with the provider, the user is registered with the provider, the user is a member of another circle with other members and is thus known to the provider, etc.), even if the user is not a member of a circle or, even if a member of a circle, not in a circle with the payer. In some implementations, the locations are acquired via location trackers 134 (which may obtain location data using location sensors 126) of user devices 110. At 620, the members of the circle or other users in a relevant location are identified. A location may be relevant if, for example, the location indicates that other members/users are in the vicinity of the payer (e.g., at the same restaurant, hotel, airport, or other location).

Using an electronic message (which may allow for one-click submission of acceptance or other information as discussed above), the provider computing system 150 and/or user device 110 may, at 625, confirm with the payer that the payment (e.g., cost of a meal) should be split with the specified nearby members/users (who may be identified by name, e-mail address, or other indicator), and/or that the cost is to be split according to specified amounts (e.g., split evenly). Additionally or alternatively, the provider computing system 150 and/or user device 110 may, at 630, push to the identified members/users a request to contribute to the costs of the purchase. The request may be, in some implementations, in the form of a one-click electronic message, as discussed above. The request may also be via application 112, which may provide a notification or other alert to the user of the user device (e.g., via a banner on the display and/or an audible alert).

At 635, the user device 110 and/or provider computing device 150 may receive an indication of acceptance (in response to the message/pushed request) that the member/user may wish to split costs (i.e., contribute to the purchase price). In some implementations, the acceptance includes an indication that the amount to be contributed (e.g., percentage, dollar amount, etc.) is confirmed by the contributor. In other implementations, the acceptance is only an agreement to split costs (i.e., contribute to the purchase), and at 625, the user device 110 and/or provider computing device 150 may confirm the amount/percentage to be split via another message. At 640, the provider computing system 150 may withdraw the appropriate amount from, or charge the appropriate amount to, an account of the member/user. The withdrawn amount may, at 645, be credited to an account of the payer.

Referring to FIG. 8, an example overview of an authentication circle with three members is depicted. Each member may have one or more accounts linked for use with goals of the circle. The accounts may be held at more than one financial institution. In some implementations, bank accounts may be limited to use for certain expenses. For example, in FIG. 8, account No. 1 at Bank1 (which may have been opened specifically for a specific goal or for certain expenses) may be tied for use by Member 1 with respect to Goal 1. Each goal may have an associated amount (e.g., a targeted budget for an expense, a maximum expenditure for an expense, an amount to be saved for a purchase, etc.). The progress towards the goal (e.g., amount allocated, spent, saved, etc.) can be tracked. In some embodiments, as the various members save towards a common goal, they can see the progress of other members towards that goal. For example, in FIG. 8, Members 1 and 2 may be provided with the ability to see the progress of the other member towards meeting Goal 2.

Referring to FIG. 9, an example overview of a set of goals for a particular member is depicted. In this example, Member 4 has four goals, which may be associated with multiple circles having different members. For each goal, Member 4 has a certain share (i.e., agreed-upon responsibility towards the goal), such as evenly splitting costs with other members with the same goal, paying actual costs (as opposed to splitting total costs for the group), making a fixed contribution, or paying a certain percentage of costs (regardless of number of members). For each goal, there may be a budgeted amount indicating the preferred or desired expenditure, as well as a maximum "not to exceed" amount.

In various implementations, for each goal, the provider computing system 150 and/or user device 110 may (via, e.g., external resource module 172 and/or external resource module 140) retrieve data on various options. For example, for the goal of traveling to Europe, the provider computing system 150 and/or user device 110 may determine that there are two flight options (Flight 1 and Flight 2) by accessing outside sources of information (e.g., by accessing API services provided by Travel Sites 1 and 2) that have different costs (e.g., $800 and $620). Similarly, provider computing system 150 and/or user device 110 may retrieve information on lodging options, cars, gifts, etc., from such sources of information as travel sites, car dealers, and merchants, along with associated costs (e.g., via API services by such sources), as can be seen in FIG. 9. This information can be stored and presented as deemed fit.

Figure 10:
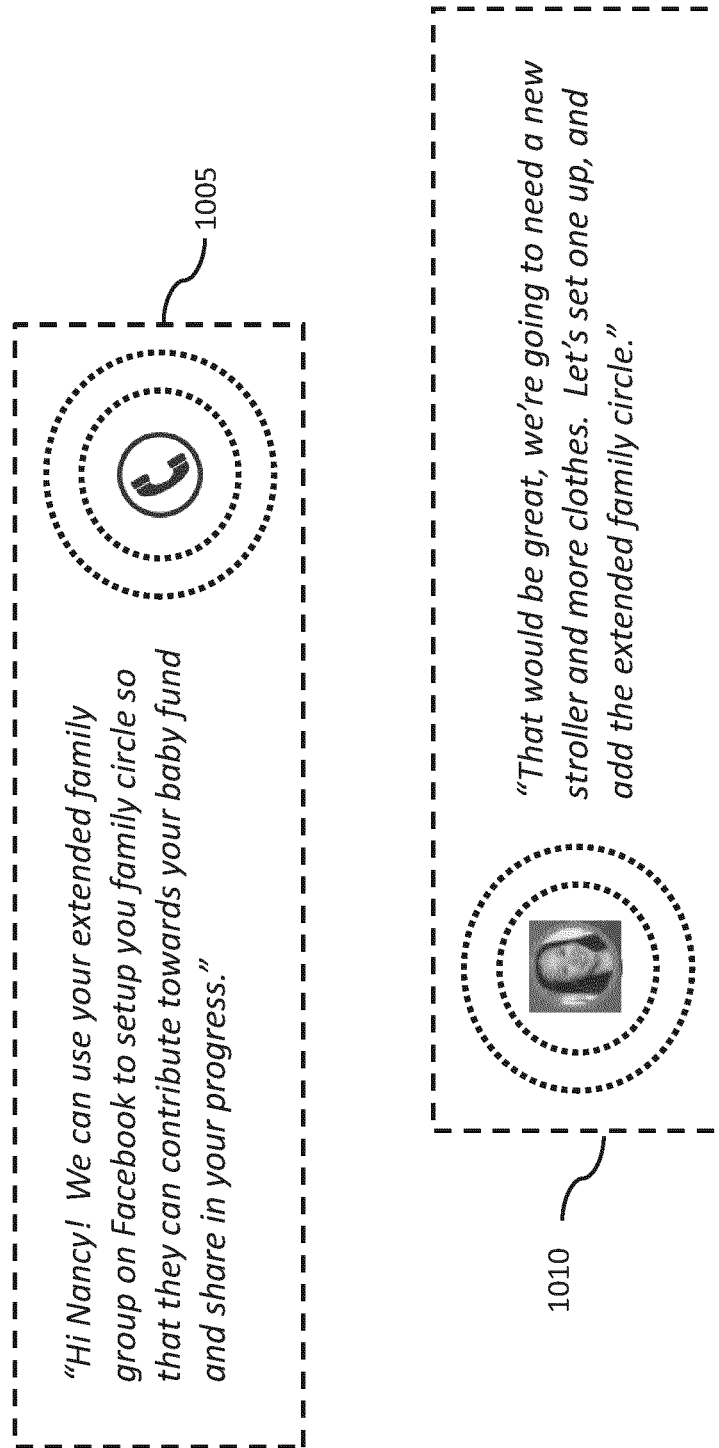
FIG. 10 depicts an example graphical user interface involving a recommendation to form an authentication circle based on available inputs according to example embodiments.
Figures 11A, 11B:
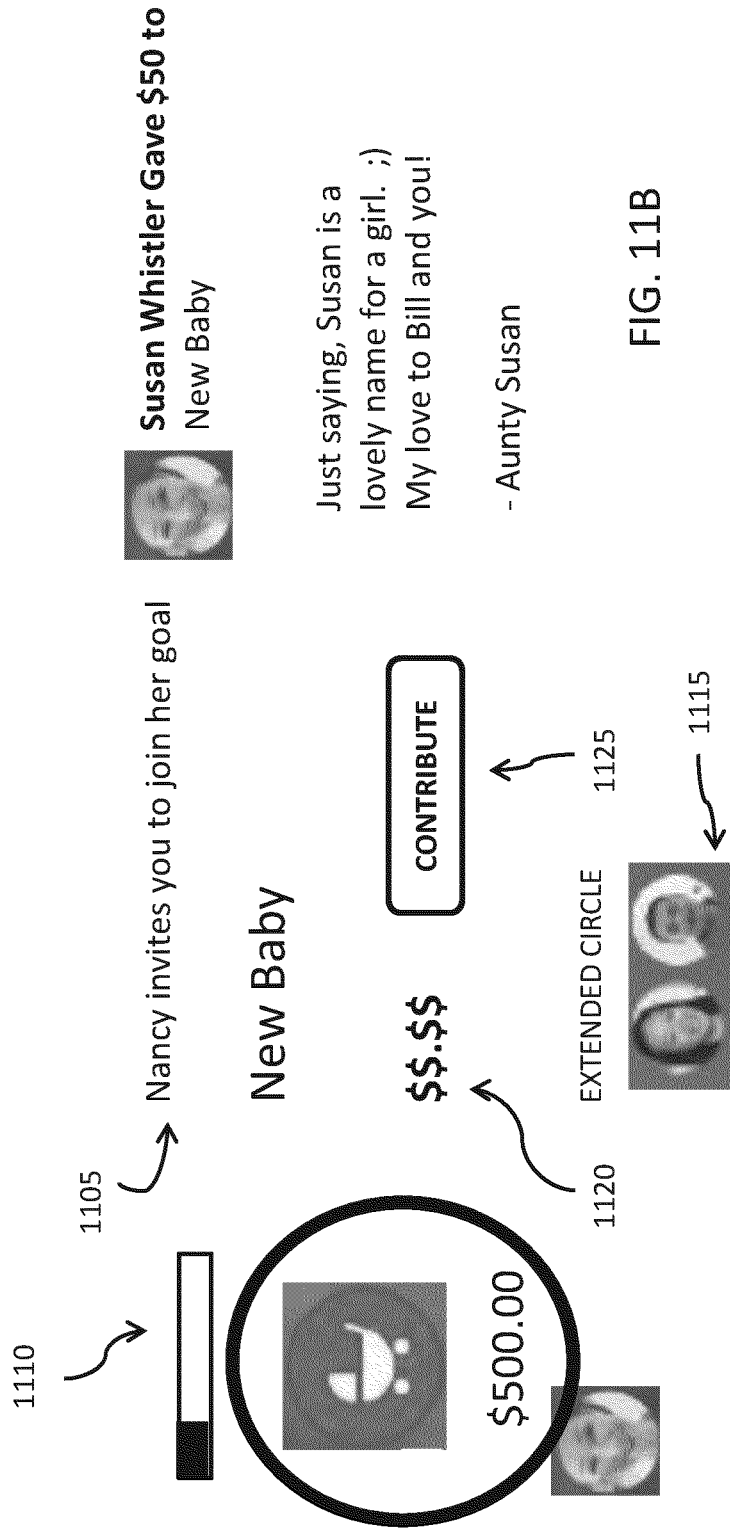
FIG. 11A depicts an example graphical user interface involving an invitation to join an authentication circle according to example embodiments.
FIG. 11B depicts an example graphical user interface involving a response from a recipient of an invitation to join an authentication circle according to example embodiments.
Figure 12:
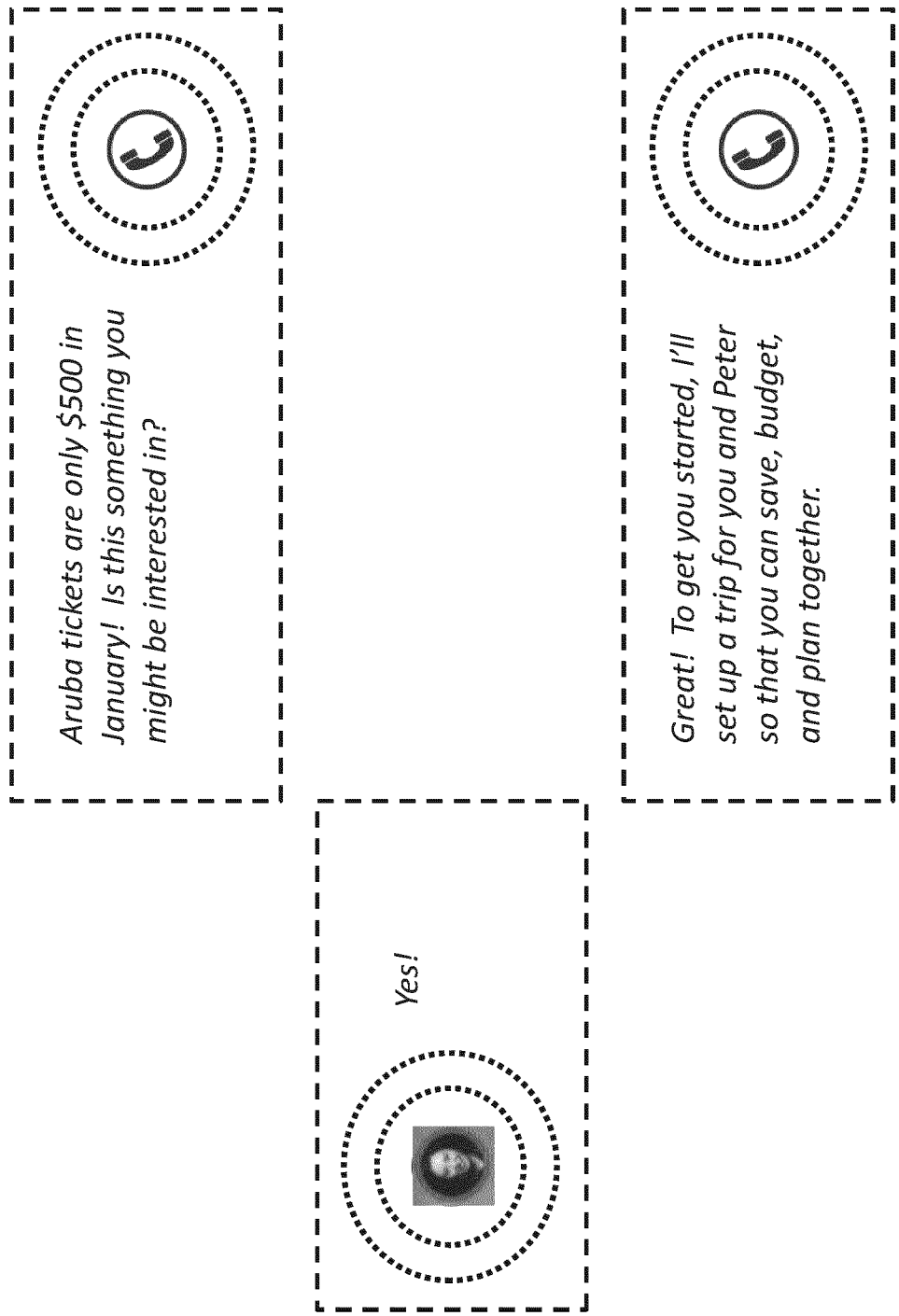
FIG. 12 depicts an example engagement of a member of an authentication circle with a user device according to example embodiments.

With reference to FIGS. 10, 11A, and 11B, which depict example graphical user interfaces of example embodiments, in some examples, a person (e.g., a customer of the provider) may be in the process of growing his or her family. Based on recent transaction history (monitored using, for example, transaction monitor 166 and/or transaction monitor 132) indicating the possibility of a new baby and/or based on a transaction for a newly established college fund (e.g., at a financial institution), the provider computing system 150 and/or user device 110 may pervasively inquire, via an application 112 running on a user device 110, whether the person may like to establish an authentication circle directed towards a new baby fund as shown at 1005 in FIG. 10. The user device 110 may, in some implementations, listen for spoken responses and interpret instructions 1010 (which may, in some implementations, be captured via ambient sensors 128 and analyzed via AI engine 168 and/or AI engine 138) to recommend and/or establish an authentication circle for the new fund based on identified needs. The authentication circle may be established via a peer to peer network or otherwise in a peer to peer fashion as described herein to invite friends and/or family members to participate. A person may receive an invite to join as shown at 1105 of FIG. 11A. In some configurations, for example, the pregnant member may announce the pregnancy to "friends" on a social networking platform. Through an API integration with the social networking website, the provider computing system 150 may send invitations to friends (that received the announcement) to join an authentication circle. Such friends may be invited to help the pregnant member reach a goal, such as raising enough money to purchase bedroom furniture for the expected child. The friends may then monitor progress towards that goal via the system 100. Additionally, via such API integrations or other mechanisms, the provider computing system 150 may be configured to uniquely identify each of the friends on the social networking platform and, based on such unique identification, determine account information for the friends who decide to contribute to the financial goal. Such information may be determined based on the fact that the friend has bank accounts at a financial institution that provides the provider computing system 150, based on secure interbank account information sharing relationships, or in another manner. Hence, such friends may simply be provided with various selectable buttons (e.g., "contribute $100 now," "contribute $200 now,") without needing to manually enter bank account information.

In some configurations, the member may join and add funds to the authentication circle with one-click from any financial institution. In the example illustrated in FIGS. 11A and 11B, the invitee ("Susan Whistler") may be invited (by "Nancy"), as a result of which the invitee may be provided with a user interface presented via application 112 asking whether the invitee wishes to join a "New Baby" goal. The amount to be saved for this goal may be provided (e.g., $500 in FIG. 11A), and the progress towards the goal may be presented textually or graphically (via, e.g., a progress bar 1110). The other members of the circle may also be identified (1115). The invitee may be able to enter an amount to contribute (1120) and press a virtual button (1125) to confirm the contribution. The user on behalf of which the new goal is established may receive a notification such as the example notification depicted in FIG. 11B. The example interface in FIG. 11B identifies the contributor ("Susan Whistler"), the goal ("New Baby"), the amount contributed ($50), and a personalized message from the contributor to the recipient.

In some examples, a customer (e.g., a parent) may utilize the system 100 to establish a financial goal (e.g., a savings goal) of, for example, taking a trip. The customer may be engaged in a conversation with a significant other (e.g., a boyfriend, girlfriend, spouse, or other companion) about taking a trip together. A user device 110 may listen and pervasively offer to help as depicted in the example graphical user interface of FIG. 12. The customer may accept the offer. In turn, provider computing system 150 and/or user device 110 may suggest that the customer establish an authentication circle directed towards the financial goal of the trip. The customer may desire to invite others to go on the trip. In some implementations, the provider computing system 150 and/or user device 110 may be structured to add others proximate (e.g., within a predetermined distance from or otherwise nearby) to the customer to the authentication circle via NFC (near field communication) and/or other geo-location systems as described herein.

Advantageously, authentication circle members are able to be authenticated for making financial contributions, with reduced/minimal effort required for authentication, based on one or more criteria (such as user location, predictability of transactions, frequenting a particular merchant, relationship of members, alignment with one or more goals or types of goals, etc.). To help reduce or minimize the number of user entries needed for authentication (e.g., to eliminate the need for the user to provide login credentials or biometrics separately from approving a contribution), a user may be authenticated in advance of, or in concert with, a transaction. For example, as discussed above, a user may be authenticated via a fingerprint or facial scan when a user touches an icon to select an amount to be contributed, or via recognition of a voice signature when a user speaks words approving of a contribution or other transaction.

In some implementations, a user of a first user device 110 associated with a first member of an authentication circle may be considered to be authenticated by proxy (i.e., without additional user entries for authentication purposes) based on proximity of the first user device 110 to a second user device 110 associated with a second member of the same authentication circle. For example, if a first user device 110 is determined or presumed to be in the field of view of a second user device 110, in certain implementations, it may be presumed likely that the person using the first device 110 is actually the first member, and/or that the person using the second device 110 is actually the second member (as opposed to, for example, someone who is impersonating the first or second member while he or she is in the field of view of the member). In some versions, it may be presumed that a first user is in the field of view of a second user if they are close enough. In other versions, the provider computing system 150 and/or user device 110 may determine whether the first user is in the field of view of the second user based on such data as: input from a camera of a user device 110, which may be analyzed (e.g., using computer vision techniques such as object recognition/identification/detection) to determine whether, from the perspective of the user device 110, another user device 110 may be seen or whether its view is blocked by people, fixtures, buildings, etc.; input from a microphone, which may indicate that, based on the ambient noises (e.g., loud crowds, horns, construction, etc.), the users are likely to have distractions or objects that may impede users' views; input from other sensors, such as street cameras, retrieved via external resource module 140 and/or external resource module 172; a response received by application 112 following a query (provided, e.g., via a pop-up notification) asking a member whether he or she can see another member or otherwise confirms their identify/presence (as it might be deemed unlikely that two user devices 110 are being used for fraudulent activity at the same time); etc.

In certain implementations, a user of a first member's user device 110 may be authenticated by proxy if the user is splitting an expense with a second member's user device 110 if the first member and the second member have a certain relationship deemed to be sufficiently significant (such as being close friends, family members, classmates, etc.). In certain versions, a user of a first member's user device 110 may be authenticated by proxy if the user is splitting an expense with a second member's user device 110 if both the first member and the second member have a certain relationship deemed to be sufficiently significant, and if the first user device and the second user device are also deemed to be sufficiently close to each other.

In certain implementations, a user of a first user device 110 associated with a first member attempting to split expenses with a second user device 110 of a second member may be authenticated by proxy depending on the locations of the first and second user devices 110. Alternatively or additionally, a user of a first user device 110 associated with a first member attempting to split expenses with a second user device 110 of a second member may be authenticated by proxy based on whether the first and second user devices 110 are close enough to each other that their users may be expected to be able to see and/or hear each other. For example, based on input from user/transaction locator 164 and/or location tracker 134, provider computing system 150 and/or user device 110 may deem a member authenticated based on his or her presence at the same establishment as another member at the same time. Similarly, based on input from user/transaction locator 164 and/or location tracker 134, provider computing system 150 and/or user device 110 may deem a member authenticated based on the two members being deemed close enough to each other to have a discussion, to interact, or otherwise to engage each other or another person (such as a tour guide or a speaker at a conference or in a classroom).

Such authorization without additional user entry (which can be reduced friction or "friction free") may be based on a presumption that if a first user device 110 associated with a first member is within a predetermined range of a second user device of a second member (e.g., within 10 meters, one meter, or another distance, or within each other's field of view), it is likely that the person using the first device 110 is actually the first member, and/or that the person using the second device 110 is actually the second member (as opposed to, for example, someone who is impersonating the first or second member, or someone who has stolen the user device and is expected to flee the area rather than stay near or within view of the owner of the user device). The likelihood that two user devices 110 are co-located by coincidence and are being used fraudently may be considered small enough that the users can effectively be deemed (by proxy) to be authenticated. Advantageously, such an approach may save resources (time, processing power, etc.) by indirectly using a member's ability to perceive another member or otherwise assist with a determination of whether to proceed with a transaction. Ability to perceive may be determined, in some implementations, via ambient sensors 128 (e.g., microphone and/or camera) and identification of the member (e.g., via facial recognition or recognition of a voice signature).

In certain implementations, location in combination with (or in lieu of) one or more other criteria and/or behaviors may be considered a proxy authenticator. For example, if an expense being split by two or more members is an expense that is consistent with a goal that is shared by the members in an authentication circle, the user of a user device 110 being used to make a financial contribution may be deemed authenticated as the member. As one example, if two members are known to be traveling to a particular destination, and the members are at the airport from which they are expected to be flying to their destination, the users of the user devices may be deemed to be verified without soliciting another user entry (at least another user entry that is solely for authentication purposes). As another example, if two members are known to be traveling to a particular destination, and the members are at a restaurant located at the particular destination at a time the members are expected to be at their destination, the users of the user devices may be deemed to be verified without soliciting another user entry solely for authentication purposes. Similarly, if an expense to be split is for an item from a merchant that is frequented by the two members, then the users of the user devices 110 may be deemed authenticated. In other situations, if a purchase to be split is for an item or is from a merchant that aligns with a goal (such as a purchase of a baby supply and/or from a baby store by a pregnant member), then the users of the user devices 110 may be deemed authenticated by proxy.

In some implementations, various factors may be taken into consideration and an authentication score generated to determine the likelihood that an attempted transaction is authorized or fraudulent. For example, a user may be deemed authenticated if an authentication score based on one or more criteria is above a certain threshold. The authentication score may consider one or more of: proximity of the members, such that the closer the members are to each other or to a landmark or establishment, the higher the authentication score; the monetary (e.g., dollar) value of the transaction, such that the higher the monetary value, the lower the authentication score (so as to have the effect of more often requiring separate authentication for higher-value transactions); the number of times a merchant is frequented, such that the more times the members have made purchases from a merchant, the higher the score (e.g., splitting the bill at a restaurant at which two members have lunch every work week, especially if the restaurant is located at or near a shared workplace, is deemed to be less prone to fraud and thus the authentication score may be higher); alignment of an expense with a particular goal, habit, or circumstance of a member (e.g., purchasing a ticket for a roller coaster ride when a member is nine months pregnant may be deemed more prone to fraud and the authentication score may thus be lower); etc.

The distance between two devices may be determined in multiple ways. For example, an acceptable range may be determined based on whether two user devices are close enough to communicate via NFC, and/or whether two devices are close enough to for a certain communication protocol with a limited range (such as being close enough to communicate via NFC or Bluetooth or to connect to the same Wi-Fi network via, e.g., a router with limited range). The distance may also be determined based on whether a user device is close enough to detect a sound. For example, first user device 110 may emit a unique sound using a speaker, and if a second user device 110 (which may know what sound to expect) is able to detect the sound (using, e.g., a microphone), the two devices may be deemed to be close enough (with quieter sounds emitted by the first device 110 when smaller distances are required and/or in quieter environments, and louder sounds may be emitted when larger distances are acceptable and/or in noisier environments). The sounds emitted may be at audible frequencies (e.g., audible tones) or at inaudible frequencies (e.g., ultrasonic).

In some implementations, distance between two user devices 110 may be determined by ascertaining whether both user devices 110 are able to detect the same ambient noises. For example, first and second user devices 110 may detect sounds in their surroundings and generate audio files (which may be the detected sounds themselves, or representations or encoded versions of the detected ambient sounds). The audio files may be transmitted by first and second user devices 110 to provider computing device 150, which may compare the two audio files to determine (using, e.g., AI engine 168) whether the two user devices are likely to be sufficiently close to each other based on, for example, whether the sounds detected during the same time period have a similar or same sound signature). The audio files may correspond to sounds detected over a fraction of a second, a second, two or more seconds, or another time period deemed appropriate under the circumstances, and multiple audio files may be generated and transmitted to the provider computing system 150 for multiple comparisons (e.g., in succession until a satisfactory determination can be made), in case multiple sound samples are required to gain confidence that the first and second user devices 110 are sufficiently close to each other. In other implementations, one or both of the first and second user devices 110 generates an audio file and transmits it to the other user device for comparison with the ambient sounds of the other user device (directly and not via the provider computing system 150, or if transmitted via the provider computing system 150, without analysis by the provider computing system 150). Based on such sound comparisons, it can be determined whether the members can be authenticated by proxy without additional user entry. Alternatively or additionally, range may be determined using proximity sensors (of location sensors 126) of one or more user devices 110. The distance may also be determined using GPS signals or other location mechanisms.

Returning to the block diagram of FIG. 1A, in some embodiments, the provider computing system 150 may be the computing system of a financial institution. Generally, the financial institution provides financial services (e.g., demand deposit accounts, credit accounts, etc.) to a plurality of customers. The financial institution may provide banking services to customers, for example, who can deposit funds into accounts, withdraw funds from accounts, transfer funds between accounts, view account balances, and the like via the provider computing system 150. In some embodiments, the provider computing system 150 and/or user devices 110 may communicate (via network 145) with one or more third party systems (not depicted). The one or more memories 154 may include an account database structured to maintain accounts associated with customers of the financial institution and to facilitate transactions associated with the accounts. The account database may store transaction data and account information, including account numbers, account balances, customer contact information, customer preferences, and other account information. As used herein, the term "transaction data" may be used to refer to data associated with a transaction such as, but not limited to, a contribution, donation, payment, debit, credit, etc. which may be associated with the account of a member of the authentication circle.

As suggested above, user devices 110 may include smartphones, tablet computing devices, mobile devices, wearable computing devices (e.g., a smartwatch, smart optical wearable, etc.), personal computing devices such as laptops, digital assistance devices (e.g., a voice activated device structured to assist a user such as smart speakers having chat bot capabilities), PDAs, portable media devices, vehicle infotainment systems, etc., that may access one or more programs, servers, networks, central computers, etc. In some examples, a customer or other user may access an authentication circle through various user devices 110 at the same time or at different times. For example, the customer may access the authentication circle via a user device 110 like a digital assistance device while also accessing the authentication circle using a wearable device like a smart watch. In other examples, the customer may access the authentication circle via a digital assistance device and later access the authentication circle via a vehicle infotainment system. The user device 110 may communicate with the provider computing system 150 of the financial institution through the network 145. In some arrangements, the network 145 includes the internet, cellular networks, personal area networks, Wi-Fi networks, etc. The user device 110 may execute a software application 112 that is associated with the financial institution to facilitate the provision of the authentication circle. In some arrangements, the application is executed locally on the user device 110 (e.g., a smartphone, tablet computing device, etc.). In other arrangements, one user device 110 may be communicatively coupled to the provider computing system 150 via another user device 110, such as a virtual assistance device. Members may use, via the user devices 110, the application 112 to, for example, access various services provided by the financial institution.

Figure 13:
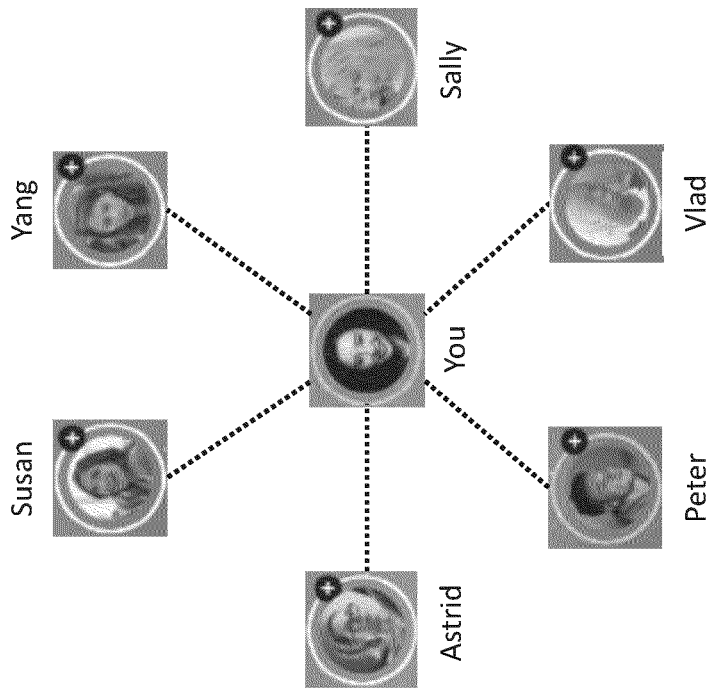
FIG. 13 depicts an example graphical user interface involving formation of an authentication circle with nearby friends as members of the authentication circle according to example embodiments.

In example implementations, user devices 110 and third-party computing systems 190 may be associated with a peer to peer network (e.g., a social network, a network of devices structured to share resources, interact, communicate, etc., without accessing a separate server, other suitable network, or combination thereof) and components of the provider computing system 150. The provider computing system 150 and/or user devices 110 may be structured to provide financial advice (via, e.g., AI engine 168 and/or AI engine 138) to members of the authentication circle as described herein. The provider computing system 150 and/or user devices 110 may be structured to provide an authentication circle structured to meet a common financial goal. Users may utilize the system 100 to create authentication circles to allow a group of users (e.g., Persons A, B, and C) to work towards a common financial goal or to otherwise manage joint finances. A person (e.g., Person A) may wish to add one or more other persons (e.g., Persons B and C) to an authentication circle to assist with meeting a financial goal or to split costs of a shared expense. Accordingly, Person A may provide an identifier (e.g., an e-mail address, user ID, profile ID, screen name, contact number, or any other information that helps identify an individual or that allows the system to communicate with the individual) associated with each of Persons B and C to the provider computing system 150. In some examples, the provider computing system 150 may utilize the location tracker 134, the location sensors 126, along with NFC, and/or other geo-location, geographic coordinates, radio-frequency location, RFID, or other location systems and methods to determine locations of people proximate to a user device 110. In turn, one or more persons may be added to the authentication circle using NFC between and among user devices 110 of different users, as illustrated by FIG. 13. Each user device 110 may receive an invitation to join the authentication circle via, for example, a peer to peer network. In some implementations, invitations may be transmitted between and among devices without necessarily going through provider computing system 150, and the selections received via application 112 may be transmitted to the provider computing system 150 by each user device 110 (or by one of the user devices 110, such as the user device 110 of Person A). In certain implementations, the provider computing system 150 may generate and provide the request to join the authentication circle to a user device 110 associated with Persons B and C. Each of Persons B and C may receive the request to join the authentication circle via one or more of their user devices 110.

In some implementations, the circle manager 136 associated with each of the user devices 110 may manage the request to join the authentication circle. An indication of acceptance of the request to join the authentication circle may be received when the users, for example, click a link, button, image, and/or icon as described herein via their user devices 110. In other examples, an indication of the acceptance of the request to join the authentication circle may be received when a person, for example, audibly accepts the request by voice prompt (e.g., "yes, I will join") and/or by speaking a command that his or her user device 110 can receive and interpret as audible acceptance of the request. In response, the recipient of the request to join the authentication circle may be connected to, via the user device 110, or otherwise associated with the authentication circle responsive to the indication of the acceptance received by the circle manager 136.

If the user device 110 is a device that is known to/recognizable by the provider computing system 150 (e.g., the user device 110 includes an application 112 associated with the provider computing system 150) such that invitees (e.g., Persons B and C) can be identified and authenticated based on the user's prior interactions with an application 112 that is associated with the provider computing system 150, the provision of additional identification information or account information by invitees like Person B or Person C may not be required. In some implementations, the application 112 may be, for example, a mobile banking or payment application issued by the provider, and the application may already have mechanisms for authenticating the user or the user device. In such a case, the provider computing system 150 may rely on an authentication mechanism already in place or already used for authentication, rather than re-authorizing the user/user device 110 when members are joining and/or contributing to authentication circles.

In some implementations, the provider computing system 150 may include a one-click acceptance mechanism structured to allow users to both accept the request to join the authentication circle and make financial contributions. In some implementations, a funds transfer (e.g., an electronic transfer of funds, currencies, cryptocurrencies, etc.) comprising at least the contribution amount of the financial contribution may be initiated between user accounts of members of the circle to assist in meeting the goal of the authentication circle and/or contributing to a shared expense incurred by or on behalf of the group.

Referring to FIG. 1B, the user device 110 includes a communications interface 120. The communications interface 120 may be a wireless network interface that includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Additionally, the communications interface 120 is capable of communicating with the provider computing system 150 via network 145 (e.g., via any combination of the Internet, cellular networks, personal area networks, WiFi networks, etc.), or with other user devices directly as part of a peer to peer network.

The circle functionality of the user device 110 may be controlled at least in part by application 112. Although depicted as part of user device 110, components of application 112 may be included in the provider computing system 150, and not every user device 110 needs to have all components and application modules depicted in FIG. 1B. For example, a user device 110 that is a smart watch need not necessarily have a transaction monitor, and similarly, a vehicle infotainment system need not necessarily require its own AI engine.

Figure 7:
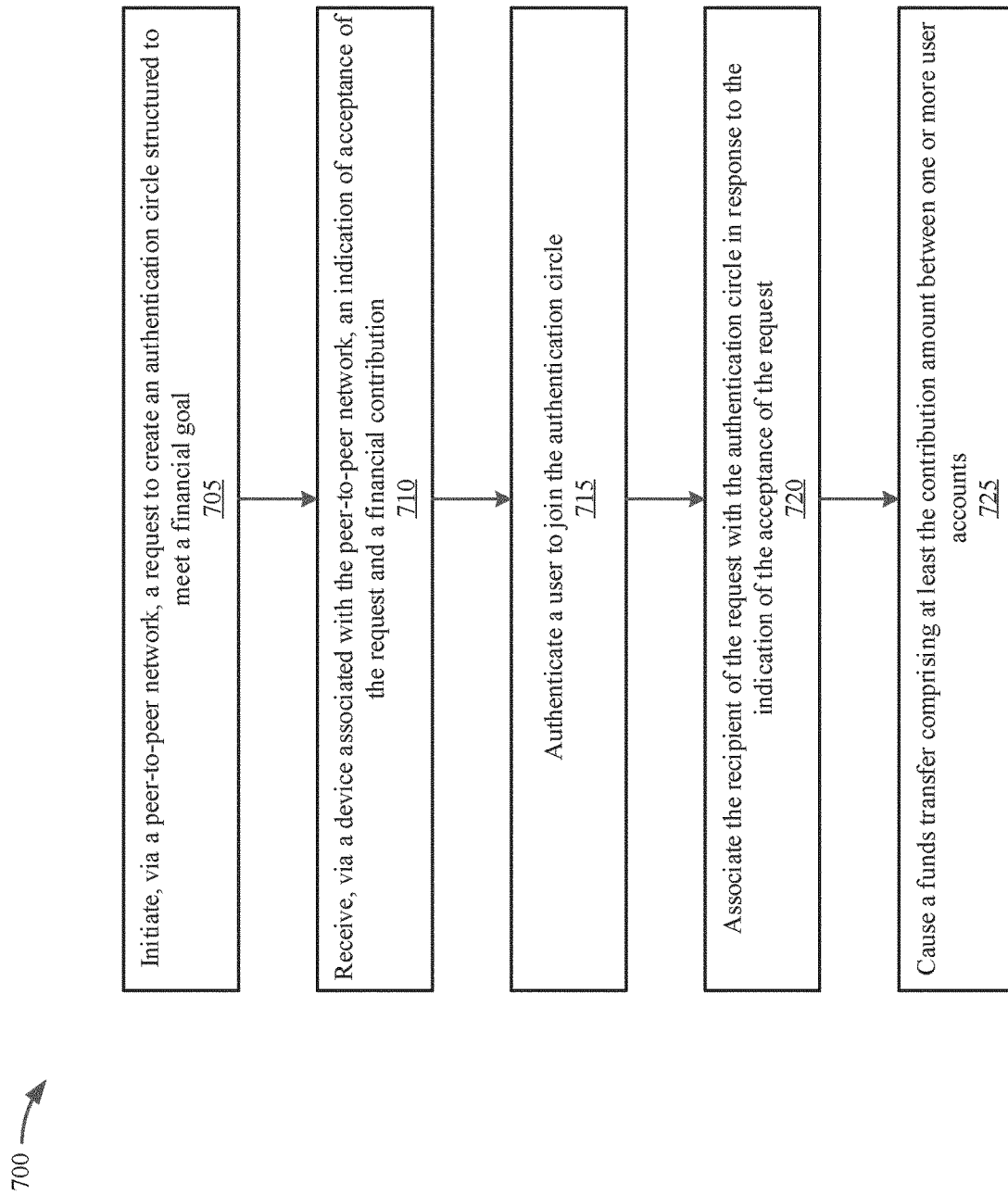
FIG. 7 depicts an example method for providing an authentication circle for meeting a financial goal or sharing of expenses according to example embodiments.

Additional details will now be discussed in the context of FIG. 7, which provides a flow diagram of an example method 700 for providing an authentication circle structured to meet a common financial goal of one or more members according to example embodiments. Method 700 may be performed by user devices 110 and the provider computing system 150 accessing application 112, which may be running on user devices 110 and which may be provided by the entity (e.g., a financial institution) maintaining/administering the provider computing system 150. In some configurations, the user devices 110 may be communicatively connected to each other directly (e.g., via NFC communications) or indirectly (e.g., via a remote server or other computing system). The flow diagram 700 provides an example interaction involving the user devices 110 and the provider computing system 150.

The example method 700 begins when the creation of an authentication circle is initiated by the provider computing system 150 at 705. In some embodiments, the creation of the authentication circle is initiated based on inputs received via user device 110. An input may be a user clicking or tapping a link, button, image, icon, graphic, etc., and/or a swipe generated responsive to a hand and/or finger gesture provided by a user of a user device 110. In some implementations, the input may be a voice command, such as words spoken by the user and captured via a user device 110. For example, the user device 110 may proactively listen to a conversation of the user, and ask the user if he or she wants to create an authentication circle for an identified goal or predicted need that is gleaned from the conversation.

The initiation process for an authentication circle may involve an invitation to a potential member to join an already-formed authentication circle. Alternatively or additionally, initiation may involve a request to form a new authentication circle (and become a member thereof, and/or for others to become a member thereof). Application 112 of the user device 110 may provide or receive (via, e.g., the messaging module 130) a request to form or join an authentication circle for one or more financial goals. The request may be presented to the user using one or more user interfaces 118 via, for example, application 112, another application (e.g., a texting, communications, or social media application), an SMS text message, or by other mechanisms.

In instances wherein the initiation of the authentication circle includes a request to form an authentication circle, the application 112 may receive the request to create the authentication circle via one of the user devices 110. Application 112 may be used to add one or more persons to an authentication circle to assist with meeting a financial or non-financial goal or to split costs of a shared expense. The one or more persons to be added may be identified via application 112 by providing an identifier (such as, but not limited to, an email address, user ID, profile ID, screen name, telephone or other contact number, etc., associated with the individual that the person desires to add), and the application 112 may transmit the identifier to the provider computing system 150 or to one or more other user devices 110. For example, a soon-to-be-parent (or other relative) may submit, via application 112, a request to create an authentication circle to invite friends and family to participate in an authentication circle for a new baby fund. The person may provide identifiers for each individual that he or she wishes to add to the authentication circle as members and circle manager 136 may transmit the request to join the authentication circle to one or more user devices 110 of the identified individuals directly, or via provider computing system 150. In other examples, a couple that does not desire to co-mingle accounts may create an authentication circle to manage joint finances for the goal of, for example, purchasing a home. In another example, a group of friends who wish to go on a trip may create an authentication circle for purposes of sharing the expenses of the trip, or otherwise planning therefor.

In some examples, the request to create an authentication circle structured to meet a common goal may be received or otherwise generated by one or more user devices 110 and/or by the provider computing system 150 based on a transaction indicative of a past or future event (e.g., an event that may have a financial impact such as, but not limited to, a pregnancy, trip, accident, illness, etc.). In some implementations, application 112 may be structured to generate an authentication circle prompt (e.g., a message, notification, or other communication that prompts the recipient to create an authentication circle) based on a transaction indicative of a financial need, change in finances, or financial goal, and/or user account information accessible to the user device 110 and/or the provider computing system 150. For example, the application 112 (via, e.g., circle manager 136) may prompt a customer of the financial institution who is expecting a baby to create an authentication circle based on recent transaction history (e.g., transactions indicative of baby purchases, a college fund recently connected to the account of the customer) accessible to transaction monitor 166 and/or transaction monitor 132 (and/or other account information). The transaction data generated from the transaction may be stored in memory 154 and/or memory 116 (in, e.g., an account database). In certain implementations, transaction monitor 166 and/or transaction monitor 132 may query an account database to determine whether there is transaction data indicative of a financial need, change, or goal. The messaging module 160 and/or messaging module 130 may generate a prompt for presentation via the user device 110 to invite the user of the user device 110 to establish and/or join an authentication circle.

In some arrangements, the user device 110 may be structured to proactively listen and, for example, detect a voice input (e.g., an individual's voice, a voice key, a voice trigger, a word or phrase, etc.) indicative of an event and/or user account information associated with a user. The user device 110 may identify event data by interpreting (via, e.g., AI engine 138 and/or AI engine 168) the voice input of the customer. The voice input may be received via one or more ambient sensors 128 (e.g., microphone) of the user device 110. Application 112 may, based on the voice input (e.g., the conversation or instruction of a customer) pervasively received, inquire whether a customer may like to establish an authentication circle directed towards a financial or non-financial goal, or propose establishment of an authentication circle and optionally identify one or more potential members. The user device 110 may generate an authentication circle prompt (e.g., the offer to establish an authentication circle such as prompt 1005 in FIG. 10). In some implementations, user device 110 and/or provider computing system 150 may utilize speech recognition and natural language processing to receive and respond to such event data via for example, a chat bot.

In some embodiments, the user device 110 may alternatively or additionally be structured to proactively watch and, for example, detect imagery indicative of an event or action (e.g., an individual reading a certain book, occurrence of an accident, etc.) and/or user account information associated with a user. The user device 110 may identify event data by interpreting (via, e.g., AI engine 138 and/or AI engine 168) the imagery and recognizing places, persons, movements, objects, gestures, and interactions. The imagery may be received via one or more ambient sensors 128 (e.g., camera) of the user device 110. Application 112 may, based on the imagery (with, e.g., meetings, actions, accidents, gestures, etc.) pervasively received, inquire whether a customer may like to establish an authentication circle directed towards a financial or non-financial goal, or propose establishment of an authentication circle and optionally identify one or more potential members. The user device 110 may generate an authentication circle prompt (e.g., the offer to establish an authentication circle such as prompt 1005 in FIG. 10). In some implementations, user device 110 and/or provider computing system 150 may utilize speech recognition and natural language processing to converse with the user regarding potential authentication circles, goals, members, roles, etc.

In some examples, the user device 110 (which may include a chat bot or the functionalities thereof) may engage in a conversation with the customer via auditory or textual based programmatic algorithms. In response to receiving event data, the user device 110 may provide advice or otherwise make suggestions to the customer. For example, the user device 110 may prompt (via, e.g., a chat bot) the customer to create an authentication circle and/or to invite others to join an authentication circle that has been established.

At 710, an indication of acceptance of the request to join an authentication circle and make a financial contribution (e.g., a financial donation, gift, or other monetary support that is structured to increase a group progress towards the common financial goal) may be received via messaging module 130 of user device 110 associated with a peer-to-peer network (e.g., a smartphone, wearable device, and smart speaker in communication with each other directly or via a local network, such as a Wi-Fi connection). In some implementations, the indication of acceptance of the request may be transmitted to provider computing system 150 via network 145. In other implementations, the acceptance may be provided to another user device directly. Acceptance to join the authentication circle may be indicated when a user clicks a link, button, image, and/or icon via user device 110, and the acceptance may be communicated to messaging module 160 of provider computing system 150. Alternatively or additionally, the user device 110 may receive the indication of acceptance in the form of a voice input (e.g., an ambient sensor 128 detects a voice trigger or voice key, such as, but not limited to, "join authentication circle," "I want to join the authentication circle," "contribute funds," "I want to contribute," etc.). Alternatively or additionally, the user device 110 may receive the indication of acceptance in the form of a gesture or other movement (e.g., an ambient sensor 128 detects a thumbs up by a targeted user who is identified via facial recognition). In some examples, the user device 110 may be structured for a one-click acceptance. As used herein, the term "one-click acceptance" may refer to an indication of acceptance of the request to join an authentication circle, an acceptance to provide a financial contribution, or an acceptance of both the request to join an authentication circle and to provide a financial contribution.

In some implementations, prior to allowing the person to accept the request to join an authentication circle, the person may be authenticated as an account holder at 715. In arrangements in which the user device 110 includes an application 112 associated with the provider maintaining the provider computing system 150, the user device 110 may receive and transmit user authentication data (e.g., data indicative of the identity of a customer of the financial institution and/or a user of various systems, applications, and/or products of the financial institution) to the authentication engine 174. The person may also be identified and authenticated by application 112 (using, e.g., input from user interfaces 118 and/or biometric scanners 122), and additional identification information or account information may not be required by authentication engine 174. In such cases, the application 112 may transmit a confirmation to provider computing system 150 indicating that authentication was successful. User authentication data may include any of a password, a PIN (personal identification number), a user ID, an answer to a verification question, a biometric, an identification of a security image, or any combination thereof. The provider computing system 150 and/or user device 110 may already have authentication data as a result of, for example, a registration process (in which a user registers to use the authentication circle or other services offered by the provider), and/or due to a prior relationship between a user and the provider (e.g., as a customer of the provider, such as a banking customer of a financial institution). The authentication engine 174 (and/or application 112) may compare the received authentication data with known and verified user authentication data. If the authentication data provided does not sufficiently match the known and verified user authentication data, the person is not authenticated. If the authentication data provided sufficiently matches the known and verified user authentication data, the person is authenticated such that additional identification information or account information is not required from the user.

In some examples, the provider computing system 150 and/or user device 110 may utilize voice or facial recognition to authenticate the person as an account holder and/or as a customer. For example, user device 110 (e.g., a voice activated digital assistant, smart speaker, smartphone, etc.) may ask the user if he or she may like to create and join an authentication circle. In response to the user device 110 receiving a response (e.g., "yes") from the person, the authentication circle may be created.

In some implementations, at 720, the recipient of the request to join the authentication circle may be connected to or otherwise associated with the authentication circle in response to the indication of the acceptance of the request. For example, the circle manager 158 may associate the user device 110 of the recipient to the authentication circle based on, for example, a mobile identification number (MIN), a mobile subscription identification number (MSIN), a user account, a social media account, and/or other identifier associated with the recipient (e.g., the new member) of the authentication circle. In examples wherein a contribution is provided to the authentication circle, at 725, the provider computing system 150 (via, e.g., account linker 162) may cause a funds transfer (e.g., an electronic funds transfer of funds, currencies, cryptocurrencies, etc.) for the designated contribution amount between one or more user accounts to advance the group's progress towards the financial goal (e.g., to cover incurred or upcoming expenses, increase savings, etc.).

Figure 14:
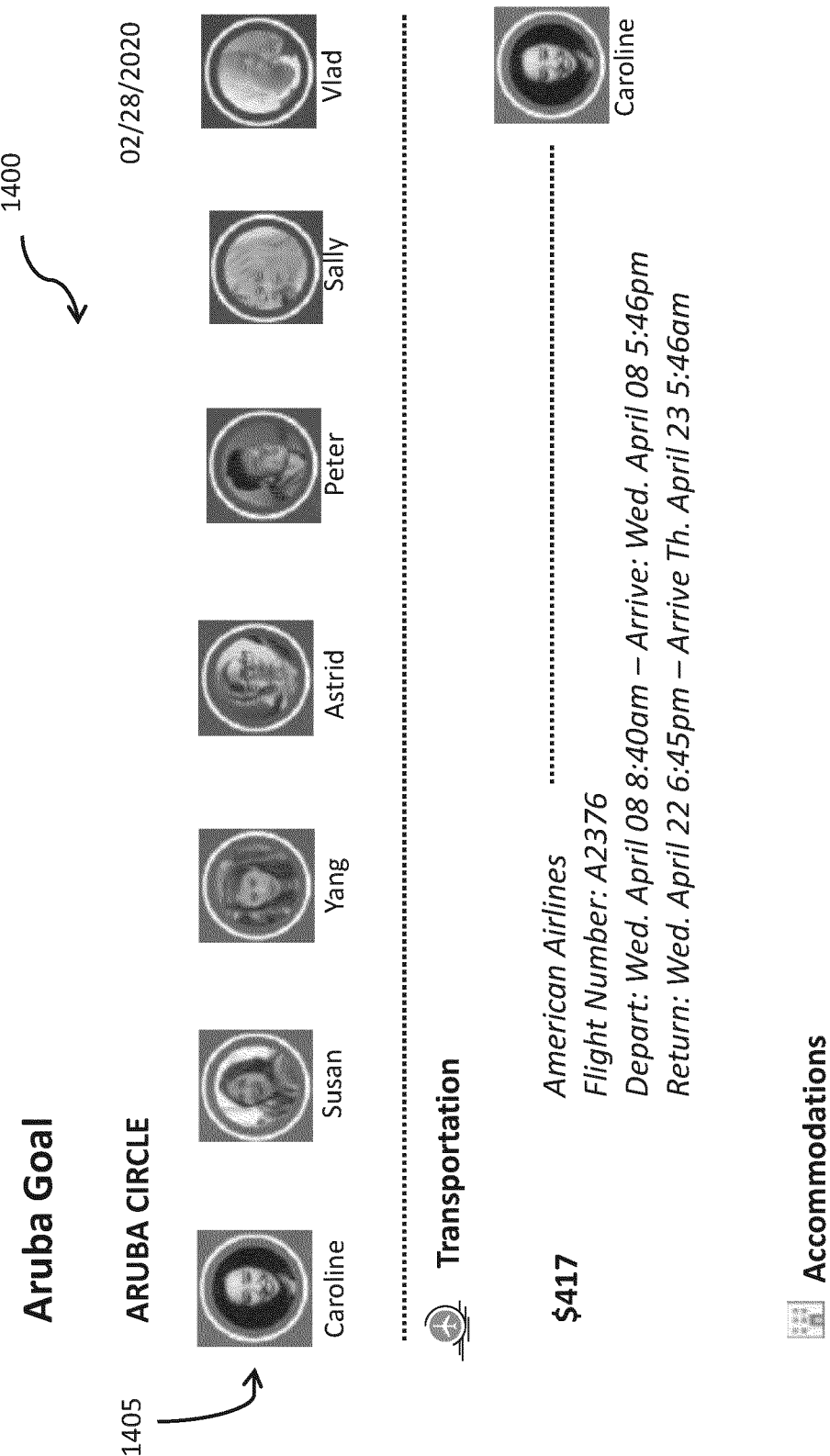
FIG. 14 depicts an example graphical user interface involving a goal of members of an authentication circle according to example embodiments.

Referring to FIG. 14, a graphical user interface 1400 of an example authentication circle for a trip (to Aruba, in FIG. 14). Users may be presented with any graphical user interface deemed suitable via the user device 110. As shown by the icons 1405 in the integrated view of FIG. 14, one or more persons may be included in the authentication circle. The icons 1405 may be structured to indicate or represent various members of the authentication circle. The graphical user interface 1400 may be accessible to all (or a subset of) the members of the authentication circle. Interface 1400 indicates that one of the members (Caroline) has arranged for a particular flight (costing $417). The goal may be updated (e.g., in an automated fashion using information from third-party services) as information on other expenses become available.

Referring also to FIGS. 15-18, other expenses related to the trip (such as flights of other members, accommodations, meals, etc.) may be presented as incurred, as planned, when reserved, or otherwise. Some or all of the expenses may be shared, and the members with which one or more expenses are to be split can be selected (by, e.g., a member making a purchase, a member taking on an administrative role in the circle, or any other member(s)). For example, each member may pay for his or her flight (which may have different costs), while meals and a house rental may be split evenly. Information on (purchased or available) flights, accommodations, etc., may be entered manually, acquired from messages (e.g., e-mail confirmations, social networking pages, etc.), third-party sources (e.g., airline and hotel websites, financial institutions used to pay for expenses, etc.), banking statements (which may include, e.g., credit card charges) or from other sources.

In some examples, provider computing system 150 (via, e.g., messaging module 160) and/or application 112 (via, e.g., messaging module 130) may be structured to provide, via a peer to peer network and/or in a peer to peer fashion (e.g., a social network, social media network, or other like network), an alert or notification related to the authentication circle, such as shared expenses, amounts of financial contributions, etc. For example, provider computing system 150 and/or application 112 may generate and transmit a notification to other user devices 110 via a peer to peer network or social media when funds are contributed towards a financial goal.

The notification may contain information of interest to a member of the authentication circle and eliminates the need for the user to access a web browser based e-mail client or other dedicated communications app to receive notifications. The notification may include content programmatically selected, generated, or recorded via an electronic process and initiated by an electronic system to notify a user associated with the user device 110 of an incoming message, notification, or the like that pertains to the authentication circle. In some configurations, the notification may be structured to activate (e.g., wake up) the user device 110. Members of the authentication circle may provide an indication of interest (e.g., the member may "like" the notification, reply to the notification, reply to the notification via a re-post, reply to the notification with message (e.g., "Thank you!"), etc.) to demonstrate interest of the member in the notification and/or approval of the content therein.

Referring to the graphical user interface of FIG. 18, application 112 and/or provider computing system 150 may be structured to monitor a transaction associated with a member of the group. For example, during the trip referenced in the above example, the transaction monitor 166 and/or transaction monitor 132 may monitor transactions of members of the authentication circle. The user device 110 may display the monitored transactions via the graphical user interface. A graphic (e.g., a progress bar, or a graphic with a thin line indicating a total amount and an overlaid thick line indicating progress towards the total amount) may indicate the amount of funds spent and/or remaining on food, accommodations, etc. The transaction data generated from the transaction may be stored in memory, such as an account database.

In some implementations, goal manager 170 may determine whether the transaction comprises a shared expense (e.g., an expense to be split, such as the trip, or otherwise paid for by a plurality of members of the authentication circle). The user/transaction locator 164 and/or location tracker 134 may, for example, detect that members of the authentication circle are, for example, at the same restaurant (or at the same address, or otherwise within a predetermined distance of each other). The provider computing system 150 and/or application 112 may utilize the location sensors 126, NFC, and/or other geo-location, geographic coordinates, radio-frequency location, RFID, or other location mechanisms to determine like geolocations of the user devices 110 associated with each of the members to detect that the members are, for example, at the same restaurant or otherwise no more than a maximum distance apart from each other. In further examples, transaction monitor 132 and/or transaction monitor 166 may detect that one of the members of the authentication circle paid the total amount of the shared expense (e.g., paid for the total dinner bill) based on transaction data determined from a physical credit card, credit card transaction, mobile wallet, etc. Advantageously, utilizing geo-location or NFC facilitates the provision of shared expenses that allow members of the authentication circle to split costs seamlessly.

In some implementations, members may be provided with, for example, a graphical user interface like the ones depicted in FIGS. 19A and 19B to select nearby members and the amounts to be contributed by each. As shown in the example user interface of FIG. 19A, based on transaction data determined from a physical credit card, credit card transaction, mobile wallet, etc., a shared expense (e.g., total bill of $72 at the restaurant of Brown Sugar Kitchen) may be split among the members detected at the restaurant by NFC or another location mechanism. Each user device 110 may receive a shared expense notification that may be structured to prompt a member of the authentication circle to pay at least a portion (e.g., the contribution amount of $18) of the shared expense. Application 112 running on the user device 110 of the member who shared an expense may provide a shared expense notification. The shared expense notification may be structured to propose sharing an expense or inquire whether the cost of an expense (e.g., dinner, travel cost such as a hotel, an attraction package, flights, etc.) should be split amongst the other members of the authentication circle, or amongst the subset of members who are detected to be nearby, or other subset based on other criteria or as previously agreed upon. The payer may, in some implementations, accept splitting the expense in a one-click fashion as discussed above. In turn, the user device 110 and/or the provider computing system 150 may receive an indication of approval (e.g., an indication that the member who paid the total amount of the shared expense approves or does not approve the split of the shared expense).

In examples in which the cost of the shared expense is to be split (which may be assumed based on preferences indicated when setting up or administering the authentication circle, and/or which may be confirmed with the payer), application 112 and/or provider computing system 150 may be further structured to calculate amounts of the shared expense owed by one or more members of the authentication circle. In some implementations, members may be provided an even split by default (or other apportionment specified in advance for the members), and allowed to modify the contribution so as to pay more or less towards the shared expense. In some examples, the member who paid for the total amount of the shared expense (e.g., dinner) may owe a portion of the shared expense or the member who paid for the total amount of the shared expense may have covered the cost but may not himself/herself owe a portion of the shared expense.

In turn, the application 112 generates the shared expense notification comprising the contribution amount calculated to prompt a member of the authentication circle to pay the contribution amount owed. To that end, the shared expense notification may specify the contribution amount (e.g., the amount owed) and request approval to make the funds transfer between one or more user accounts. The shared expense notification may be generated in real-time or near real-time such that members of the authentication circle may receive the shared expense notification while they are at the identified geo-location and/or in response to the indication of approval by the member who paid the total amount of the shared expense as described herein. In some implementations, the notification may be sent after it is detected (via, e.g., location tracker 134 using location sensors 126 of user devices 110) that the members have left the establishment or have otherwise dispersed to some degree, after a certain time, such as 5, 30, or 90 minutes later, or when the members are detected to have reached particular destinations, such as home or workplace. This may be useful, for example, to allow members to avoid having to consider payment while enjoying each other's company and instead waiting until, for example, after the meal has concluded and the members have left the restaurant. The member may tap and/or click a link, virtual button, image, icon, graphic, etc., to pay the contribution amount. In some implementations, members may accept a contribution in a one-click fashion by selecting (e.g., touching on a corresponding portion of a touchscreen) the amount to be contributed ($18 in FIG. 19A).

Referring to FIG. 19B, in some embodiments, the provider computing system 150 may be configured to permit members to split costs in a fashion that varies according to the goods/services actually by each member consumed (i.e., rather than all members paying equally, $18 as in the above example, members pay according to what they consumed). For example, at a restaurant, when a waiter brings the check, the provider computing system 150 may be configured to permit a member to take a photo of the check. Optical character recognition and structured/unstructured data processing may then be applied to provide each of the members (on their individual user devices) a copy of the check or otherwise a listing of items ordered, along with the ability to select which detected/identified items that member ordered/consumed. In some versions, the bill may be acquired electronically from the restaurant, without the need for a printed check which may then be scanned. The other members may then see who is claiming responsibility for which of the ordered items in real time (e.g., as an item is claimed by a member, it may be grayed out, made a different color, circled/boxed, deleted, marked "paid" or "covered," etc.), until each item and/or each person's amount has been claimed. This allows some members to pay for certain items/persons (e.g., if a member wishes to cover the cost of beverages for one or more other members, the beverages may be selected in FIG. 19B). The remaining amount may be tallied as items/persons are covered ($39 in FIG. 19B). Once all of the items have been claimed, each member may be advised of their amount owed (which has not been covered by another) in connection with the check, and a selectable icon to pay the owed amount (as well as any desired tip).

It is noted that any of the icons or screen elements in the figures can be structured to be clickable or otherwise selectable (using any input mechanism, such as a touchscreen, mouse, voice prompt, gesture, etc.) for accessing additional information (such as details about a member, an account, a goal, an expenditure, available options, etc.), and/or for making authorized changes (such as changing goal parameters, adding or moving funds needed for an identified goal, expense, etc.).

Optionally, selection and/or acceptance of a contribution amount may be combined with authentication using, for example, biometric data. For example, if a touchscreen has fingerprint scanning capabilities, a member may be able to touch a monetary amount or other icon (such as $18.00 in FIG. 19) with a tip of a finger. By detecting that the member has touched the icon and scanning the user's fingerprint, the user device may determine that the member has accepted making a contribution, that the member has approved the indicated contribution amount, and that the member has been authenticated based on a scan of the fingerprint from the finger used to in response to the single act of touching the icon. In some implementations, touching the icon may be combined (or replaced) with another biometric reading (such as presenting the user's face for a facial scan using one or more cameras of the user device 110). This is one potential approach for achieving "one click" approval of a contribution (even if nothing is touched or otherwise "clicked"), or otherwise for approving a contribution via a single user entry (or at least a reduced number of user entries than may be otherwise required).

In some implementations, approval to make a contribution (or, similarly, to join an authentication circle) may be provided in other ways. For example, the user device 110 may be configured to accept a verbal confirmation. By detecting words such as "I accept" spoken by a user, the user device 110 may determine that a contribution amount (and/or joining a circle) has been approved. By further analyzing the voice signature (a biometric) of the speaker and comparing with, for example, a voice signature acquired during a setup and/or registration process for a service offered by the provider, the user device 110 may (concurrently, sequentially, or otherwise based on the same user entry, without requiring additional user entries) authenticate the user. In some versions, the user device 110 may display or otherwise present a contribution amount (e.g., present $18 on the display) and only require (at a minimum) words indicating acceptance of the presented contribution amount, without requiring that the user speak out loud the amount of money to be contributed, helping maintain privacy, confidentiality, etc. In other versions, the user device 110 may be structured to require that the user speak the amount to be contributed or action to be taken (e.g., "contribute $18" or "join circle").

In some implementations, a command may need to be followed by a code word or phrase that is used for authentication. The code word or phrase may be a unique word or phrase not commonly used in conversational speech, and may be a word or phrase that may be relatively easier, for example, for AI engine 138 to distinguish from other words or phrases. The code word may have been spoken and recorded during registration of the member, and the user device 110 and/or provider computing system 150 may require that the code word be spoken by particular member (as identified by voice signature) or by any member of the authentication circle. Although accepting a contribution (or joining a circle) is not necessarily due to a single touch or "click," acceptance is nonetheless indicated via a minimal number of user entries (e.g., one spoken phrase), reducing the user effort required to make a contribution (or join a circle).

Once the amounts to be contributed by other members are received from applications 112 running on the user devices 110 of the other members, the provider computing system 150 may initiate funds transfers, charges, etc., to give effect to the agreed-upon split. In some implementations, the transfers and charges may be delayed for a predetermined amount of time or until a certain event has taken place. In different implementations, transfers and charges may be delayed, for example, until the end of a trip or other excursion, until the members have dispersed (i.e., are no longer near each other) or the locations of the members have otherwise changed, and/or until an instruction to "settle up" is submitted by one of the members (after approval of contributions). The provider computing system 150 (e.g., via goal manager 170) may then update the goal to reflect the amounts split, contributed, spent, etc., and the effects of the amounts on budgets, fund allocations, etc.

FIGS. 15-17 illustrate example graphical user interfaces for notifications that may be provided by the provider computing system 150 and/or applications 112 according to example embodiments. As shown in FIG. 15 in examples wherein a trip abroad is involved and/or the shared expense is associated with an international location that uses different currency, the provider computing system 150 and/or application 112 may be structured to determine the best currency and payment form to use during a transaction. This may be based on exchange rates, fees for using different payment methods, etc. The exchange rate may be retrieved from a banking institution or other entity via, for example, external resource module 172 and/or external resource module 140. The graphical user interface may provide the "home" currency (i.e., the currency used in the home country of the member), which is the currency shown in USD in FIG. 15, as compared to the local currency that may be used to pay for an expense, which is Aruban florin in FIG. 15. In this regard, the provider computing system 150 and/or application 112 may determine the best currency and payment form based on one or more factors such as, but not limited to, the exchange rate, currency type, foreign currency, foreign transaction fees, etc. Based on the factors, the provider computing system 150 and/or application 112 may programmatically determine the best currency and payment form to make the funds transfer between one or more user accounts. The data used for weighing the factors relevant to determining the best payment form may be retrieved via external resource module 172 and/or external resource module 140, and funds transfers initiated via, for example, account linker 162.

In some implementations, the amount of money spent may be updated in real time or near real time (based on current exchange rates if multiple currencies are involved). For example, the money spent by members may be changing (e.g., going up) while members are at a location (e.g., while members are ordering food or drinks at a bar, or while members are adding items to a virtual cart of an online merchant). Application 112 may allow one or more members to access the amount being spent (i.e., the "tab"). In some implementations, one or more members (e.g., the member who is paying for an expense) may indicate a desire to stop the bill from growing (by, e.g., closing the tab at the bar, such as by selecting "Close Bar Tab" in FIG. 15).

Provider computing system 150 and/or user devices 110 may be further structured to notify each member of the authentication circle the amount (e.g., balance or overall budget) he/she has remaining. The notification may be output at a group level (e.g., as shown in FIG. 16 that the group has spent $750 and has $450 remaining in the budget). As depicted in FIG. 17, the notification may alternatively or additionally be provided at an individual level. For example, the notification may include a graphic that indicates that a member has $120 left to spend for one or more expenditures. The provider computing system 150 and/or application 112 may generate a shared expense notification that states, for example, that "member X has a remaining balance of $50." If certain members of the authentication circle are on a tighter budget than other members, the added transparency may assist the less budget-restricted members in remaining cognizant of the situation of the more budget restricted members without the need for awkward conversations about respective budgets.

The provider computing system 150 and/or user devices 110 (via, e.g., application 112) may alert members of the authentication circle when predetermined expenses (e.g., entertainment expenses, food and beverage expenses, individual group budgets, etc.) are approaching (or have exceeded) a preset limit. The provider computing system 150 and/or application 112 may be further structured to generate a notification in response to a predetermined expense falling within a range of a predetermined threshold (e.g., 80% of a set maximum, or within a specified amount, such as within $100). For example, if individual or group budgets have been set for the trip, the transaction monitor 166 and/or transaction monitor 132 may track the predetermined expense to determine whether the predetermined expense incurred is within a range of the preset limit (e.g., the predetermined threshold of an expense). If the predetermined expense is within the range of the predetermined threshold, the provider computing system 150 and/or application 112 may generate a notification (e.g., an alert, message, etc.) such that advantageously each member of the authentication circle is kept aware of expenses in real-time (e.g., real-time trip spending) versus the budget.

Figure 20:
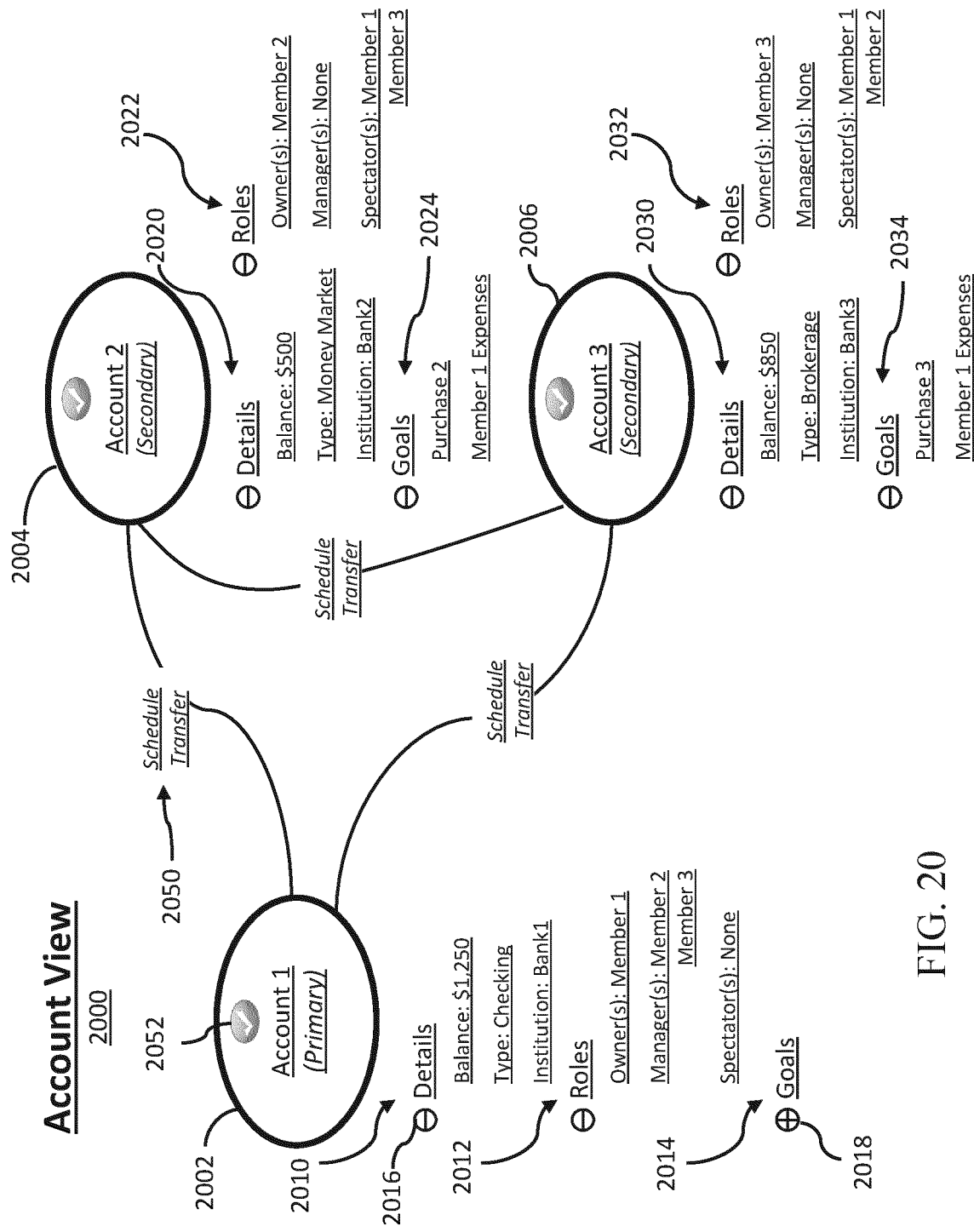
FIG. 20 provides an example integrated view of an authentication circle according to example embodiments.
Figure 21:
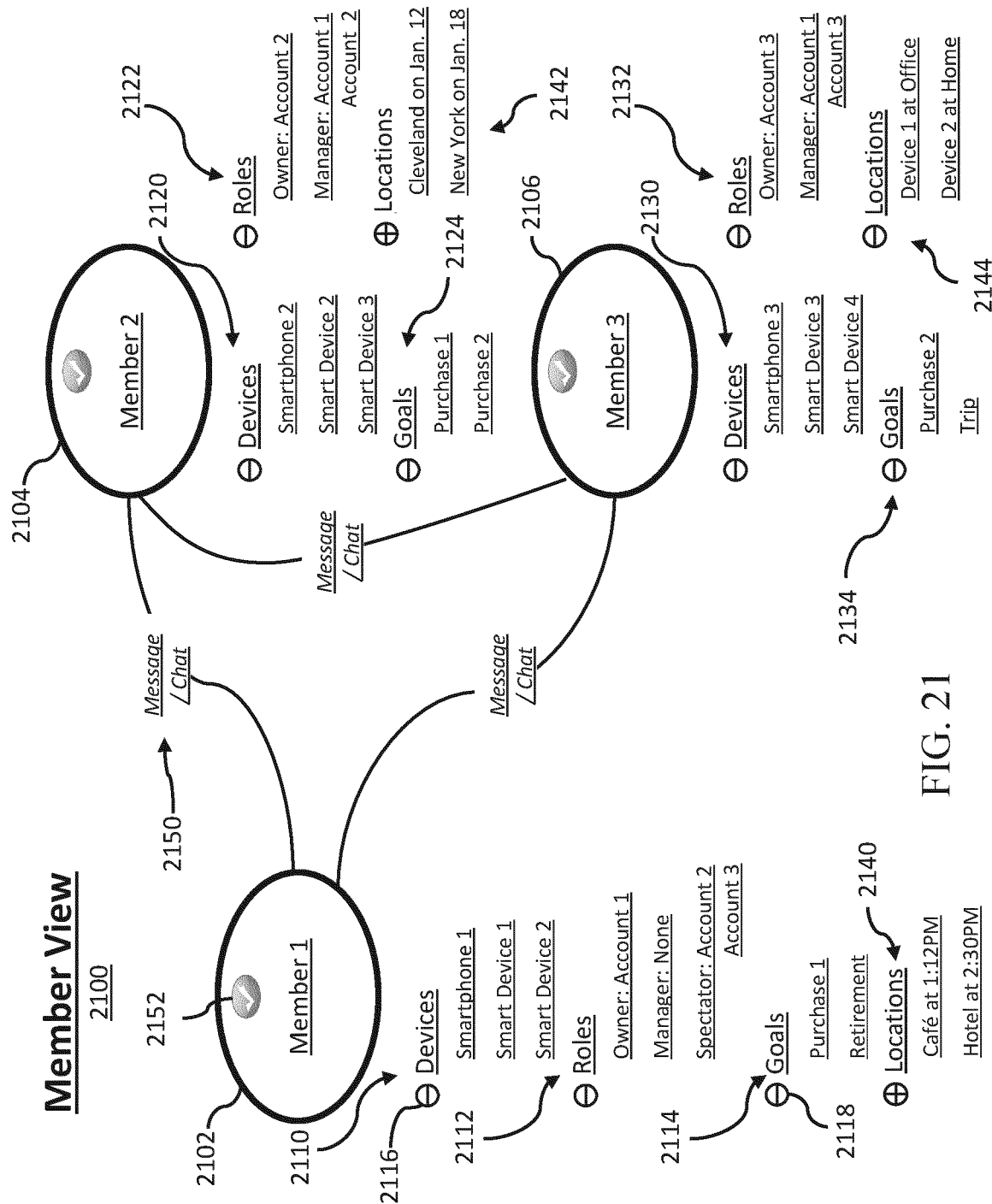
FIG. 21 provides an example integrated view of an authentication circle according to example embodiments.

In various embodiments, an application 112 running on a user device 110 of a member may present various interactive graphical user interfaces as part of a dashboard, such as the graphical interfaces of FIGS. 20 and 21. In FIGS. 20 and 21, display elements/icons may be activatable/selectable (e.g., by touching a corresponding portion of a touchscreen) by a user to allow the user to navigate among screens/user interfaces, retrieve additional information, provide additional inputs, and/or to make changes.

In FIG. 20, an "Account View" 2000 may present members with information on accounts that are linked to an authentication circle. Display icons 2002, 2004, and 2006, corresponding with accounts 1, 2, and 3, respectively, may identify the three accounts and indicate a type of account in relation to the authentication circle. For example, account 1 is identified as being a "primary" account because it is managed by (or otherwise accessible to beyond view-only access) one or more members who are not account owners, and accounts 2 and 3 are identified as being "secondary" accounts because they are available for viewing and/or for funds transfers, but remain under the control of the account owner. Selecting "Account X" or "Primary"/"Secondary" may allow an authorized member to make changes, such as to the nickname of the account or to its designation (as, e.g., primary or secondary), how it is managed, and/or whether it is linked.

In the example user interface 2000, various information is provided for each account, such as information on details, roles, and/or goals (financial or otherwise). Account 1 corresponds with details 2010, roles 2012, and goals 2014, account 2 corresponds with details 2020, roles 2022, and goals 2024, and account 3 corresponds with details 2030, roles 2032, and goals 2034. Details may include account balance, type of account, and the institution at which the account is held. Selecting the "details" icon or the icons for the items under "details" may, for example, allow an authorized member to receive additional information on the corresponding account. Roles may identify which member(s) are owners, managers (e.g., members who have more than view-only access), and/or spectators (e.g., members who have view-only access). Selecting the "roles" icon or the icons for the items under "roles" may, for example, allow authorized members to receive additional information and/or to modify roles. Goals may identify which goals are supported/funded by the corresponding accounts. Selecting the "goals" or the icons for the items under "goals" may, for example, allow authorized members to receive additional information and/or to modify the goals or the association of the goals with the corresponding account. To hide the list of items under a section, a collapse icon 2016 may be selected, and to expand the list of items under a section, an expand icon 2018 may be selected.

By selecting the "schedule transfer" icon 2050, a member may, for example, arrange for funds to be transferred between linked accounts and/or for payments to be made (via transaction engine 146) to, for example, split an expense. The active/live icon 2052 may indicate, for example, that an account is currently linked and accessible, and/or that the information listed under the corresponding account is up-to-date (e.g., was updated since last login by the member, or was updated in the past minute, hour, day, or other timeframe).

In FIG. 21, a "Member View" 2100 may present members with information on members of an authentication circle. Display icons 2102, 2104, and 2106, corresponding with members 1, 2, and 3, respectively, may identify the three members of the authentication circle. Selecting "Member X" may allow an authorized member to make changes, such as to the designation and/or photograph of the member, to what information may be accessed by the member, and/or to whether the member is to be removed from the authentication circle.

In the example user interface 2100, various information is provided for each member, such as information on devices, roles, goals, and/or locations. Member 1 corresponds with device 2110, roles 2112, goals 2114, and locations 2140, member 2 corresponds with devices 2120, roles 2122, goals 2124, and locations 2142, and member 3 corresponds with devices 2130, roles 2132, goals 2134, and locations 2144. In certain embodiments, the devices sections 2110, 2120, 2130 may identify, for example, user devices 110 from which the authentication circle has been accessed by the corresponding member, and/or user devices 110 which have detected the corresponding member in its vicinity (via, e.g., detection of a voice signature or facial recognition). In various embodiments, the devices sections 2110, 2120, 2130 may identify which devices pervasively (e.g., on an ongoing basis) or intermittently (e.g., at specified times) "listen" to or "watch" their surroundings. For example, a user device 110 may "listen" by detecting ambient sounds or "watch" by capturing imagery, and analyzing the captured sounds and images (or having them analyzed) for voices and faces of members and/or to identify circumstances (such as falls) and/or desires/needs of members. In certain implementations, the identified devices may include user devices 110, the locations of which are determined (using, e.g., location sensors 126 such as global positioning system sensors) to determine goals, expenses, or other information (e.g., by pinging a location sensor 126 of the device regularly or following certain triggers, such as detection of a purchase by another member of the authentication circle). The identified devices may alternatively or additionally be used for messaging/chatting with other members of the authentication circle. Selecting the "devices" icon or the icons for the items under "devices" may, for example, allow an authorized member to receive additional information on the device or how or when it is used, and/or to make changes, such as dissociating or removing the device from the authentication circle or the member.

Roles sections 2112, 2122, 2132 may identify the roles played by the corresponding member (e.g., whether the member is an owner, manager, and/or spectator of accounts linked to the authentication circle). Selecting the "roles" icon or the icons for the items under "roles" may, for example, allow authorized members to receive additional information and/or to modify roles. Goals sections 2114, 2124, 2134 may identify goals of a member, and/or goals associated with the member as goals that are supported/funded by the corresponding member. Selecting the "goals" icons or the icons for the items under "goals" may, for example, allow authorized members to receive additional information and/or to modify the goals or the association of the goals with the corresponding member. To hide the list of items under a section, a collapse icon 2116 may be selected, and to expand the list of items under a section, an expand icon 2118 may be selected.

Locations sections 2140, 2142, 2144 may identify the past, current, and/or future (anticipated) locations for members. In various versions, locations sections 2140, 2142, 2144 may list the devices of corresponding members, and the last known location of the corresponding device, and/or places and corresponding dates/times for when the member was detected or reported to be at the corresponding places. Locations may be, for example, the last location detected using location sensors 126, locations determined based on transactions involving user devices 110, locations identified based on flight or hotel reservations, locations self-identified by the corresponding member, and/or locations as reported by one or more other members. Selecting the "locations" icons or the icons (devices, places) for the items under "locations" may, for example, allow authorized members to receive additional information regarding how the location was determined, what transactions occurred at which locations, location history for devices or members, when a location was detected or identified, etc. Locations may be relevant to show, for example, how expenses are to be shared (e.g., who was at a social gathering and may be asked to contribute to the costs of the gathering), how goals are achieved (e.g., if a goal requires one or more members to travel to a destination), and whether certain tasks can be accomplished (e.g., whether members are close enough to able to meet at a certain place and time). In some implementations, the locations feature may be deactivated for some or all members to maintain privacy, or may be unavailable due to, for example, a lack of a device with a location sensor.

By selecting the "message/chat" icon 2150, a member may, for example, send a message to another member and/or initiate a chat (e.g., text, audio, or video) with another member. The active/live icon 2152 may indicate, for example, that a member is currently logged into the authentication circle, or has recently logged in (e.g., within the past hour, day, week, or other window of time), and/or that the information listed under the corresponding member is up-to-date (e.g., was updated since last login by the member, or was updated in the past minute, hour, day, or other timeframe).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

The various components of the computing systems and user devices (such as modules, monitors, engines, trackers, locators, circuitry, interfaces, sensors, etc.) may be implemented using any combination of hardware and software structured to execute the functions described herein. In some embodiments, each respective component may include machine-readable media for configuring the hardware to execute the functions described herein. The component may be embodied at least in part as one or more circuitry components including, but not limited to, processing circuitry, network interfaces, peripheral devices, input devices, output devices, sensors, etc. In some embodiments, a component may take the form of one or more analog circuits, electronic circuits (e.g., integrated circuits (IC), discrete circuits, system on a chip (SOCs) circuits, etc.), telecommunication circuits, hybrid circuits, and any other type of circuit. In this regard, the component may include any type of element for accomplishing or facilitating achievement of the operations described herein. For example, a component as described herein may include one or more transistors, logic gates (e.g., NAND, AND, NOR, OR, XOR, NOT, XNOR, etc.), resistors, multiplexers, registers, capacitors, inductors, diodes, wiring, and so on).

The component may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given components or parts thereof may be disposed locally (e.g., as part of a local server, a local computing system, etc.) or remotely (e.g., as part of a remote server such as a cloud based server). To that end, a component as described herein may include elements that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A service provider computing system providing an authentication dashboard, the system comprising:
    a network interface configured to communicate, via a telecommunications network, with a first user device of a first user and a second user device of a second user; and
    a processor and memory storing thereon instructions that, when executed by the processor, cause the processor to:
        transmit, to the first user device and the second user device, a proposal to establish the authentication dashboard with the first user device and the second user device as members;
        receive, via the first user device and the second user device, a first indication of acceptance and a second indication of acceptance, respectively, of the proposal to establish the authentication dashboard;
        in response to receiving the first indication of acceptance and the second indication of acceptance, generate the authentication dashboard with first and second login credentials granting the first and second users, respectively, access to the authentication dashboard;
        transmit, to at least one of the first user device or the second user device, a request to link an account of at least one of the first user or the second user to the authentication dashboard;
        receive, via at least one of the first user device or the second user device, a third indication of acceptance to link the account to the authentication dashboard;
        in response to receiving the third indication of acceptance, link the account to the authentication dashboard;
        retrieve account data corresponding to the account linked to the authentication dashboard;
        receive, from the first user device, a first audio file comprising a first sound recorded by the first user device, and receive, from the second user device, a second audio file comprising a second sound recorded simultaneously by the second user device;
        compare a first sound signature of the first sound with a second sound signature of the second sound;
        determine, based on the comparison, that the first user device is within a predetermined distance of the second user device;
        identify, based on the first user device being within the predetermined distance of the second user device, a shared goal using at least one of the account data and a first set of inputs from at least one of the first and second user devices; and
        populate a set of fields in a dashboard which identifies the first and second users and the shared goal, and provides the account data, wherein the dashboard is configured to identify progress toward the shared goal based at least in part on the first set of inputs and a second set of inputs from at least one of the first and second user devices.

2. The system of claim 1, wherein the first set of inputs include sounds detected using one or more ambient sensors of at least of the first and second user devices, and wherein the instructions cause the processor to identify the shared goal based at least in part on a conversation between the first and second users.

3. The system of claim 2, wherein the instructions further cause the processor to identify the first and second users in the detected sounds.

4. The system of claim 3, wherein the instructions cause the processor to identify the first and second users in the detected sounds based on at least one of voice signatures of the first and second users and recognized names spoken by the first and second users.

5. The system of claim 1, wherein the first and second user devices include first and second location sensors, respectively, and wherein the instructions cause the processor to identify the shared goal based at least in part on one or more locations of the first and second user devices detected using the first and second location sensors.

6. The system of claim 1, wherein the instructions cause the processor to identify the shared goal based at least in part on a financial transaction identified in the account data.

7. The system of claim 1, wherein the instructions cause the processor to identify the shared goal based on at least one of a user entry and a selection input into at least one of the first and second user devices by at least one of the first and second users.

8. The system of claim 1, wherein the instructions further cause the processor to determine progress toward the shared goal based at least in part on the account data and on the second set of inputs, and populate the set of fields with data based on the determined progress.

9. The system of claim 1, wherein the account data includes one or more posts to a social network, and wherein the instructions cause the processor to identify the shared goal based at least partly on the one or more posts.

10. The system of claim 1, wherein the shared goal is paying for an expense, and wherein the instructions cause the processor to apportion the expense to the first and second users.

11. The system of claim 1, wherein the instructions cause the processor to link a first account of the first user and a second account of the second user, and retrieve the account data from both the first and second accounts.

12. The system of claim 11, wherein at least one of the first and second accounts is a non-financial account.

13. The system of claim 12, wherein one of the first and second accounts is a social networking account and the other of the first and second accounts is a financial account with funds to be used towards the shared goal.

14. The system of claim 1, wherein the instructions further cause the processor to determine progress towards the shared goal based at least in part on input from the first and second users and on the account data.

15. The system of claim 1, wherein the instructions cause the processor to retrieve information from one or more third-party computing systems, and populate a second set of fields in the dashboard to identify one or more options towards achieving the shared goal.

16. The system of claim 1, wherein the instructions further cause the processor to provide the first user device access to the dashboard of the authentication dashboard via a first login credential or first biometric of the first user, and provide the second user device access to the dashboard of the authentication dashboard via a second login credential or second biometric of the second user.

17. The system of claim 1, wherein the instructions further cause the processor to structure the first and second requests such that the first and second indications, respectively, are generated in response to one-click selections on the first and second user devices.

18. The system of claim 1, wherein the shared goal is a common financial goal of saving or paying for an expense.

19. A first user device comprising:
one or more user interfaces for accepting inputs from a first user and providing perceptible outputs to the first user; and
a processor and memory with instructions that, when executed by the processor, cause the processor to:
receive, from a service provider computing system or from a second user device, a proposal to establish an authentication dashboard with the first user device and the second user device as members;
accept, via the one or more user interfaces, the proposal to establish the authentication dashboard;
transmit a first indication of acceptance of the proposal to the service provider computing system;
receive, from a service provider computing system, a request to link at least one account of the first user to the authentication dashboard;
accept, via the one or more user interfaces, the request to link the at least one account to the authentication dashboard, and transmit a second indication of acceptance of the request to the service provider computing system;
transmit, to the service provider computing system or the second user device, a first audio file of first sounds recorded by the first user device,
receive, from the service provider computing system, a comparison indicating that the first user device is within a predetermined distance of the second user device, the comparison based on a first sound signature of the first sounds and a second sound signature of second sounds in a second audio file from the second user device, the second audio file of second sounds recorded substantially simultaneously by the second user device;
present, based on the first user device being within the predetermined distance of the second user device, via the one or more user interfaces, a shared goal identified using at least one of the account data and a first set of inputs from at least one of the first and second user devices;
present, via the one or more user interfaces, a graphical dashboard with a set of fields identifying the first and second users and the shared goal, and providing the account data, wherein the graphical dashboard is configured to identify progress toward the shared goal based at least in part on the account data, the first set of inputs, and a second set of inputs from at least one of the first and second user devices.

20. A method of forming an authentication dashboard, the method comprising:
receiving inputs from a first user device of a first user and from a second user device of a second user;
accessing at least one account of the first and second users to acquire account data;
receiving, from the first user device, a first audio file of first sounds recorded by the first user device, and receiving, from the second user device, a second audio file of second sounds recorded substantially simultaneously by the second user device;
comparing a first sound signature of the first sounds with a second sound signature of the second sounds;
determining, based on the comparison, that the first user device is within a predetermined distance of the second user device;
identifying, based on the first user device being within the predetermined distance of the second user device, a shared goal using at least one of the account data and a first set of inputs from at least one of the first and second user devices;
transmitting, to the first user device and to the second user device, a proposal to establish the authentication dashboard for meeting the identified shared goal;
receiving, via the first user device and the second user device, a first indication of acceptance and a second indication of acceptance, respectively, of the proposal to establish the authentication dashboard;
in response to receiving the first indication of acceptance and the second indication of acceptance, generate the authentication dashboard with first and second login credentials granting the first and second users, respectively, access to the authentication dashboard; and
populating a set of fields in a dashboard, accessible via the first and second user devices, which identifies the first and second users and the shared goal, and provides the account data, wherein the dashboard is configured to identify progress toward the shared goal based at least in part on the first set of inputs and a second set of inputs from at least one of the first and second user devices.

* * * * *